US012619612B2

(12) United States Patent
Veselova et al.

(10) Patent No.: US 12,619,612 B2
(45) Date of Patent: May 5, 2026

(54) OPTIMIZING AN OPERATOR FLOW FOR PERFORMING AGGREGATION VIA A DATABASE SYSTEM

(71) Applicant: Ocient Holdings LLC, Chicago, IL (US)

(72) Inventors: Anna Veselova, Chicago, IL (US); Greg R. Dhuse, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 231 days.

(21) Appl. No.: 18/310,177

(22) Filed: May 1, 2023

(65) Prior Publication Data

US 2024/0370439 A1 Nov. 7, 2024

(51) Int. Cl.
*G06F 16/2455* (2019.01)
*G06F 16/2453* (2019.01)
*G06F 16/248* (2019.01)

(52) U.S. Cl.
CPC .. *G06F 16/24556* (2019.01); *G06F 16/24537* (2019.01); *G06F 16/24544* (2019.01); *G06F 16/2456* (2019.01); *G06F 16/248* (2019.01)

(58) Field of Classification Search
CPC ......... G06F 16/24556; G06F 16/24537; G06F 16/24544; G06F 16/2456; G06F 16/248
See application file for complete search history.

(56) References Cited

U.S. PATENT DOCUMENTS 5,548,770 A 8/1996 Bridges
6,230,200 B1 5/2001 Forecast 6,633,772 B2 10/2003 Ford
7,499,907 B2 3/2009 Brown
7,908,242 B1 3/2011 Achanta
11,775,584 B1 * 10/2023 Sharma ............... G06F 16/2455
707/769
2001/0051949 A1 12/2001 Carey
2002/0032676 A1 3/2002 Reiner
(Continued)

OTHER PUBLICATIONS

A new high performance fabric for HPC, Michael Feldman, May 2016, Intersect360 Research.

(Continued)

*Primary Examiner* — Courtney Harmon
(74) *Attorney, Agent, or Firm* — Garlick & Markison; Timothy W. Markison

(57) ABSTRACT

A database system is operable to generate an initial query operator execution that includes an IO operator for execution serially before an aggregation operator indicating performance of an aggregation. The initial query operator execution flow is converted into an updated query operator execution flow semantically equivalent to the initial query operator execution flow based on updating the IO operator to include the performance of the aggregation and adding a re-aggregation operator serially after the IO operator. A corresponding query is executed by applying the updated query operator execution flow based on executing, via each of a plurality of parallelized resources, the IO operator generate corresponding sub-aggregation output via performance of the aggregation, and executing the re-aggregation operator upon data blocks generated based on execution of the IO operator across the plurality of parallelized resources.

20 Claims, 66 Drawing Sheets

(56)            References Cited

U.S. PATENT DOCUMENTS

| 2004/0162853 | A1 | 8/2004 | Brodersen | |
| 2008/0133456 | A1 | 6/2008 | Richards | |
| 2009/0063893 | A1 | 3/2009 | Bagepalli | |
| 2009/0183167 | A1 | 7/2009 | Kupferschmidt | |
| 2010/0082577 | A1 | 4/2010 | Mirchandani | |
| 2010/0241646 | A1 | 9/2010 | Friedman | |
| 2010/0274983 | A1 | 10/2010 | Murphy | |
| 2010/0312756 | A1 | 12/2010 | Zhang | |
| 2011/0219169 | A1 | 9/2011 | Zhang | |
| 2012/0109888 | A1 | 5/2012 | Zhang | |
| 2012/0151118 | A1 | 6/2012 | Flynn | |
| 2012/0185866 | A1 | 7/2012 | Couvee | |
| 2012/0254252 | A1 | 10/2012 | Jin | |
| 2012/0311246 | A1 | 12/2012 | McWilliams | |
| 2013/0332484 | A1 | 12/2013 | Gajic | |
| 2014/0047095 | A1 | 2/2014 | Breternitz | |
| 2014/0136510 | A1 | 5/2014 | Parkkinen | |
| 2014/0188841 | A1 | 7/2014 | Sun | |
| 2015/0205607 | A1 | 7/2015 | Lindholm | |
| 2015/0244804 | A1 | 8/2015 | Warfield | |
| 2015/0248366 | A1 | 9/2015 | Bergsten | |
| 2015/0293966 | A1 | 10/2015 | Cai | |
| 2015/0310045 | A1 | 10/2015 | Konik | |
| 2016/0034547 | A1 | 2/2016 | Lerios | |
| 2017/0228425 | A1* | 8/2017 | Kandula | G06F 16/24542 |
| 2017/0322988 | A1* | 11/2017 | Weyerhaeuser | G06F 16/24554 |
| 2021/0294858 | A1* | 9/2021 | Kondiles | G06F 16/24532 |
| 2022/0027379 | A1* | 1/2022 | Unterbrunner | G06F 16/254 |
| 2022/0043690 | A1* | 2/2022 | Kondiles | G06F 16/9027 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable_html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37

DB OS = DataBase Operating Sysetm
CD OS = computing device operating system node 37 data set 32 columns 80 rows or records data for segment 1 (raw segment)

primary organization column (e.g., time stamp)

selected key column (e.g., engine on or off)

divide segment by columns into data slabs data slab sort data slabs based on key column(s)

sorted data slab

FIG. 23 query processing system 2502 query execution module
2504 database system 10 database system 10 query execution module 2504 database system 10 database system 10 query processing system 2510 query processing system 2510 database system 10 record processing and storage system 2505

2505 record processing and storage system 2505 long term storage 2540 segment generator 2617 database system 10 database
system 10

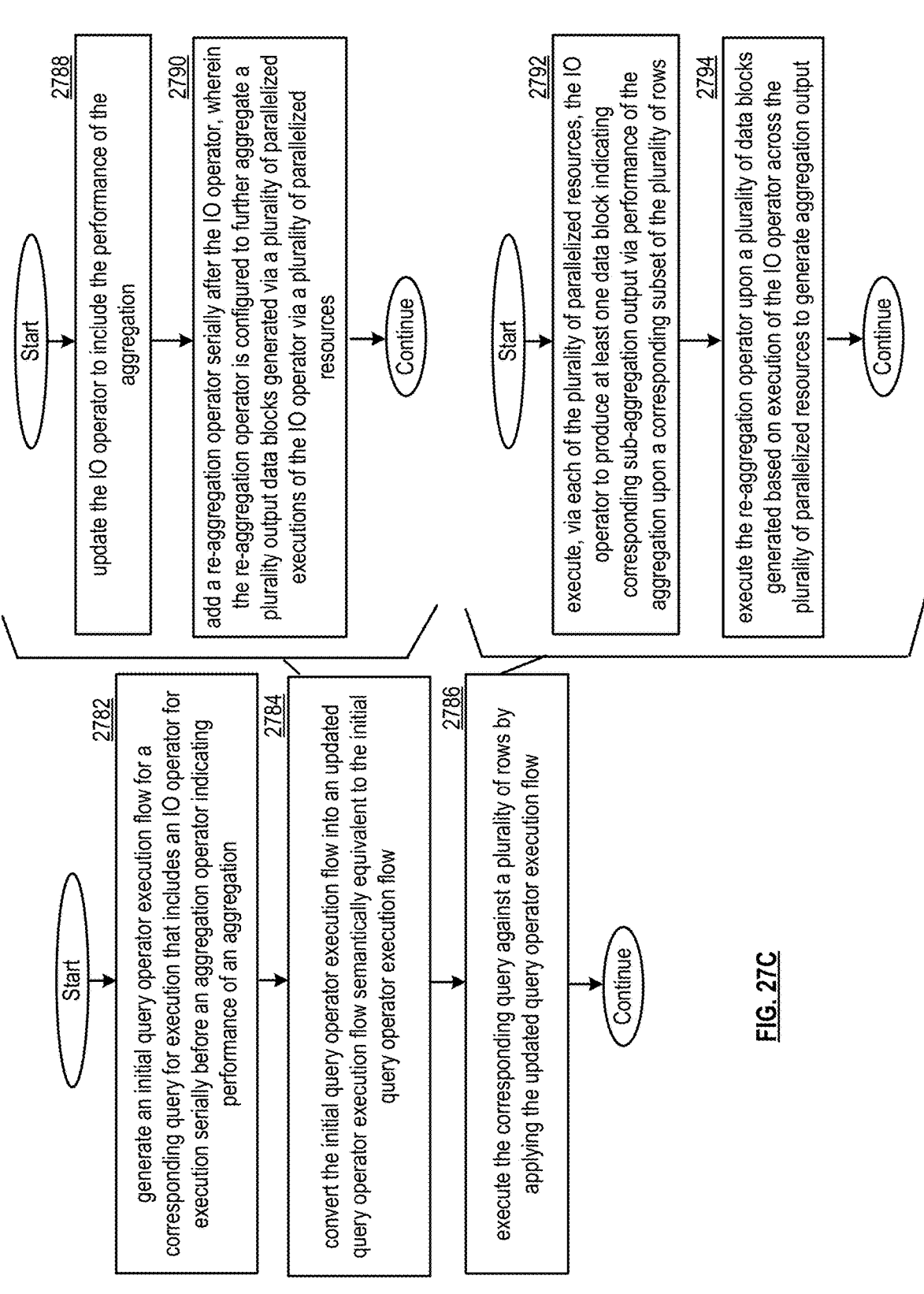

2782

Start generate an initial query operator execution flow for a corresponding query for execution that includes an IO operator indicating performance of an aggregation

2784 convert the initial query operator execution flow into an updated query operator execution flow semantically equivalent to the initial query operator execution flow

2786 execute the corresponding query against a plurality of rows by applying the updated query operator execution flow Continue

2788

Start update the IO operator to include the performance of the aggregation

2790 add a re-aggregation operator serially after the IO operator, wherein the re-aggregation operator is configured to further aggregate a plurality output data blocks generated via a plurality of parallelized executions of the IO operator via a plurality of parallelized resources Continue

2792

Start execute, via each of the plurality of parallelized resources, the IO operator to produce at least one data block indicating corresponding sub-aggregation output via performance of the aggregation upon a corresponding subset of the plurality of rows

2794 execute the re-aggregation operator upon a plurality of data blocks generated based on execution of the IO operator across the plurality of parallelized resources to generate aggregation output Continue

FIG. 27C query processing system 2510

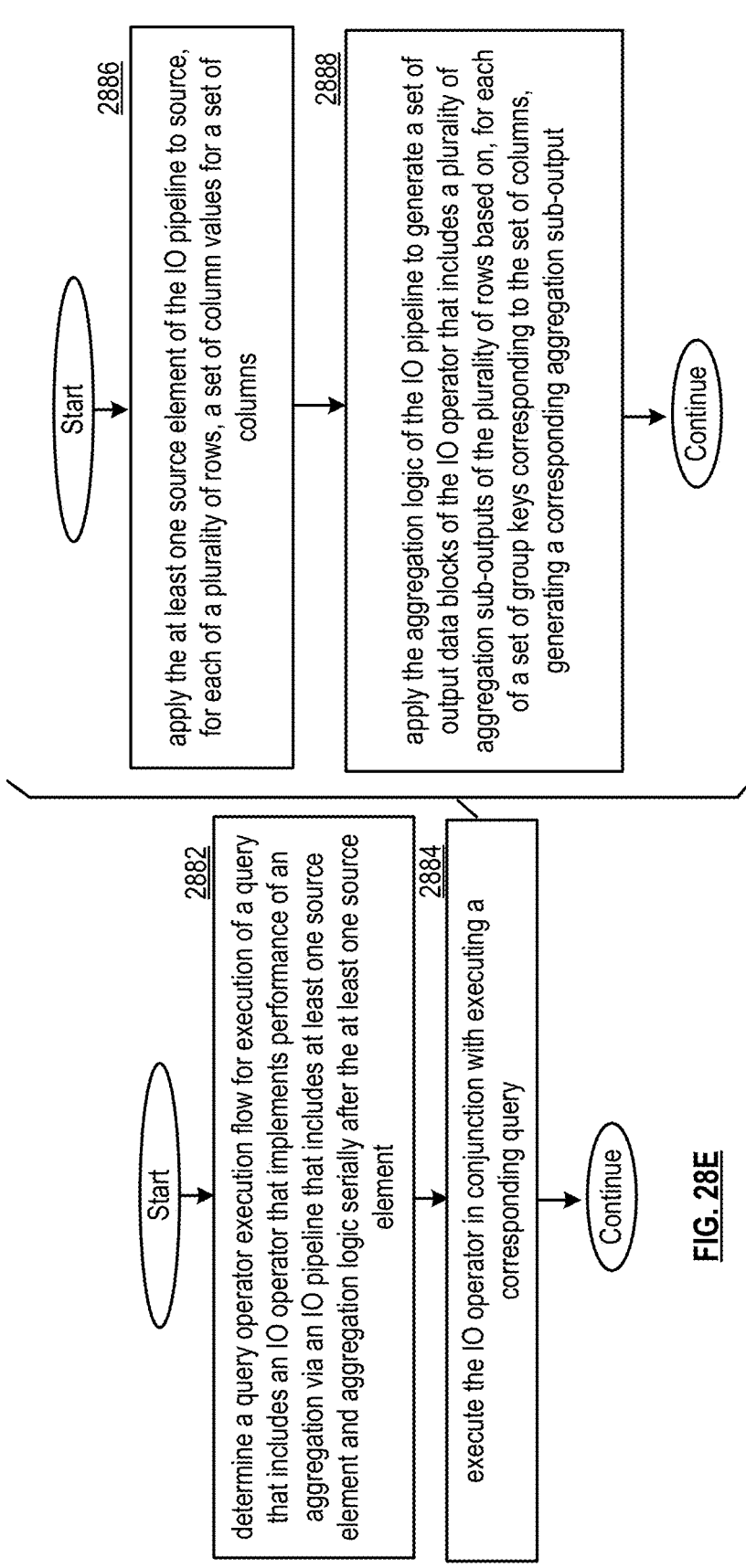

Start

2882 determine a query operator execution flow for execution of a query that includes an IO operator that implements performance of an aggregation via an IO pipeline that includes at least one source element and aggregation logic serially after the at least one source element

2884 execute the IO operator in conjunction with executing a corresponding query

Continue

Start

2886 apply the at least one source element of the IO pipeline to source, for each of a plurality of rows, a set of column values for a set of columns

2888 apply the aggregation logic of the IO pipeline to generate a set of output data blocks of the IO operator that includes a plurality of aggregation sub-outputs of the plurality of rows based on, for each of a set of group keys corresponding to the set of columns, generating a corresponding aggregation sub-output Continue

FIG. 28E query processing system 2510 database
system 10

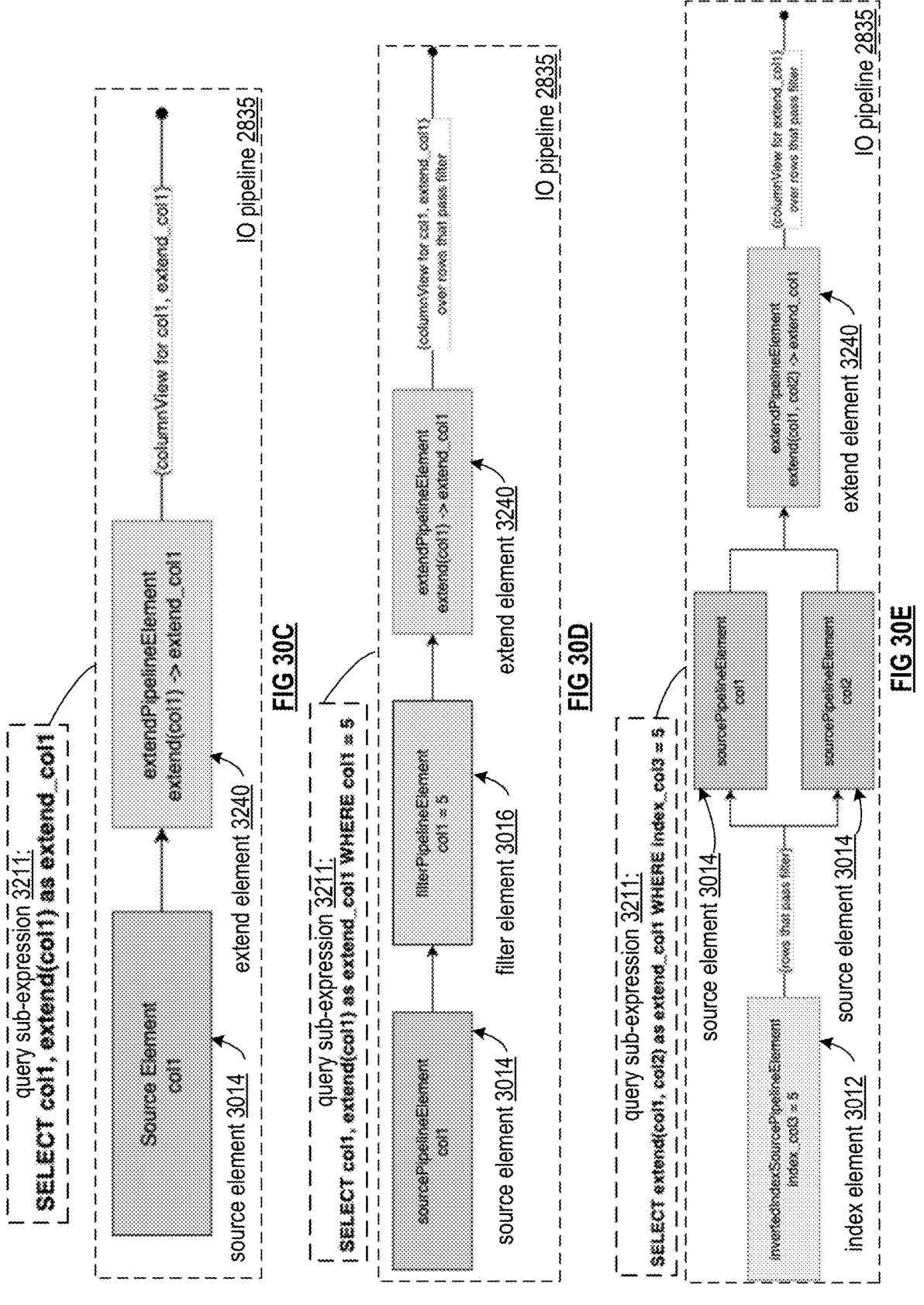

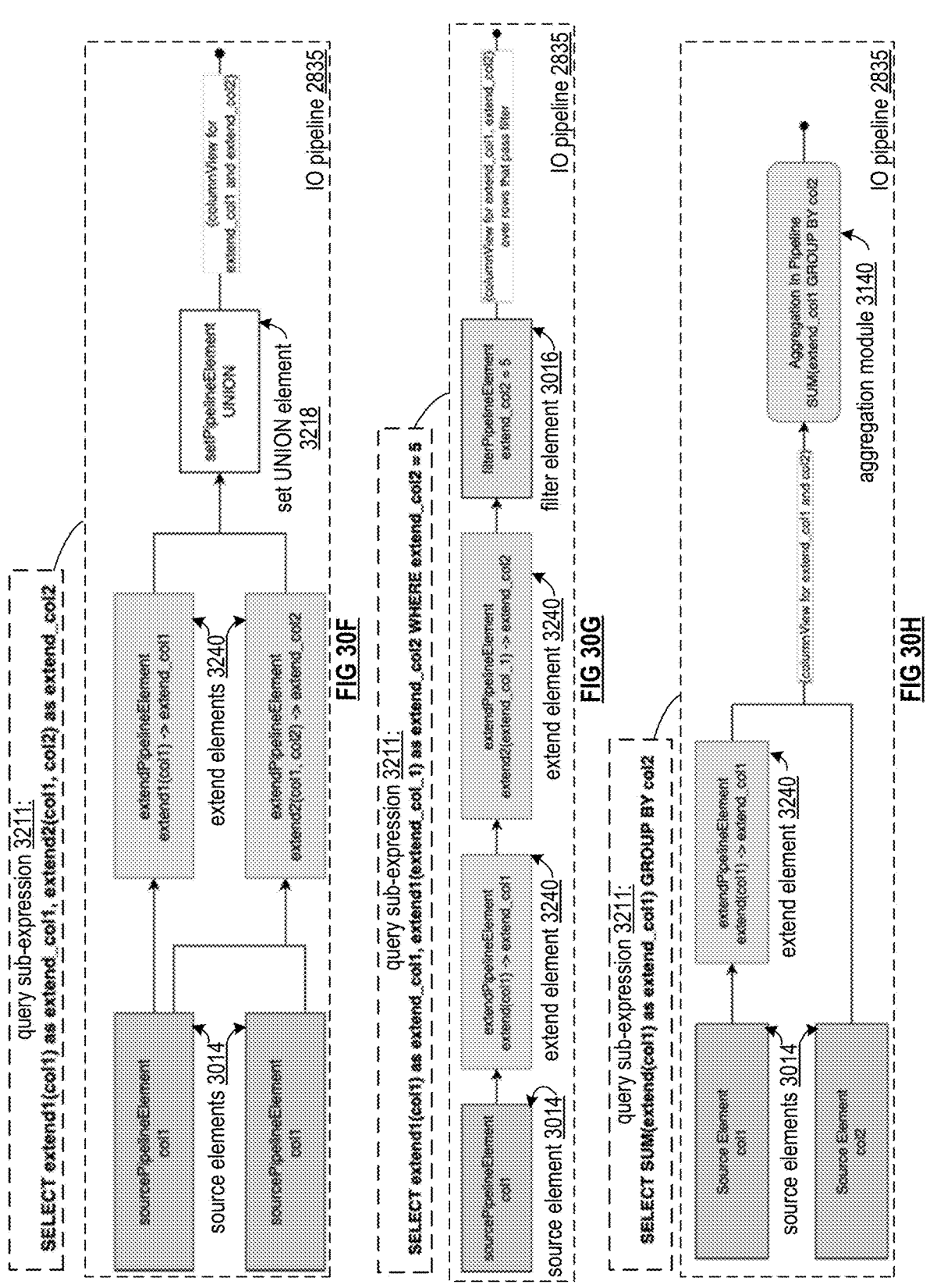

OPTIMIZING AN OPERATOR FLOW FOR PERFORMING AGGREGATION VIA A DATABASE SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with various embodiments;

FIG. 27C is a logic diagram illustrating a method for execution in accordance with various embodiments;

FIG. 28E is a logic diagram illustrating a method for execution in accordance with various embodiments;

FIGS. 30C-30H illustrate example embodiments of IO pipelines that include extend elements in accordance with various embodiments.

DETAILED DESCRIPTION OF THE INVENTION

Figure 1:
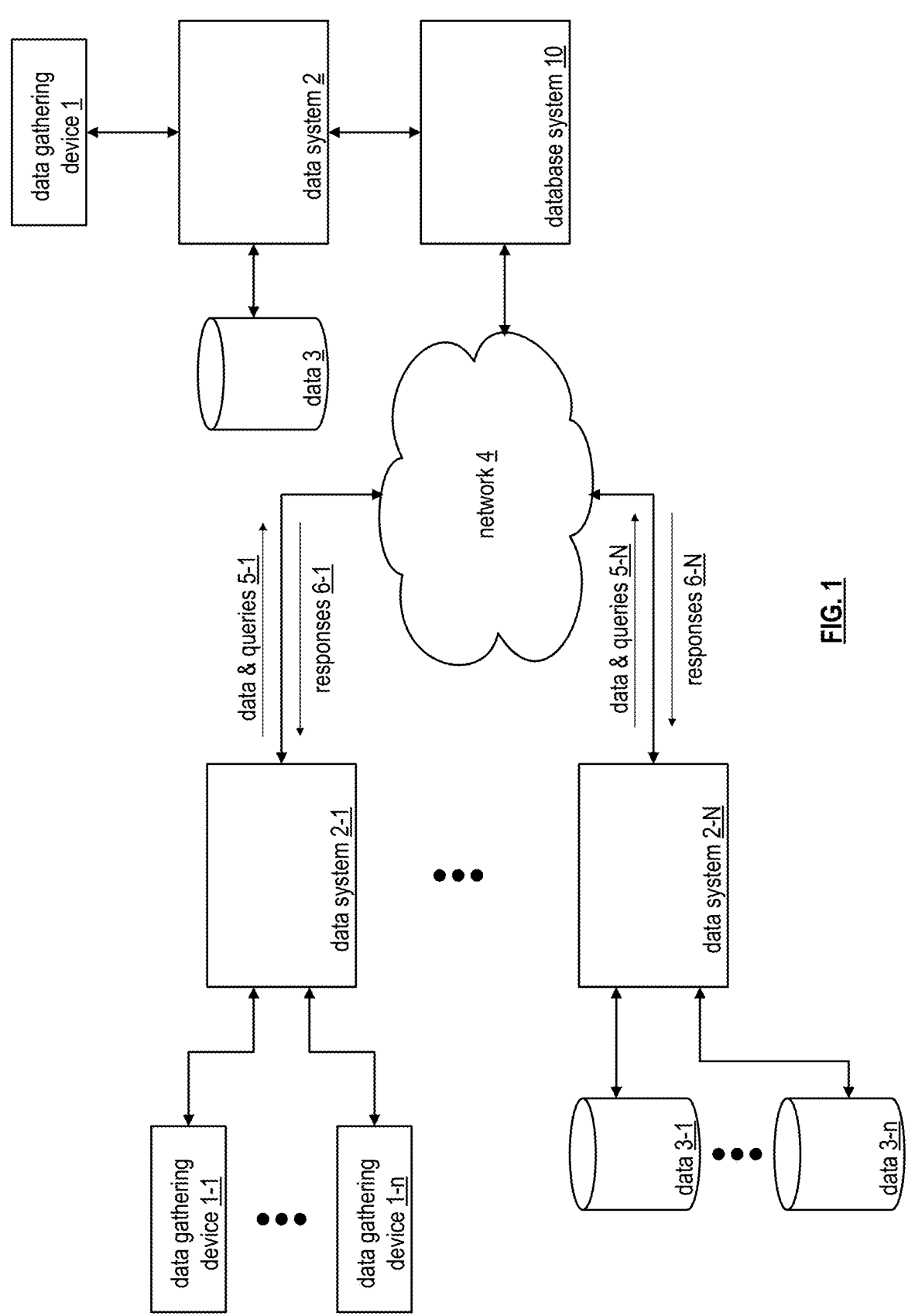
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
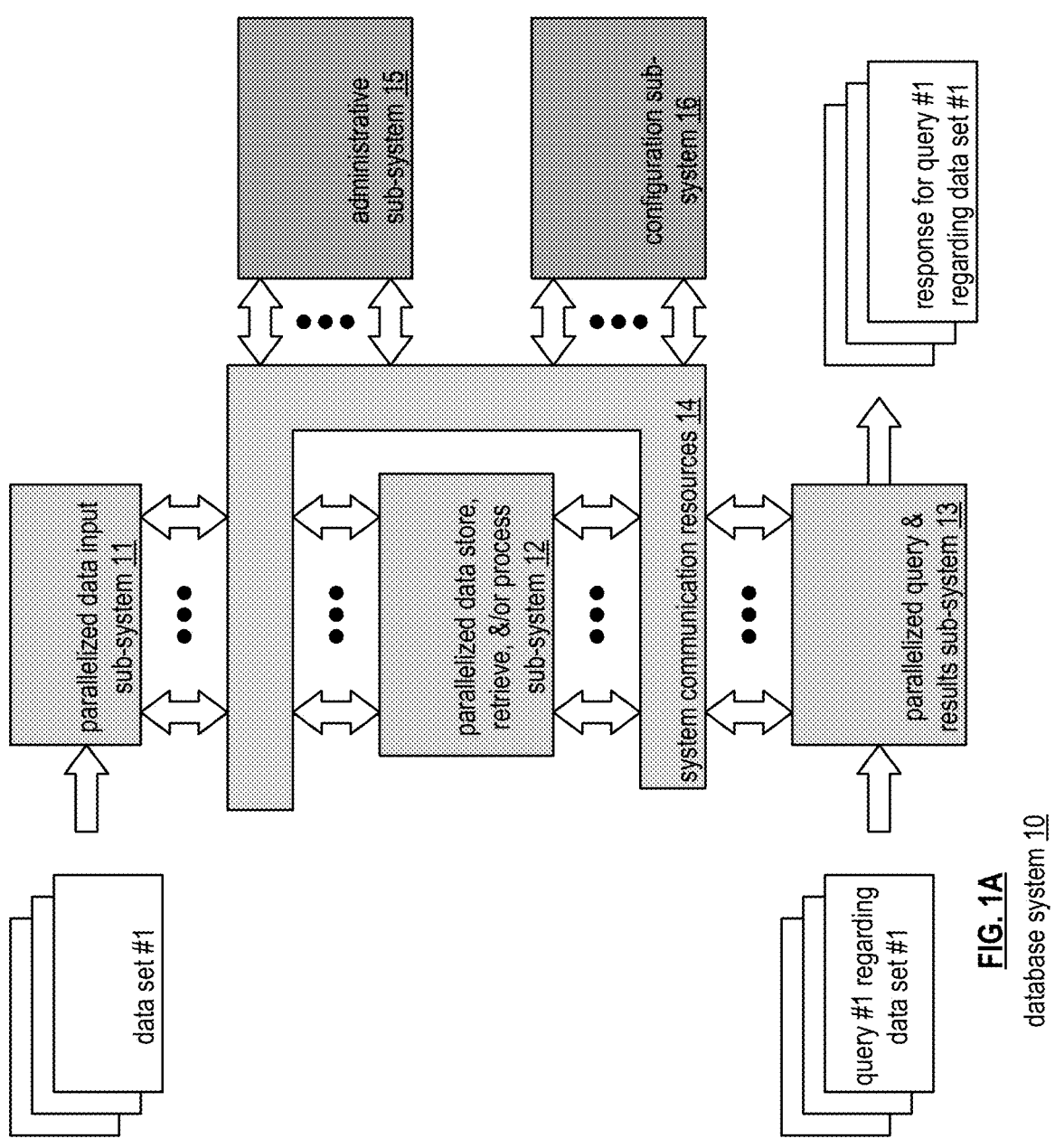
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figures 2, 3:
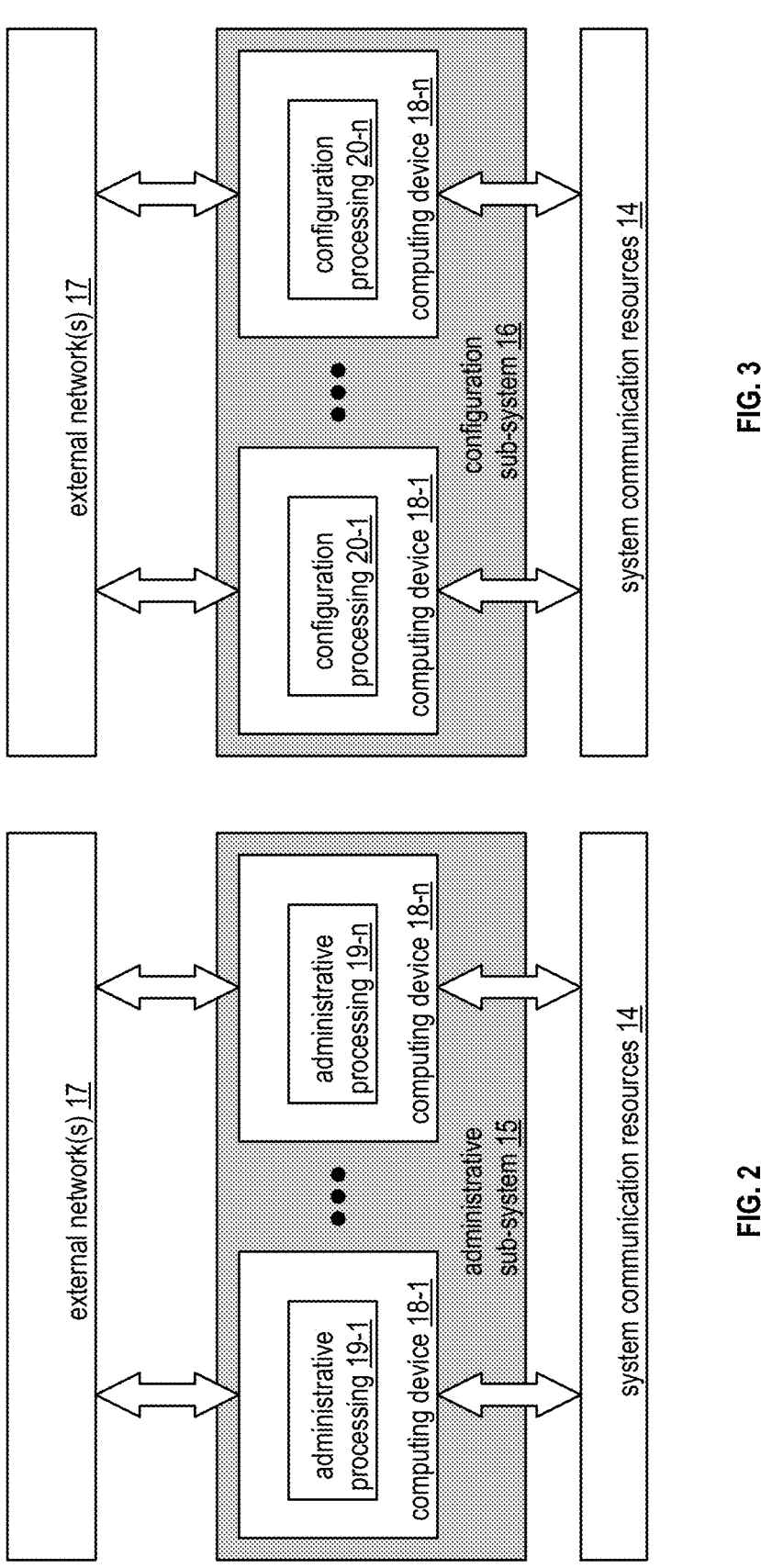
FIG. 2 is a schematic block diagram of an embodiment of an administrative sub-system in accordance with various embodiments.
FIG. 3 is a schematic block diagram of an embodiment of a configuration sub-system in accordance with various embodiments.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
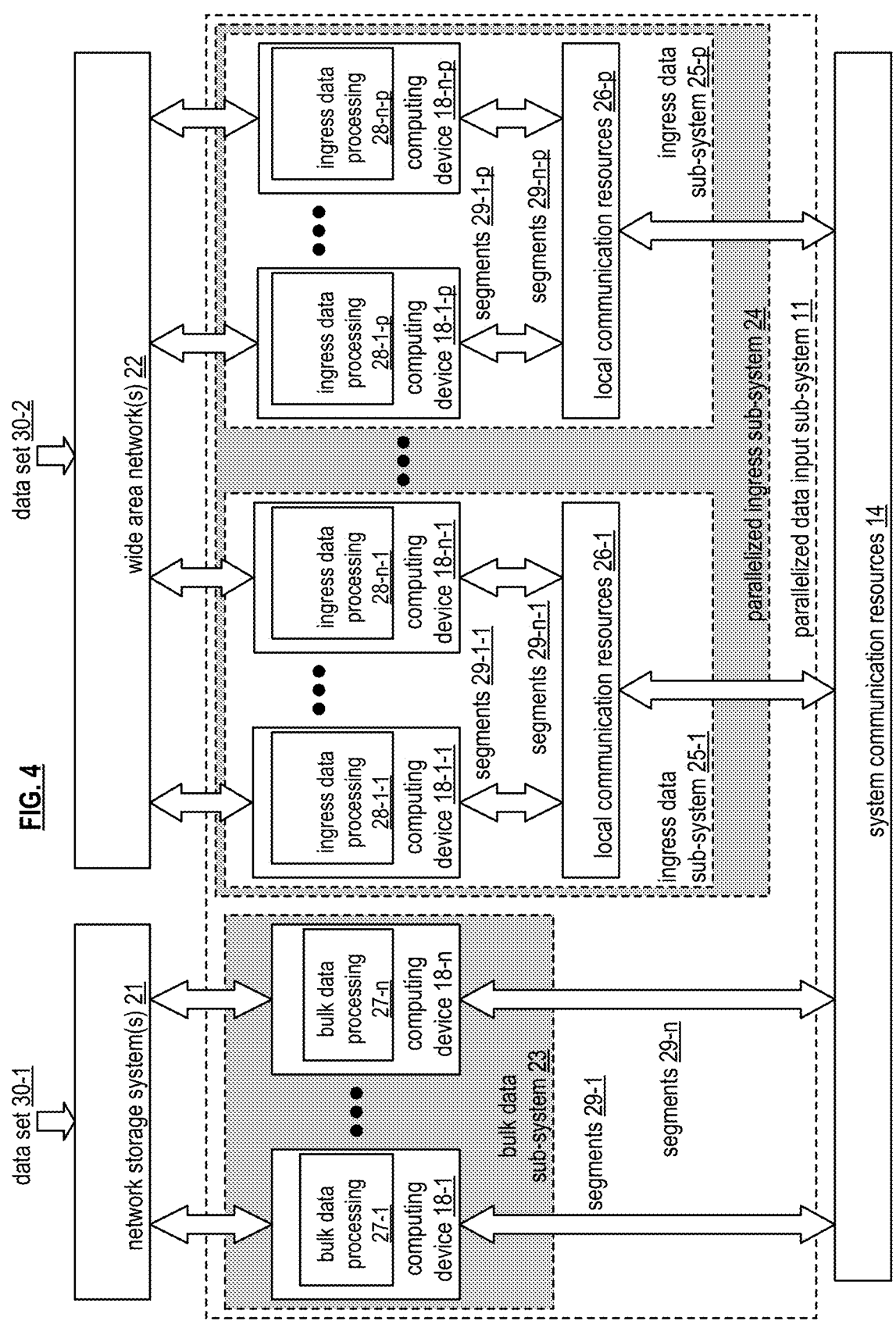
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
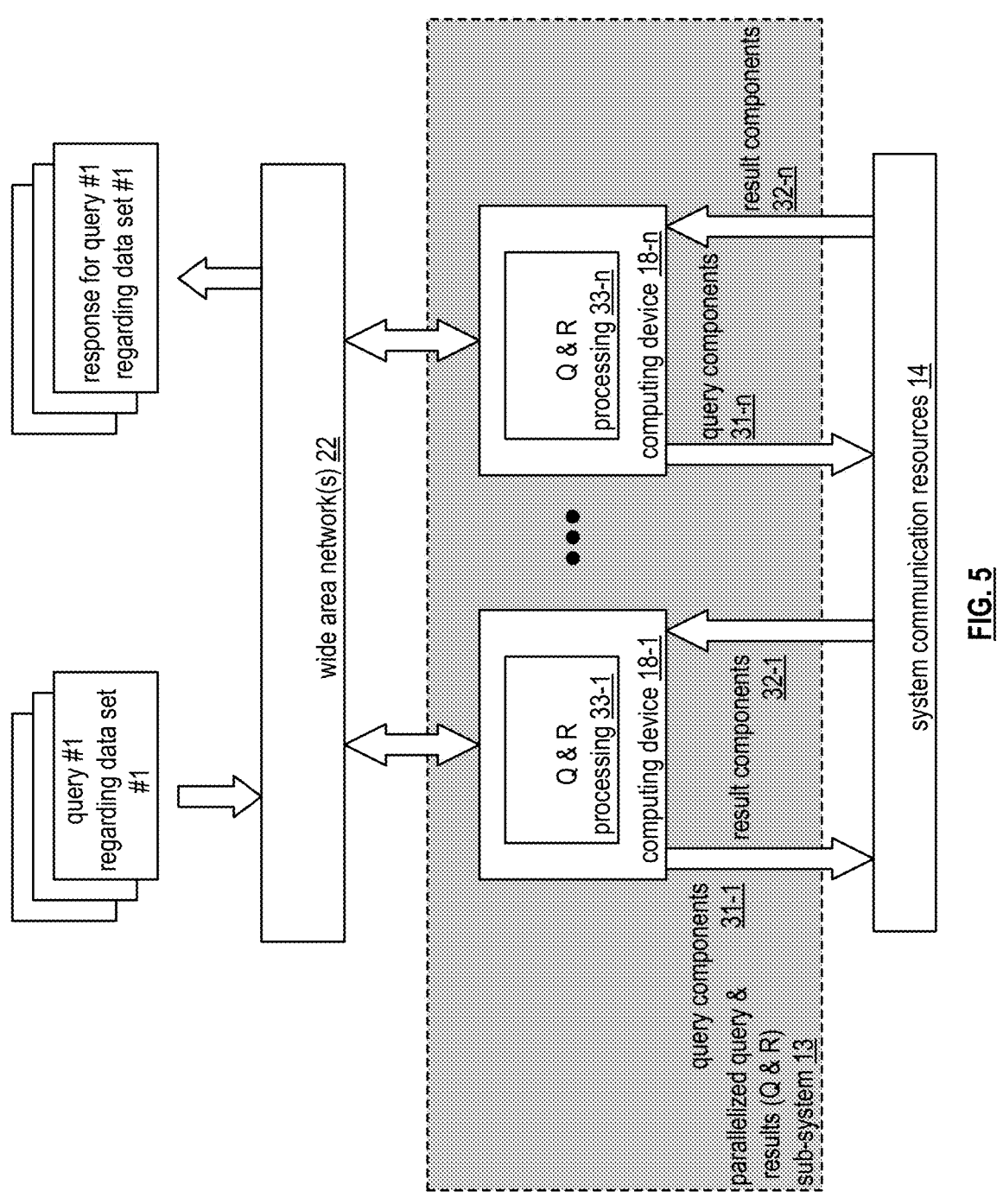
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
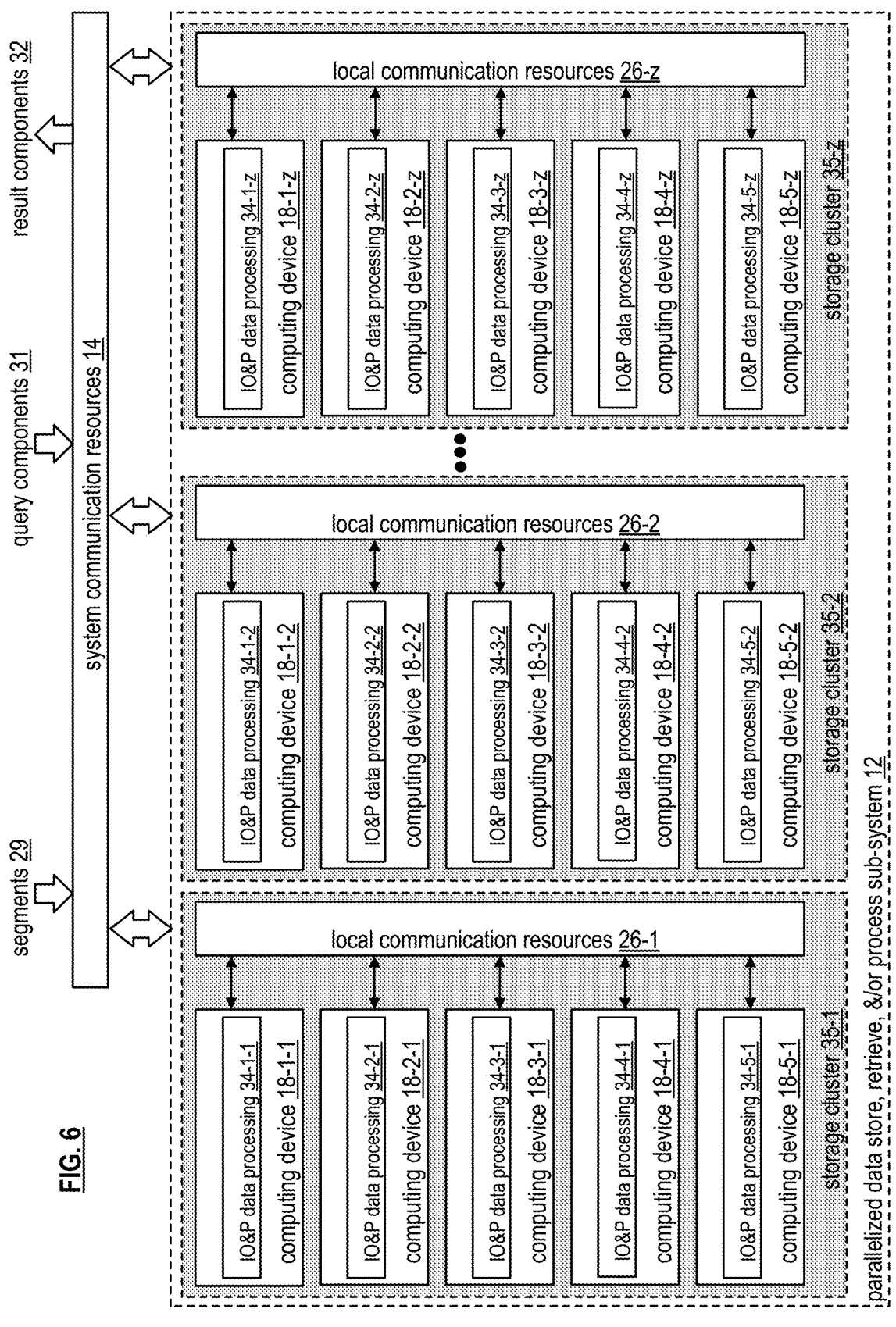
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
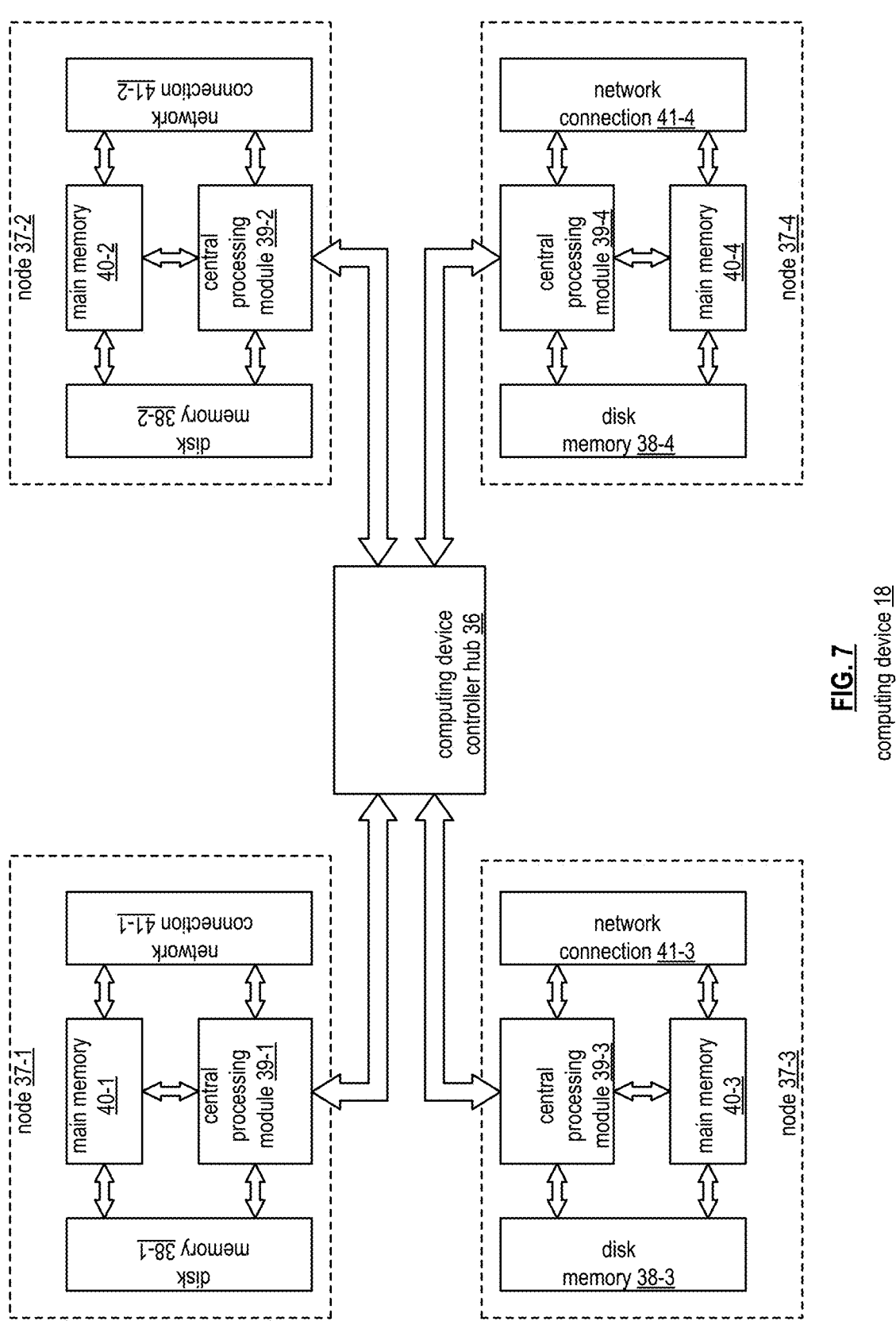
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
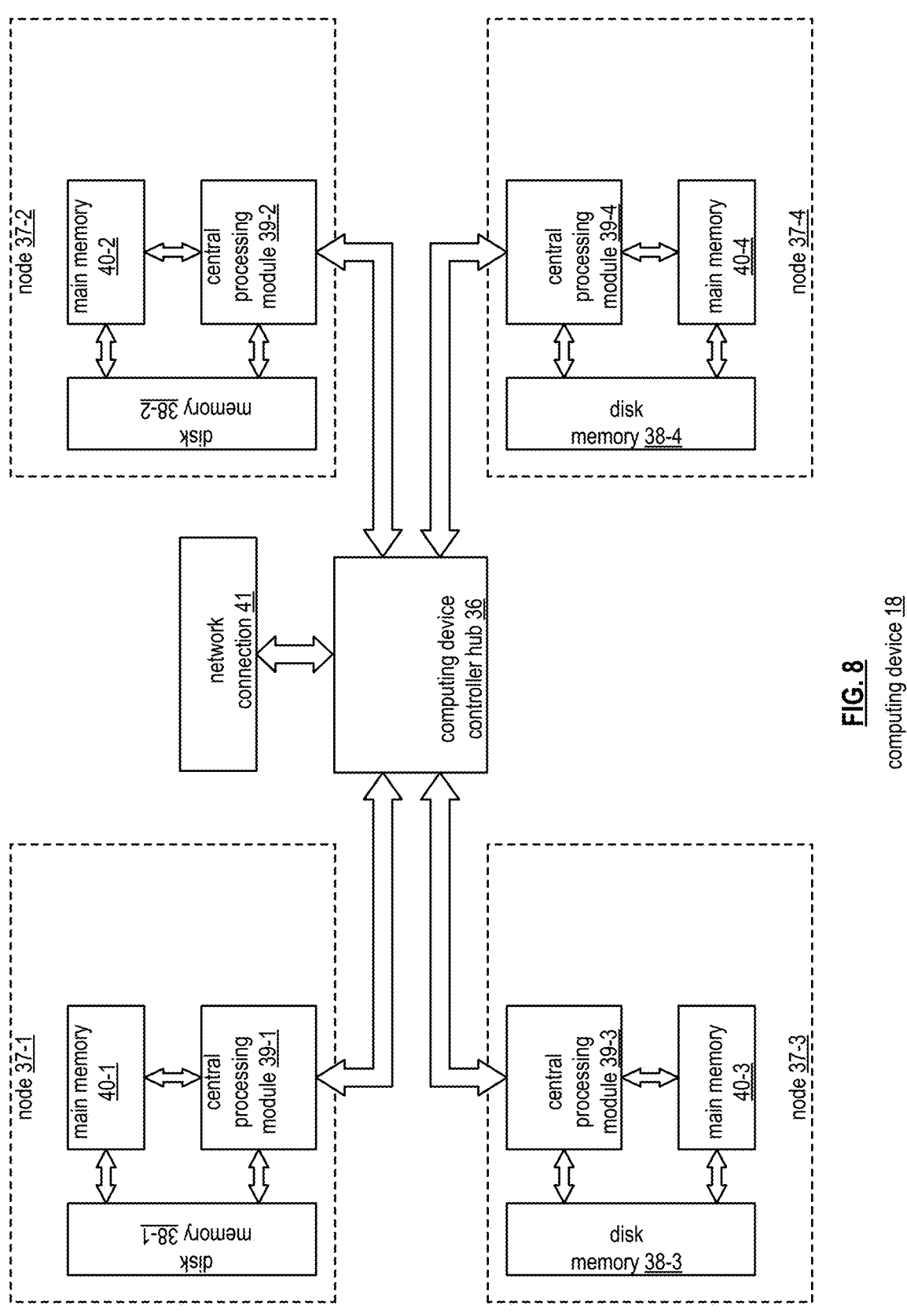
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
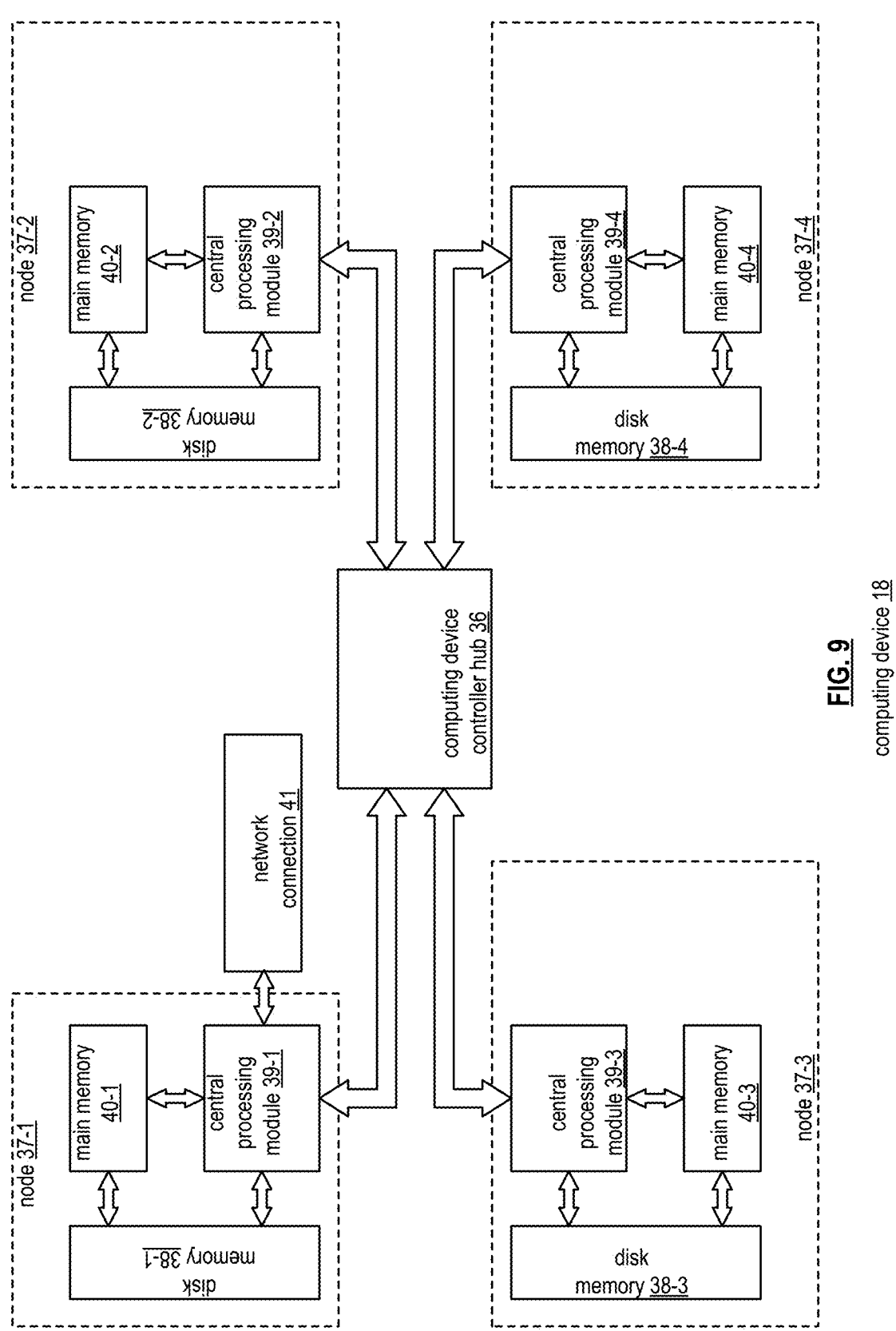
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
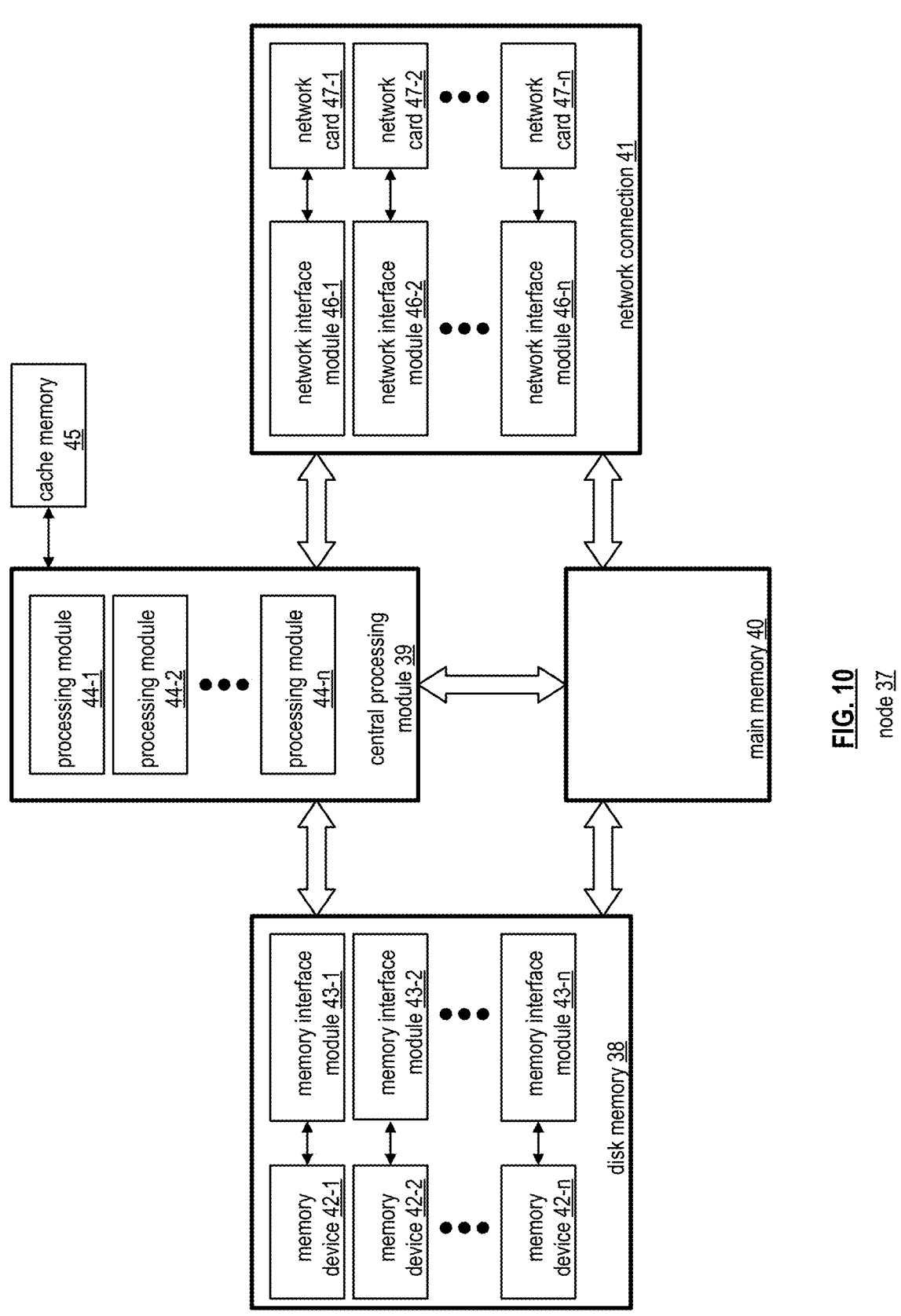
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45**. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial. ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39** or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
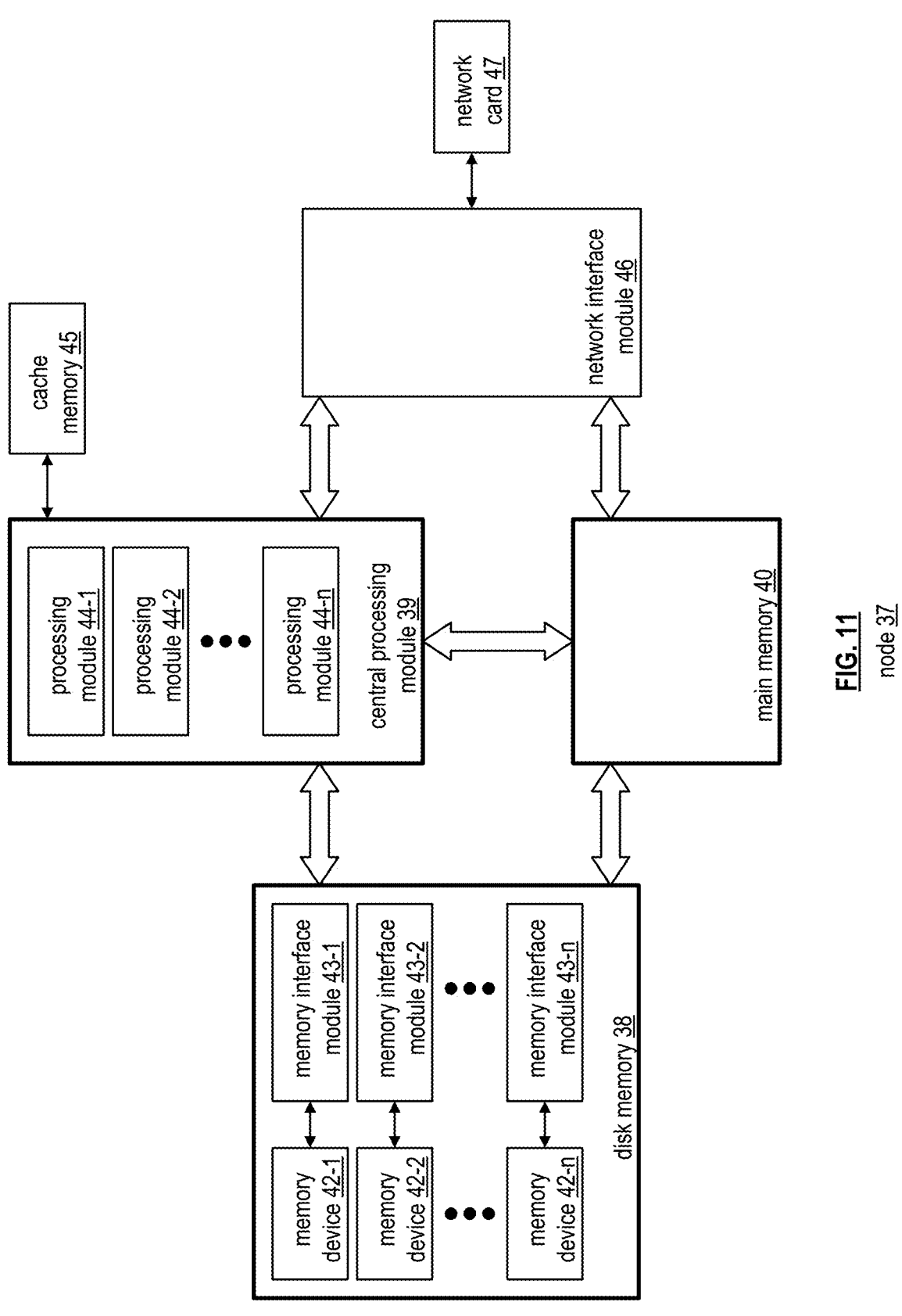
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
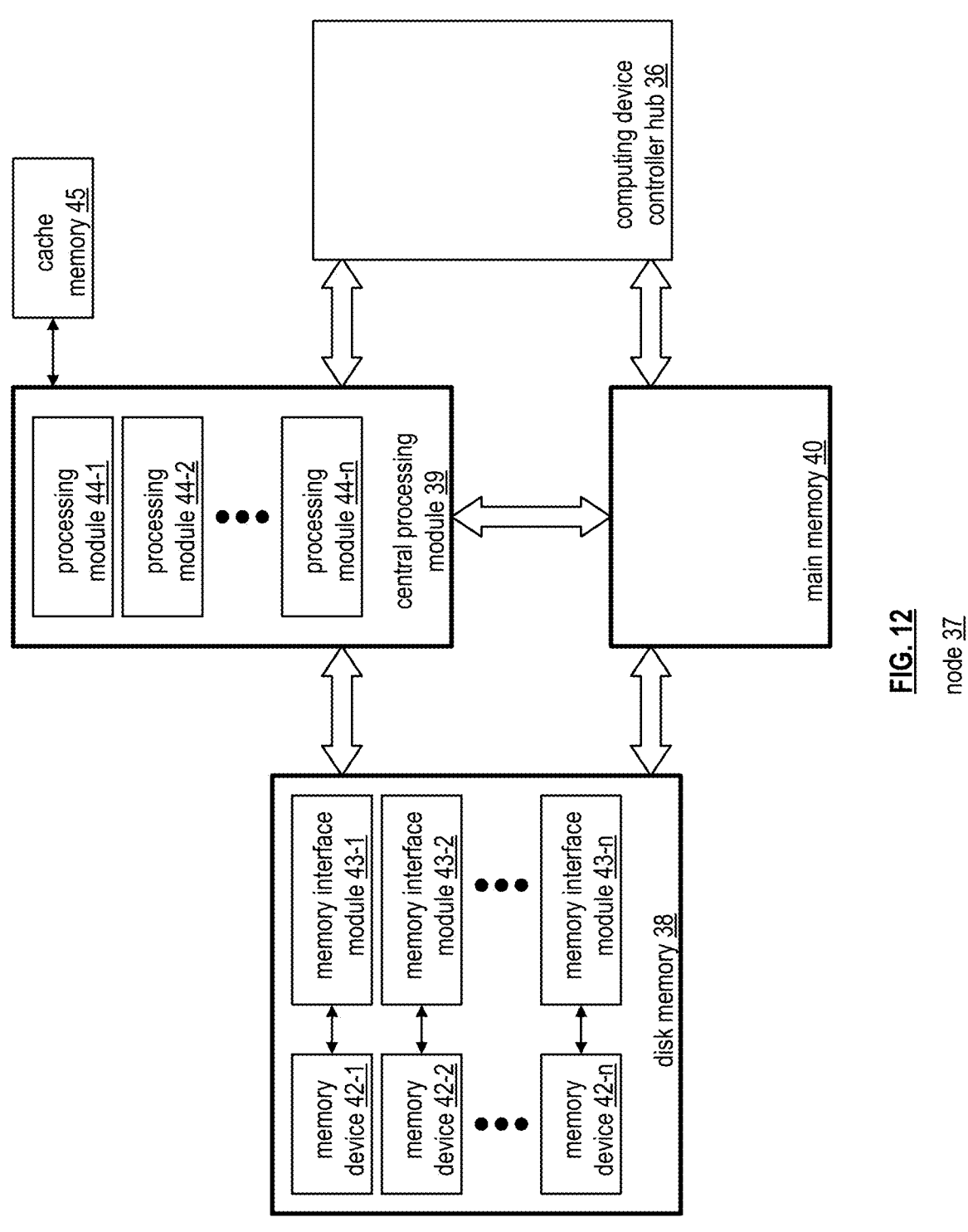
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
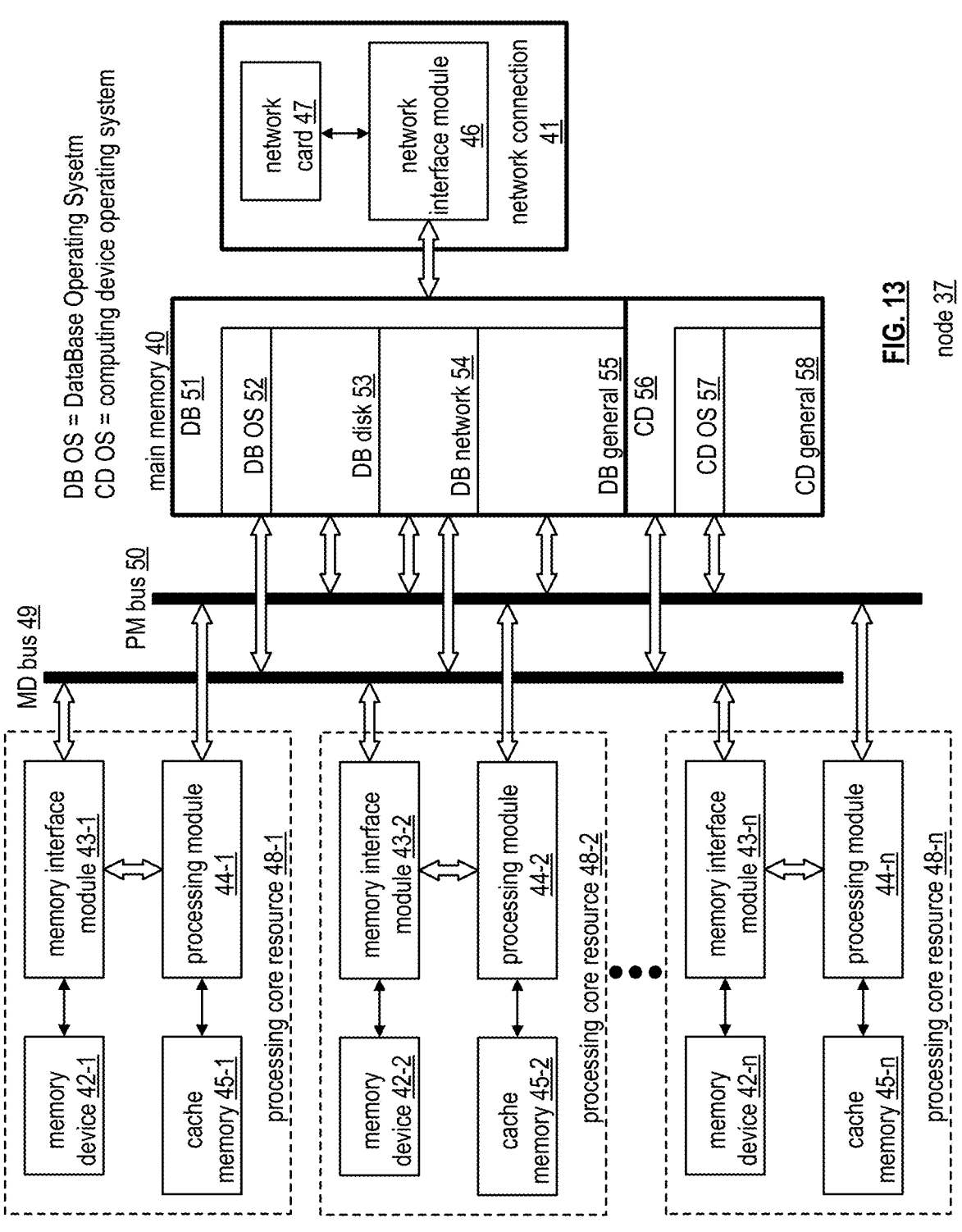
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n***. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
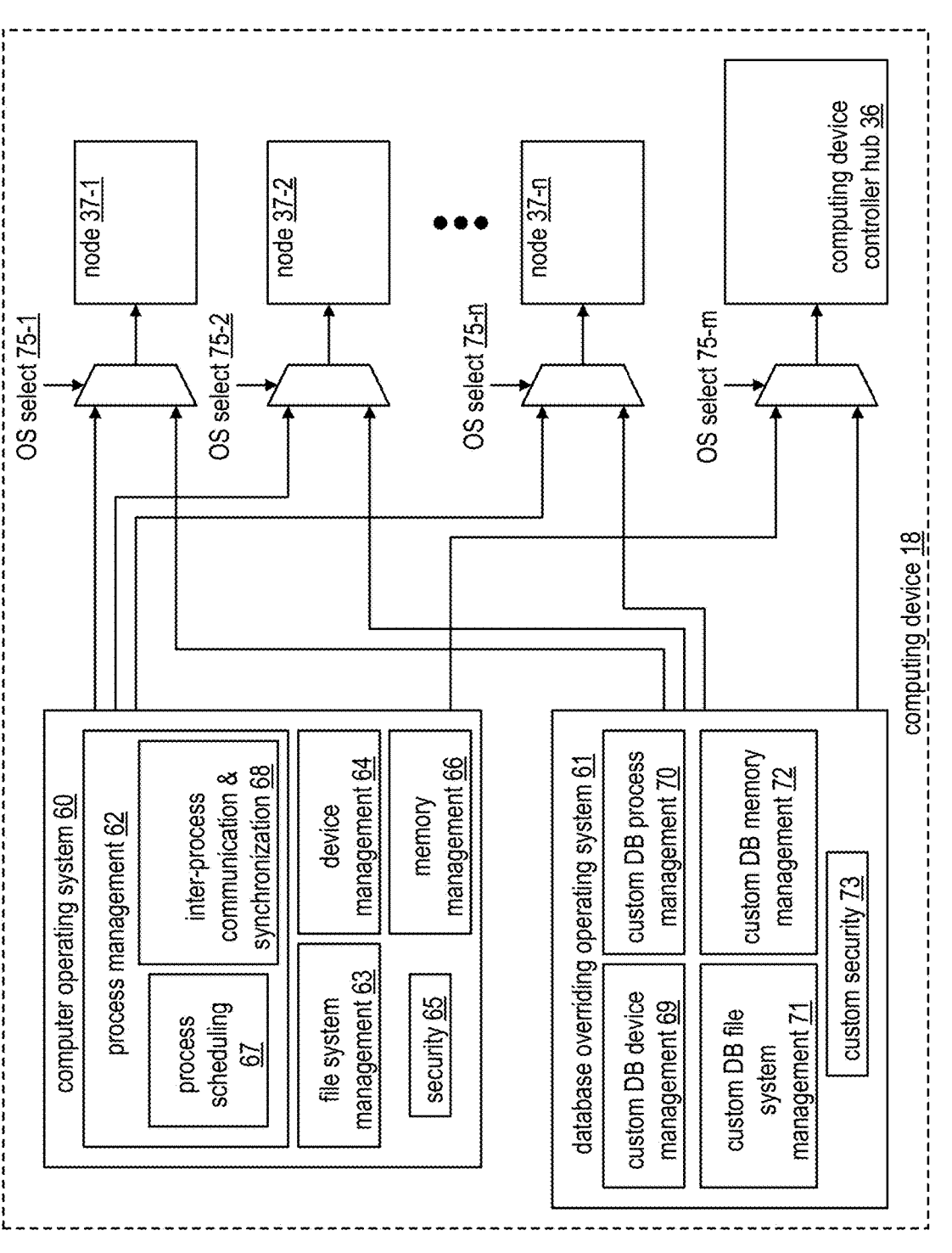
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36**). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
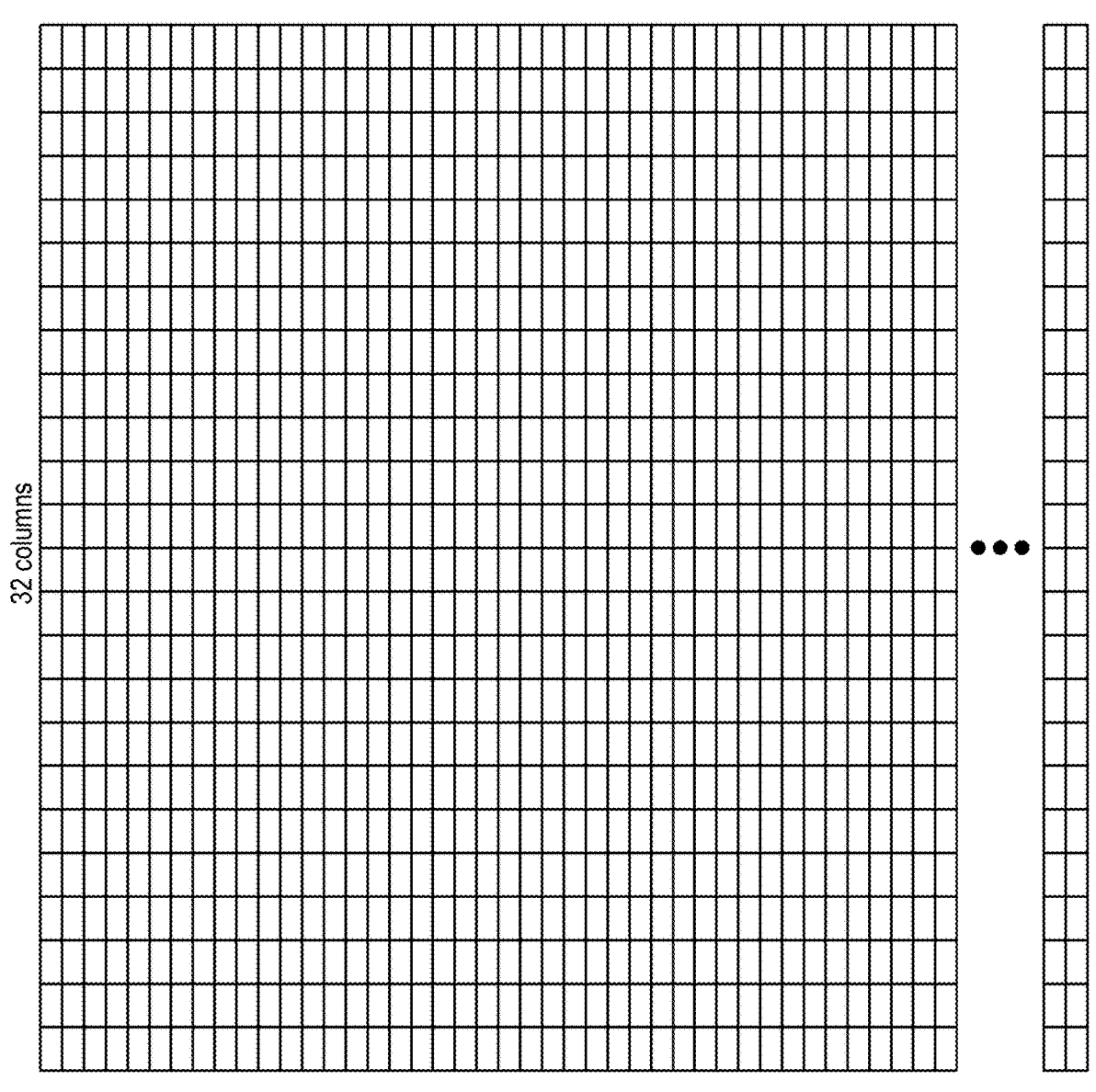

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
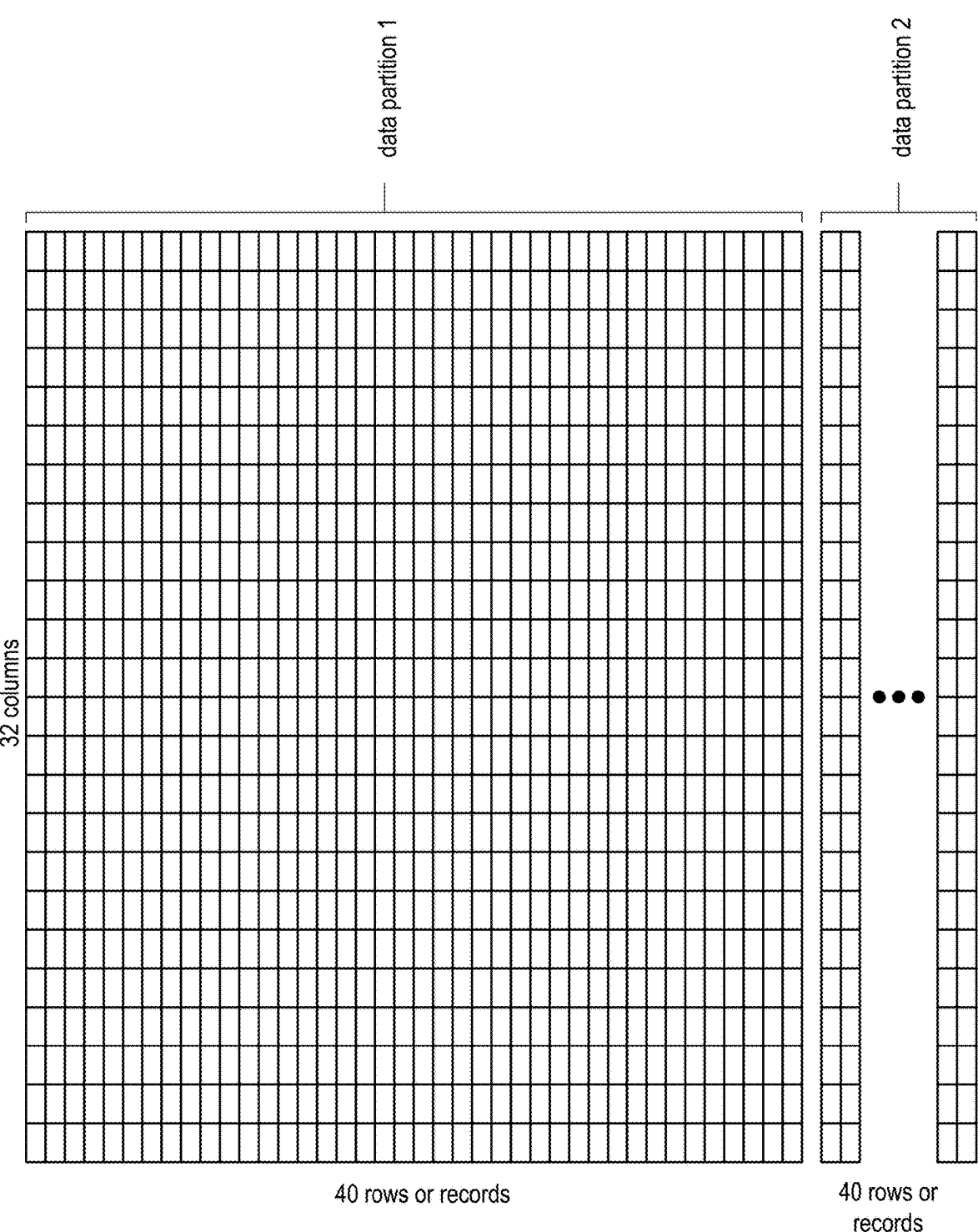

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
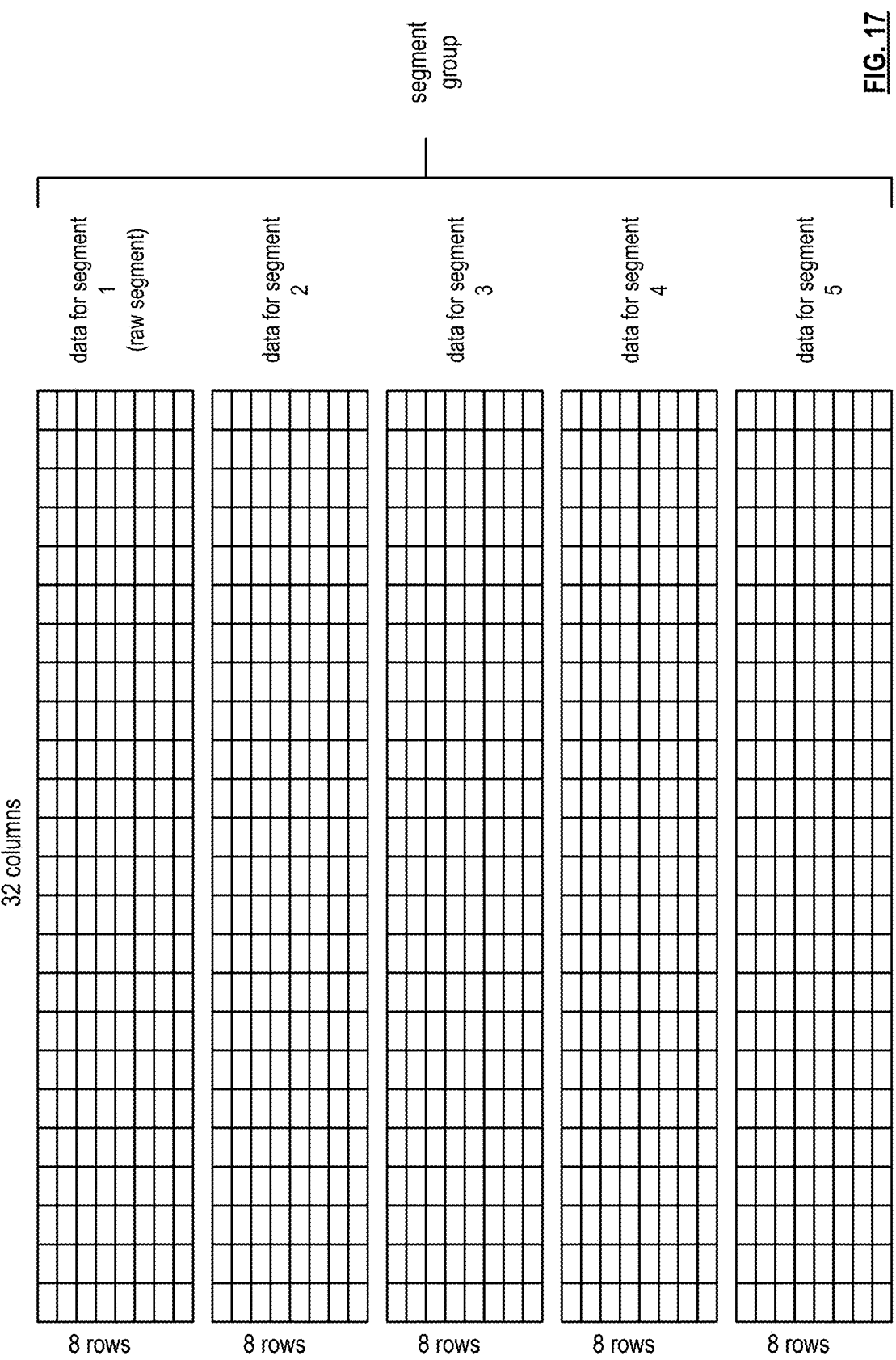

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
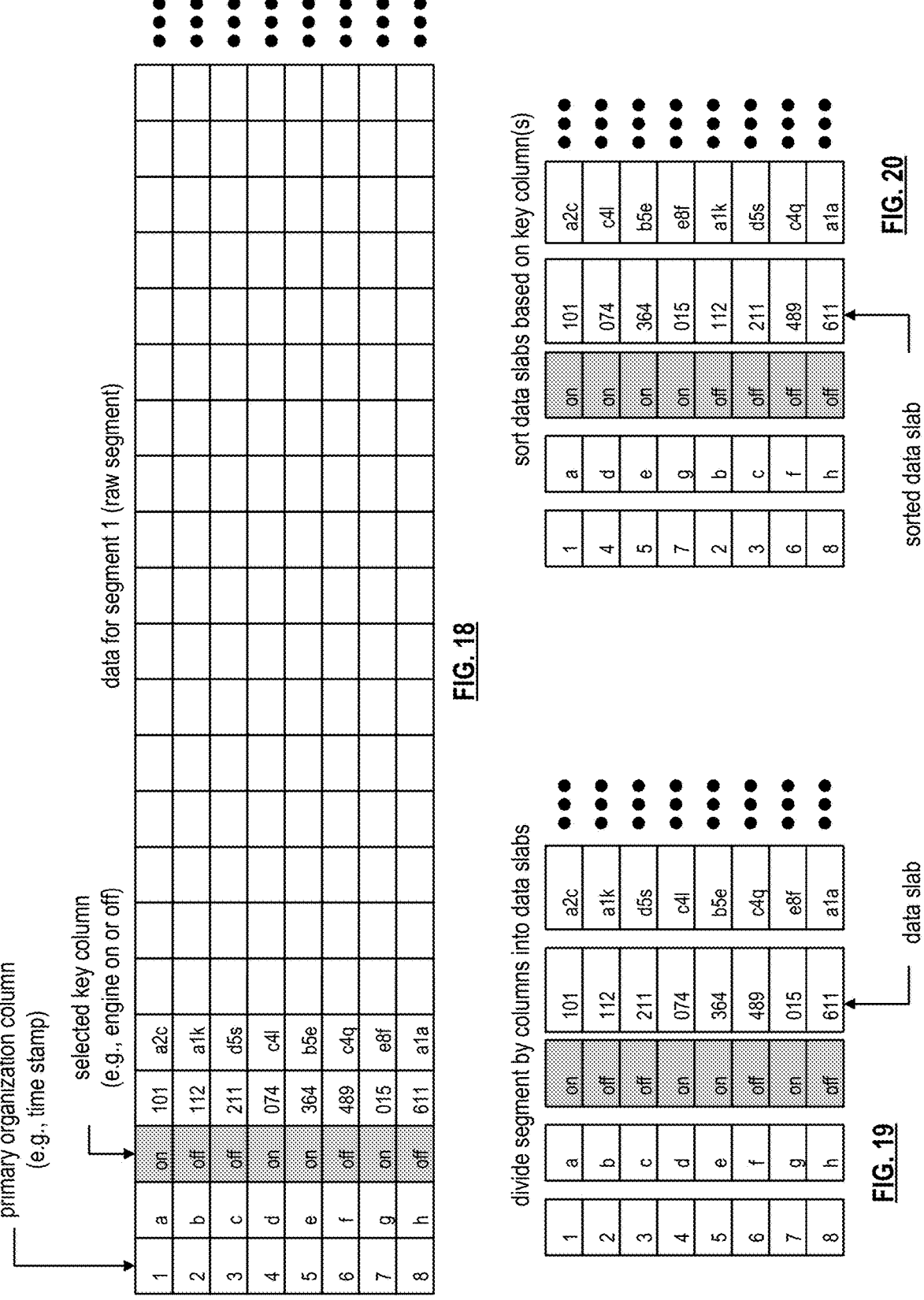

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
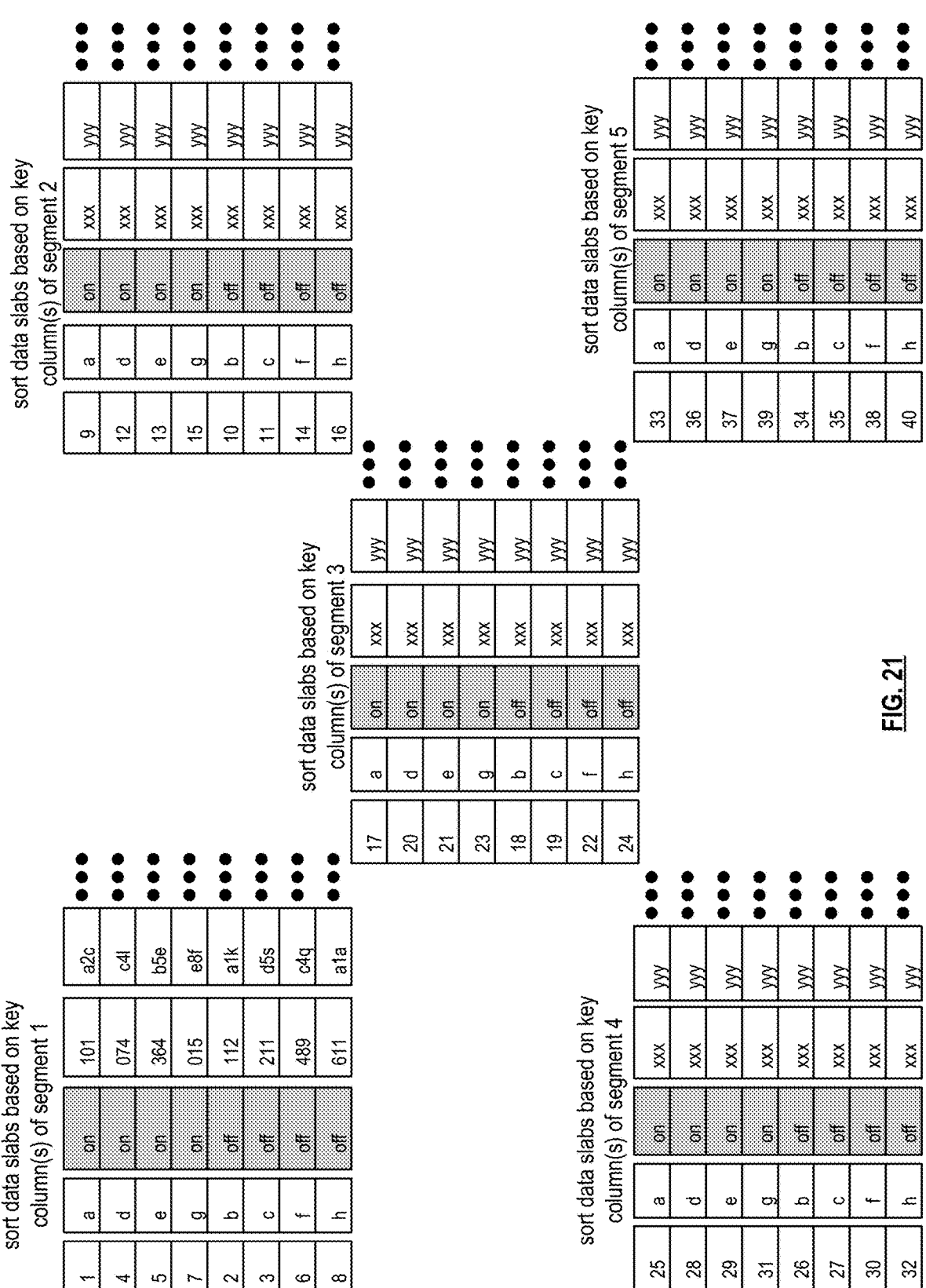

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
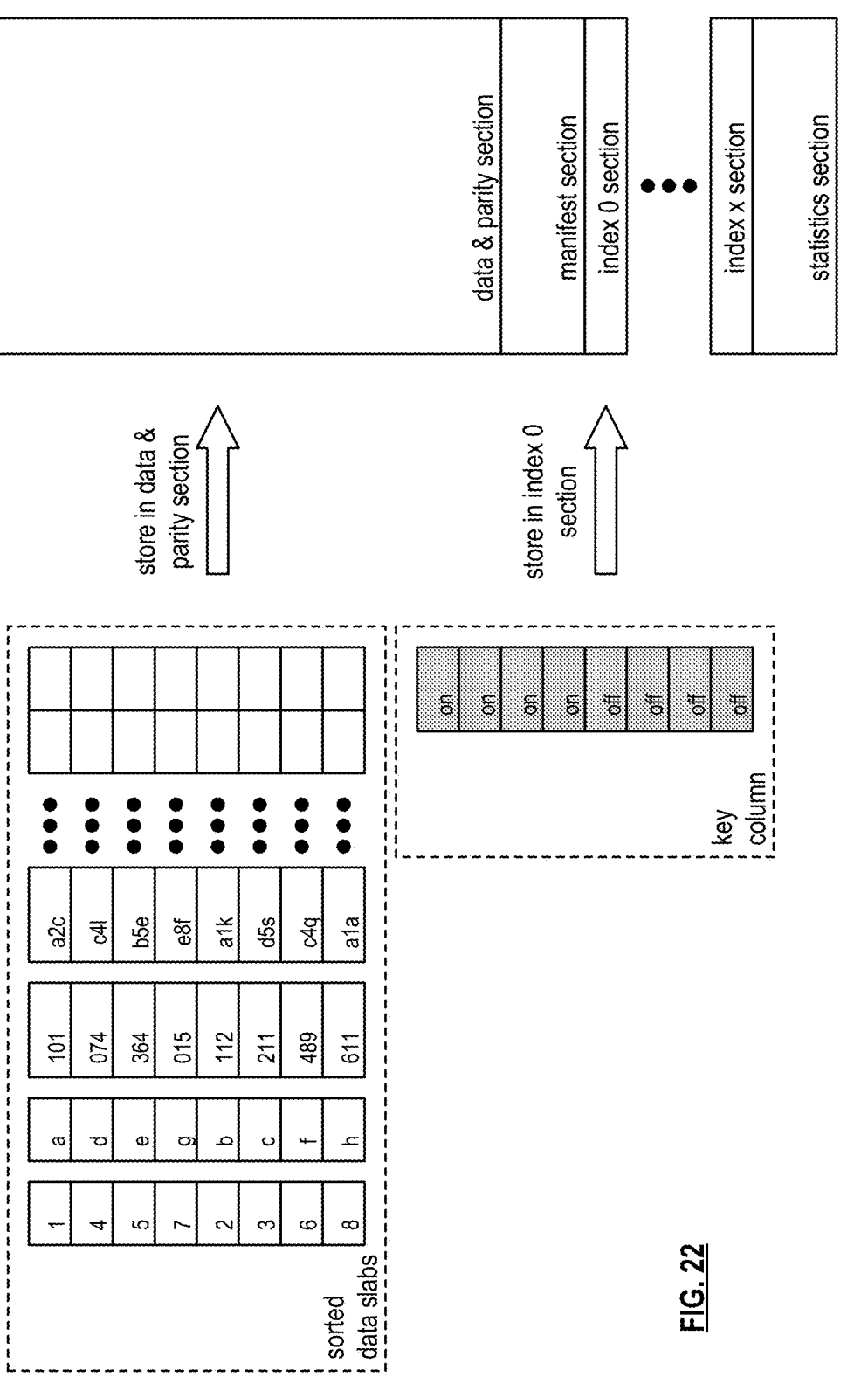

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
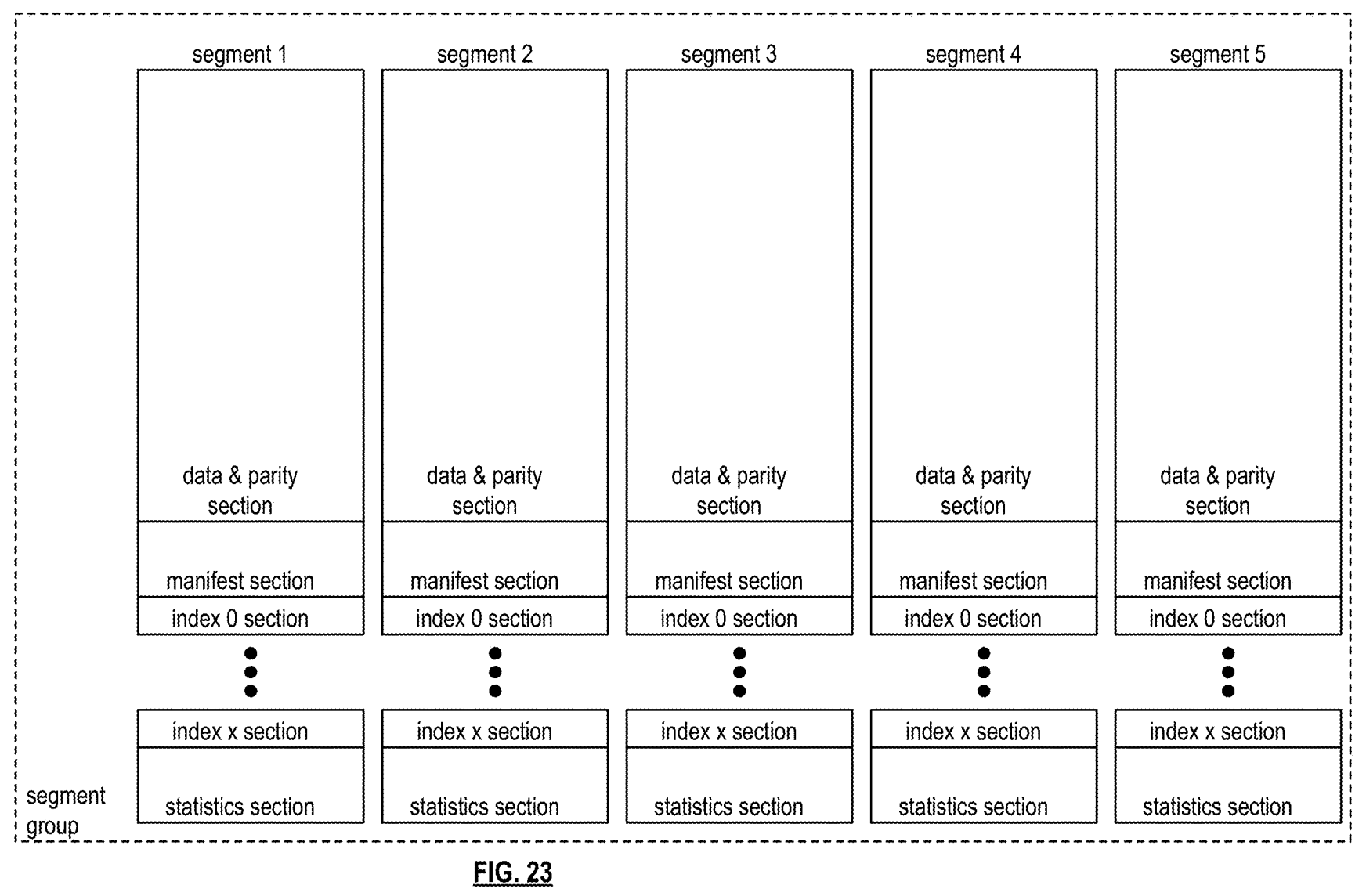

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
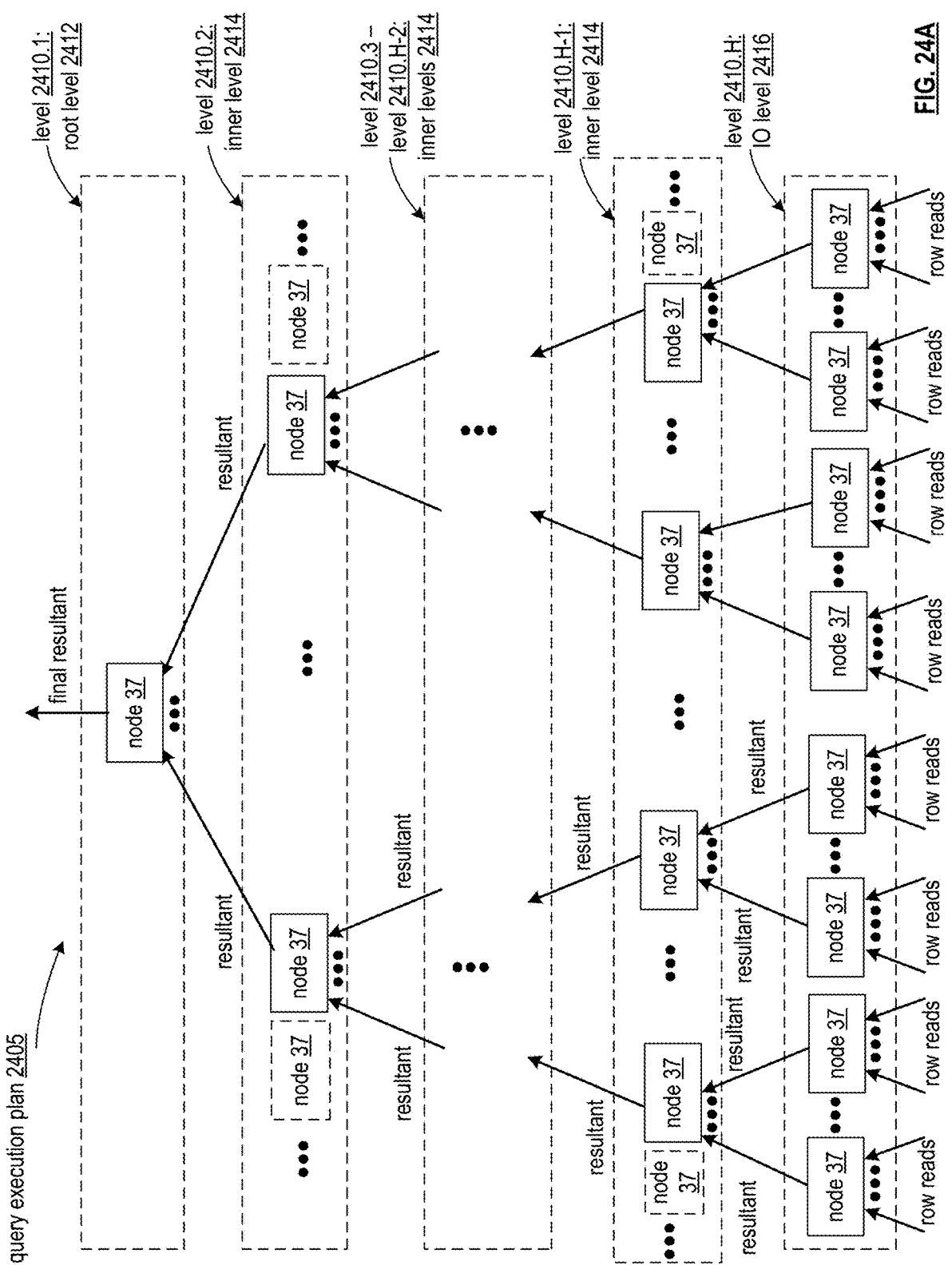
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414.

In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be gen-erated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata, such as system metadata applied across a plurality of nodes 37, for example, where at least one node 37 participates in some or all features and/or functionality of FIG. 24A based on receiving and storing the system metadata in local memory of the at least one node 37 as configuration data, such as configuration data, and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
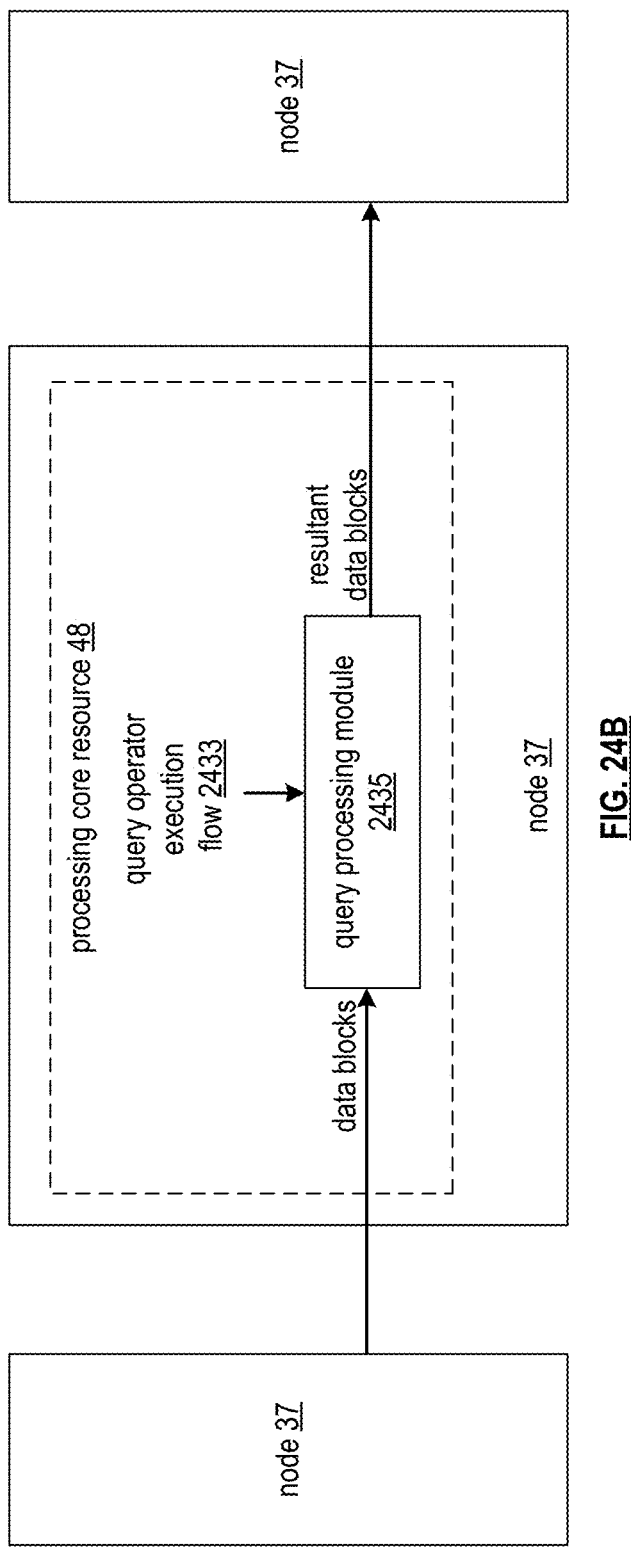
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata, such as system metadata, applied across a plurality of nodes 37 that includes the given node, for example, where the given node 37 participates in some or all features and/or functionality of FIG. 24B based on receiving and storing the system metadata in local memory of given node 37 as configuration data, and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
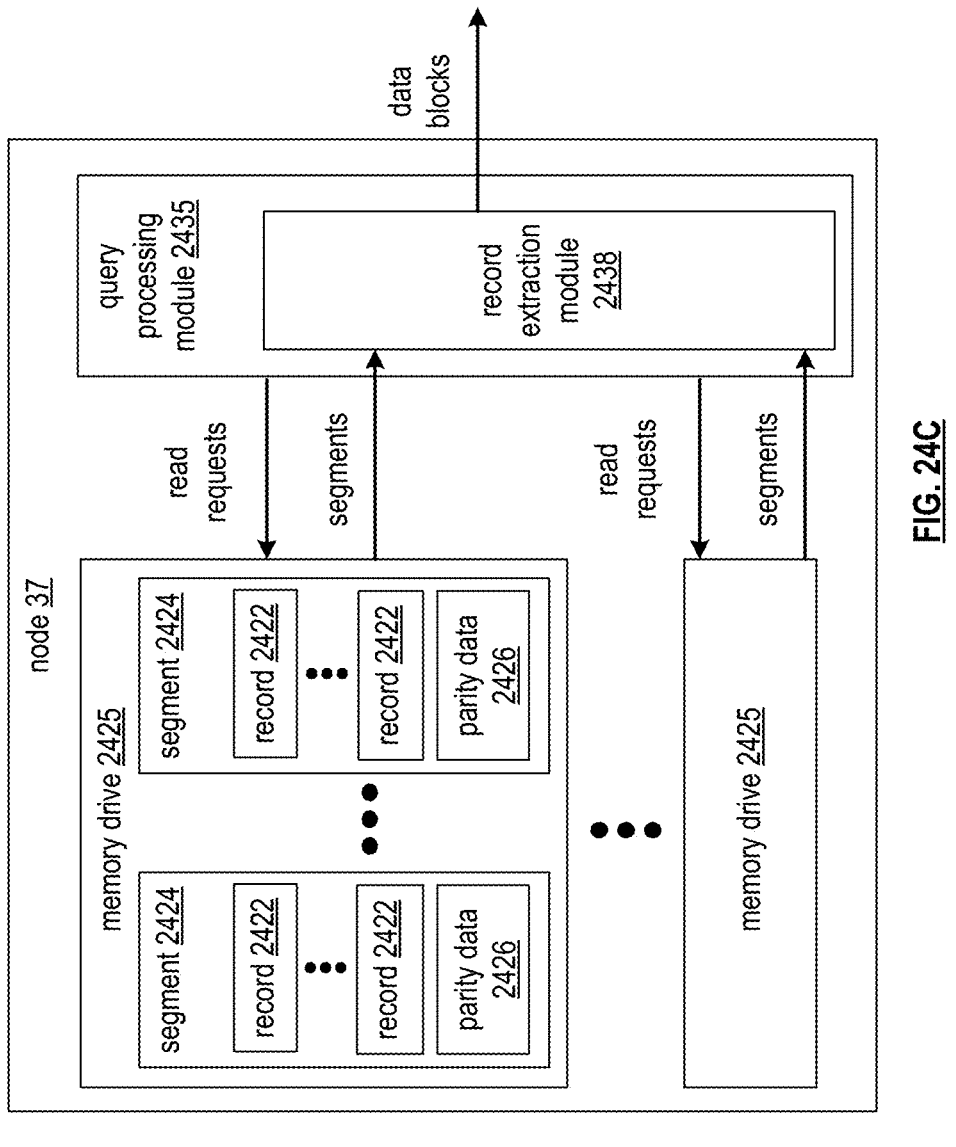

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata, such as system metadata, applied across a plurality of nodes 37 that includes the given node, for example, where the given node 37 participates in some or all features and/or functionality of FIG. 24C based on receiving and storing the system metadata in local memory of given node 37 as configuration data, and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
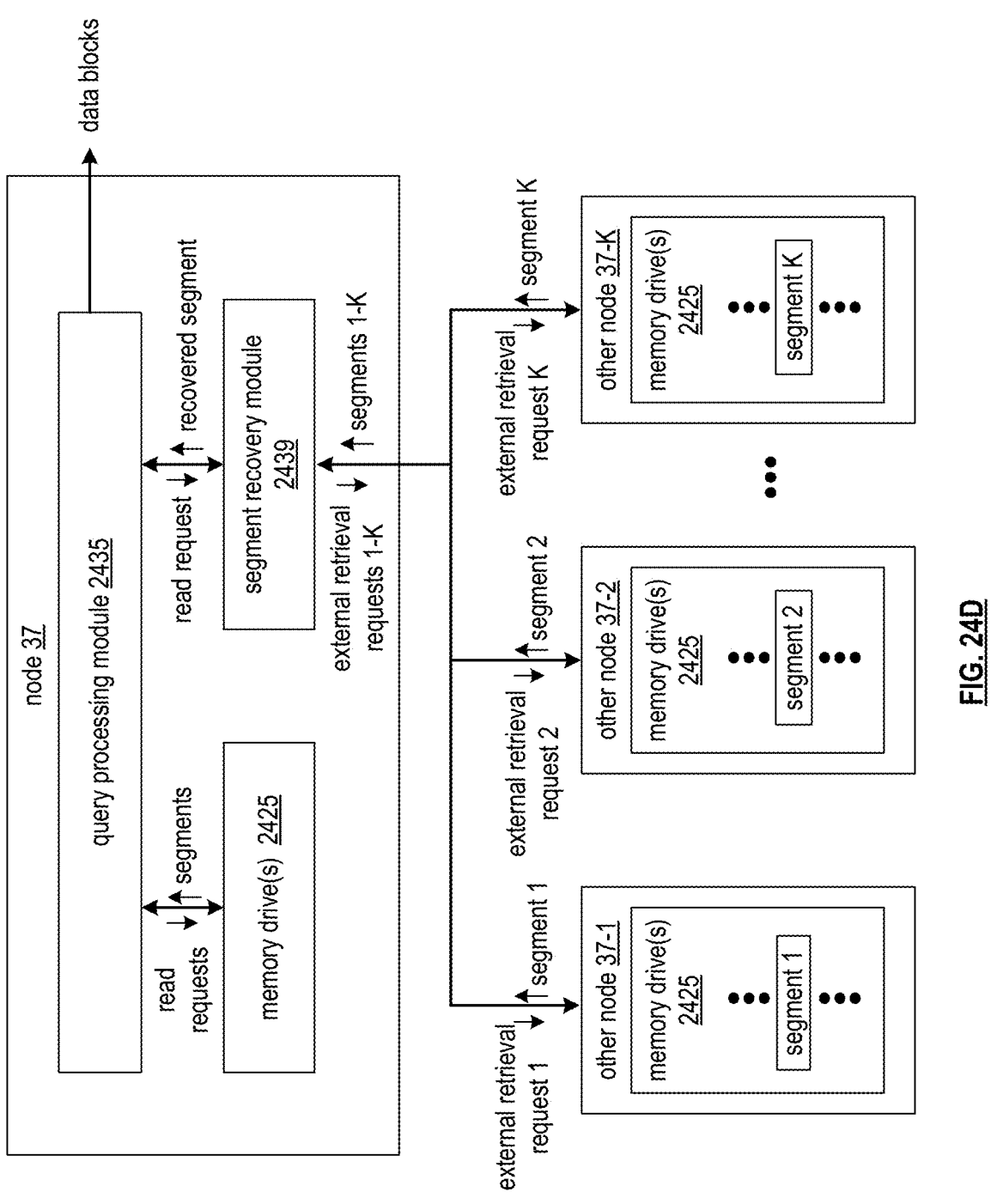

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS.

24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata, such as system metadata, applied across a plurality of nodes 37 that includes the given node, for example, where the given node 37 participates in some or all features and/or functionality of FIG. 24D based on receiving and storing the system metadata in local memory of given node 37 as configuration data, and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
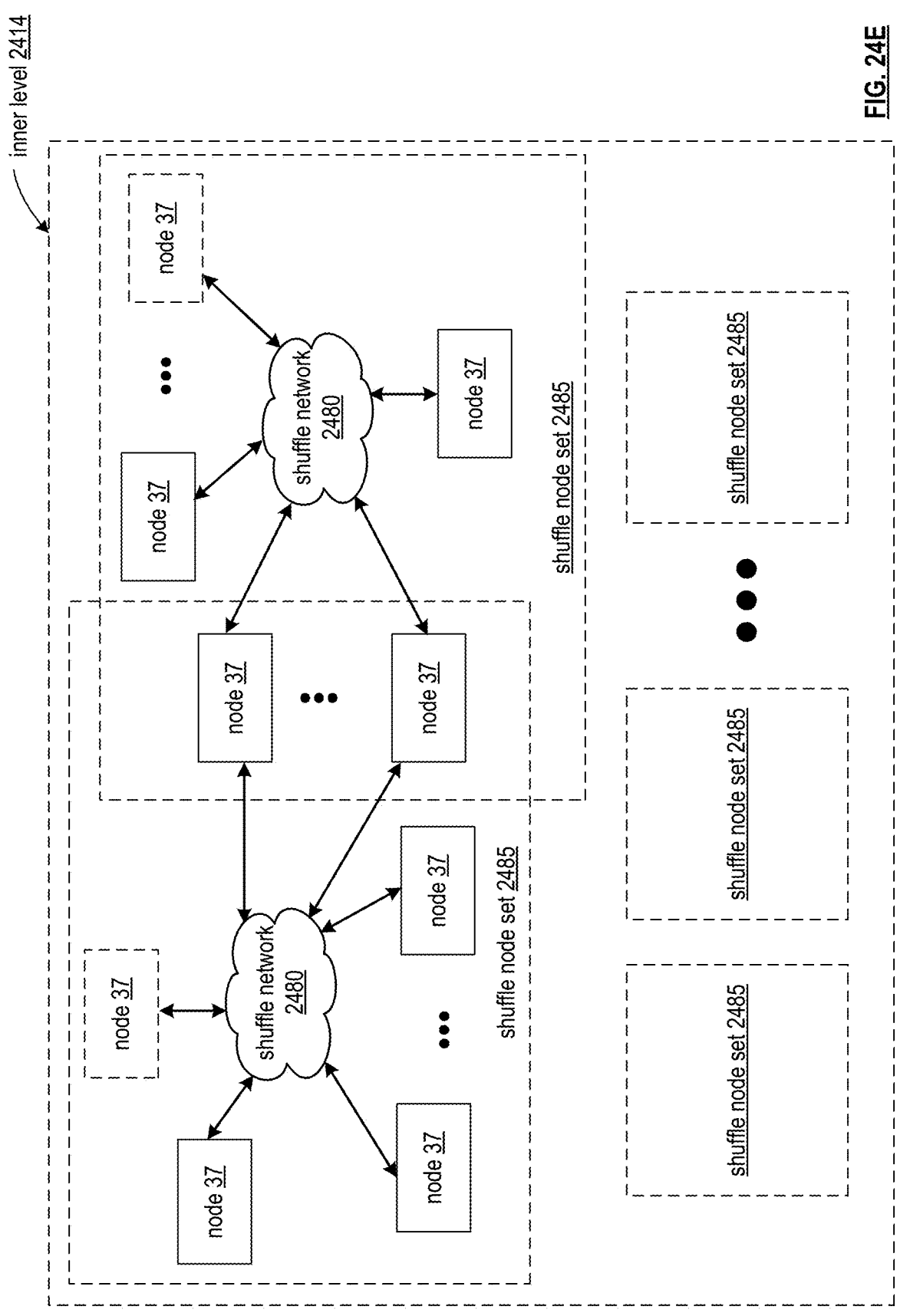
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata, such as system, applied across a plurality of nodes 37, for example, where at least one node 37 participates in some or all features and/or functionality of FIG. 24E based on receiving and storing the system metadata in local memory of the at least one node 37 as configuration data, and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
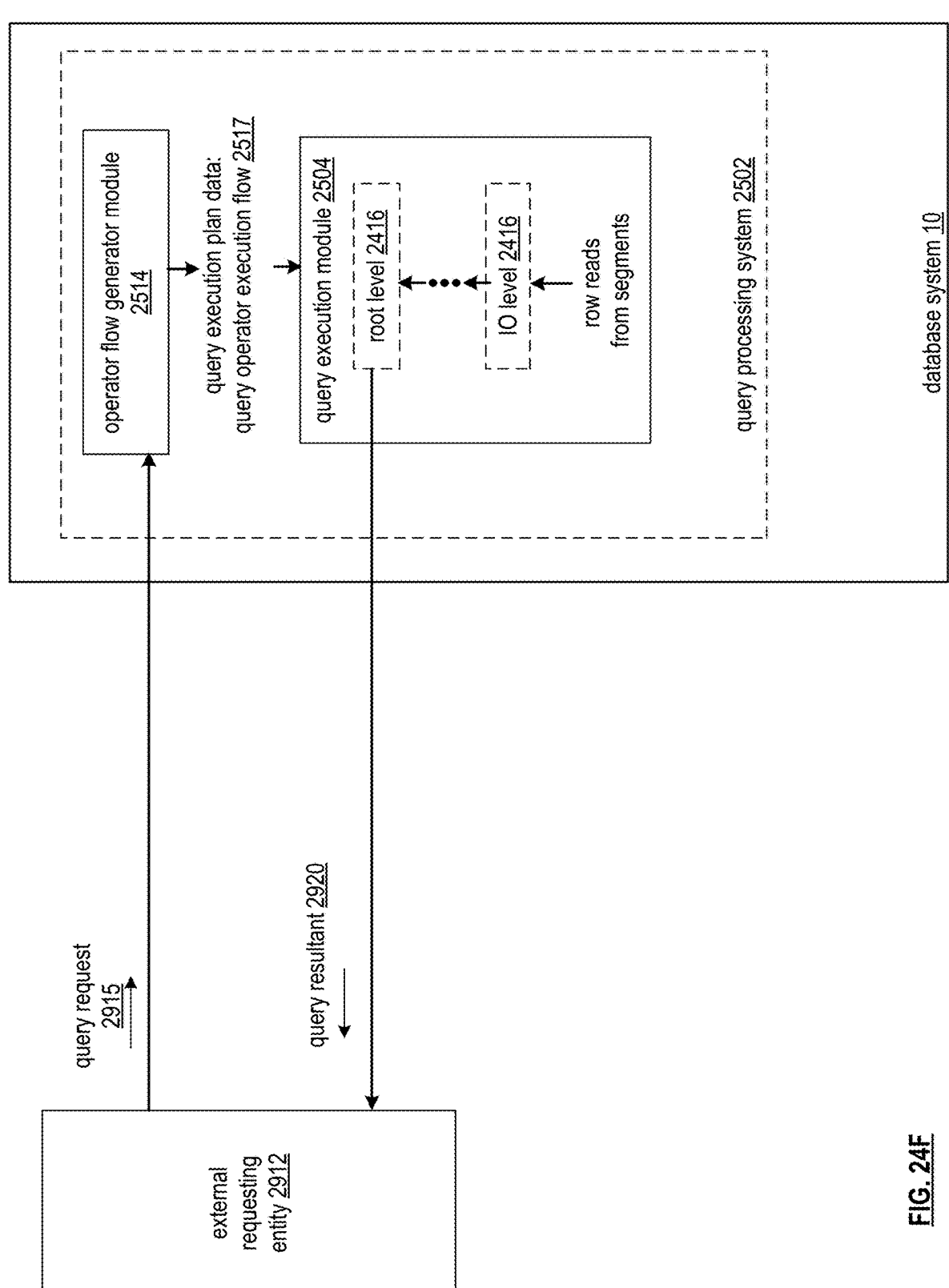
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2915. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2915 for execution via the database system 10, where the corresponding query resultant 2920 is transmitted back to the computing device, for example, for storage by the computing device and/or for display to the corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
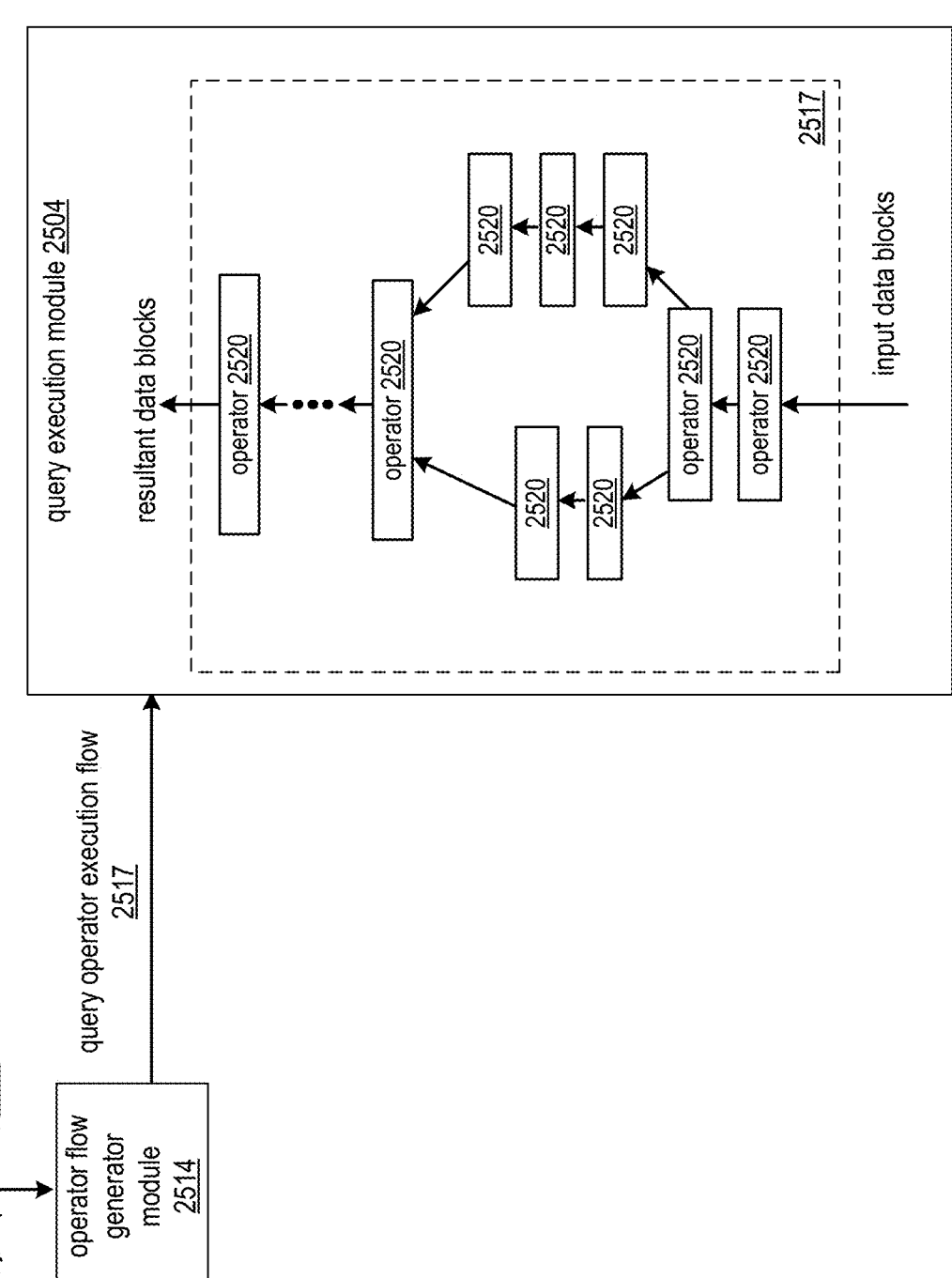
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24H:
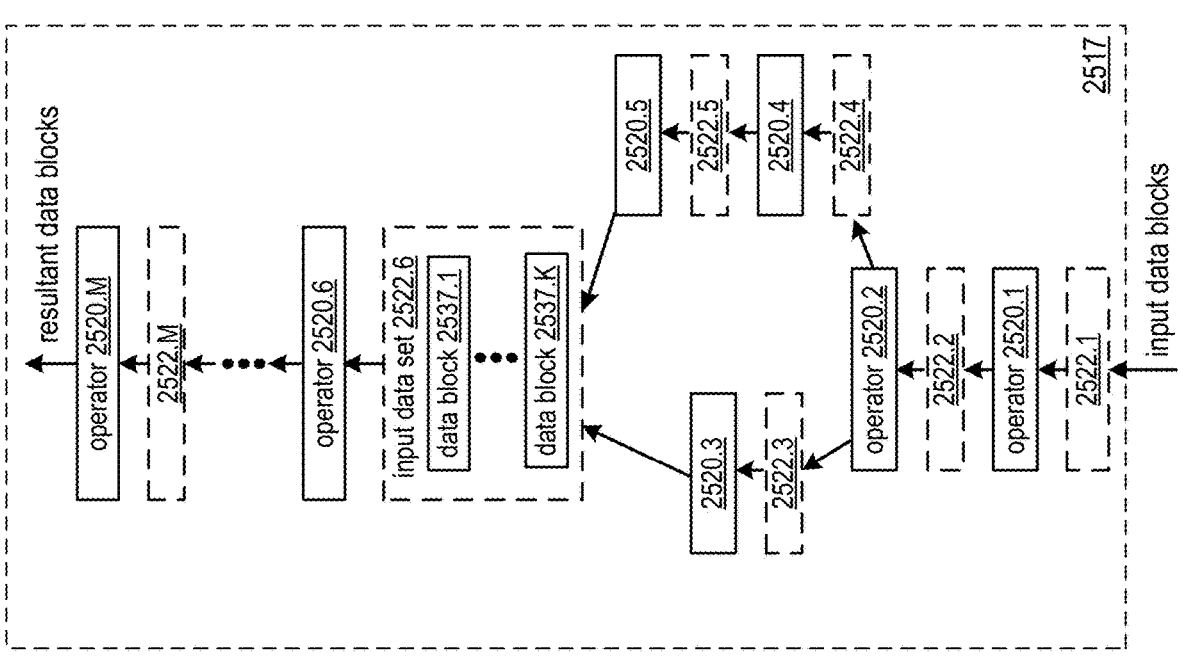
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.i this common query operator execution flow 2433 can be sent to the one or more other nodes 37 in a same shuffle node set as input data blocks to be added to the input data set 2522 the next operator 2520.i+1, with respect to the serialized ordering of the query of this common query operator execution flow 2433 of the one or more other nodes 37. For example, the output generated via a node's execution of a particular operator 2520.i is added input data set 2522 the next operator 2520.i+1 of the same node's query operator execution flow 2433 based on being serially next in the sequential ordering and/or is alternatively or additionally added to the input data set 2522 of the next operator 2520.i+1 of the common query operator execution flow 2433 of the one or more other nodes in a same shuffle node set based on being serially next in the sequential ordering.

In some cases, in addition to a particular node sending this output generated via a node's execution of a particular operator 2520.i to one or more other nodes to be input data set 2522 the next operator 2520.i+1 in the common query operator execution flow 2433 of the one or more other nodes 37, the particular node also receives output generated via some or all of these one or more other nodes' execution of this particular operator 2520.i in their own query operator execution flow 2433 upon their own corresponding input data set 2522 for this particular operator. The particular node adds this received output of execution of operator 2520.i by the one or more other nodes to the be input data set 2522 of its own next operator 2520.i+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.i+1 corresponds to and/or is utilized to implement JOIN operator and/or a custom-join operator of the query operator execution flow 2517, and where the operator 2520.i+1 thus utilizes input received from many different nodes in the shuffle node set in accordance with their performing of all of the operators serially before operator 2520.i+1 to generate the input to operator 2520.i+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data, and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
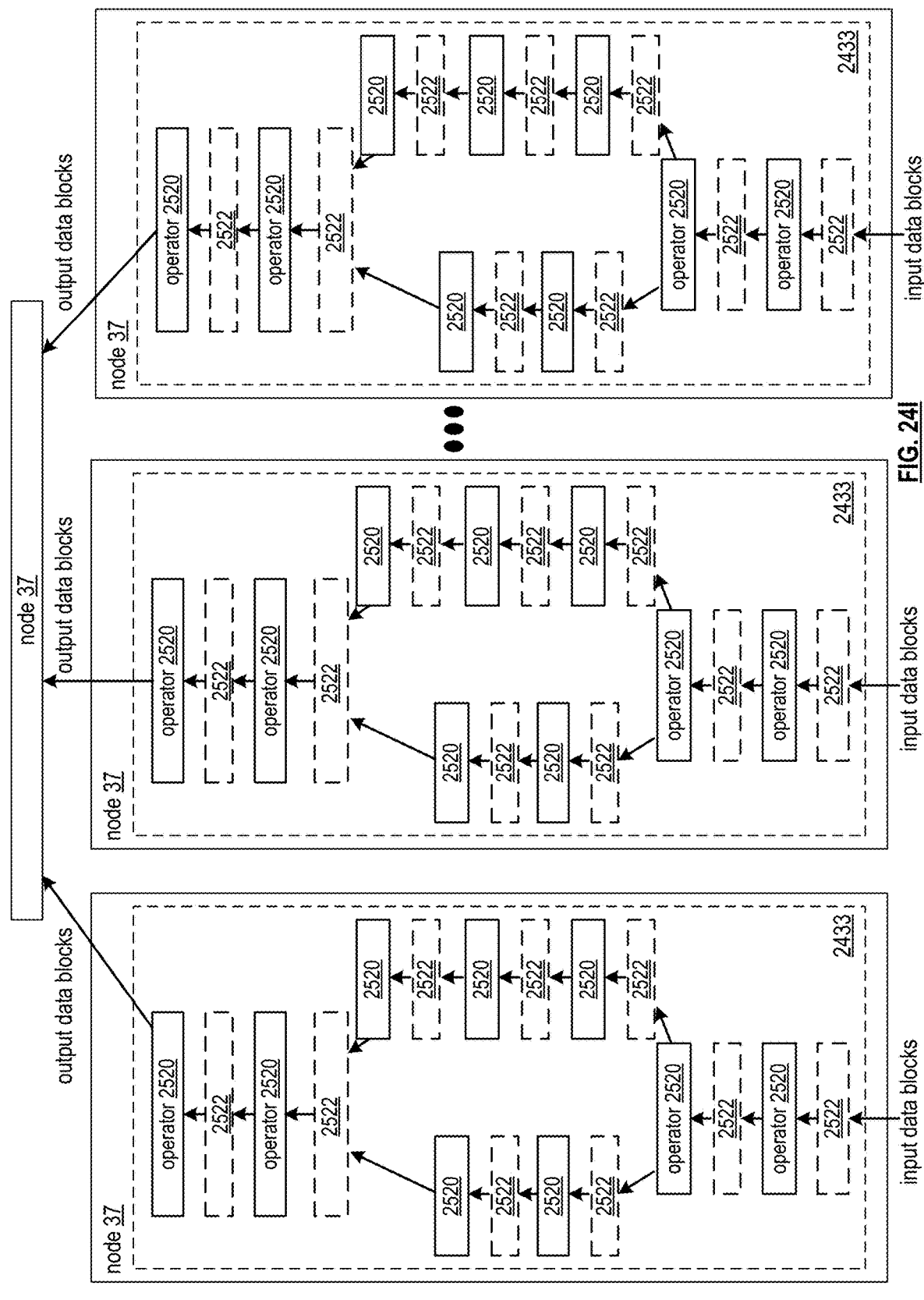
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
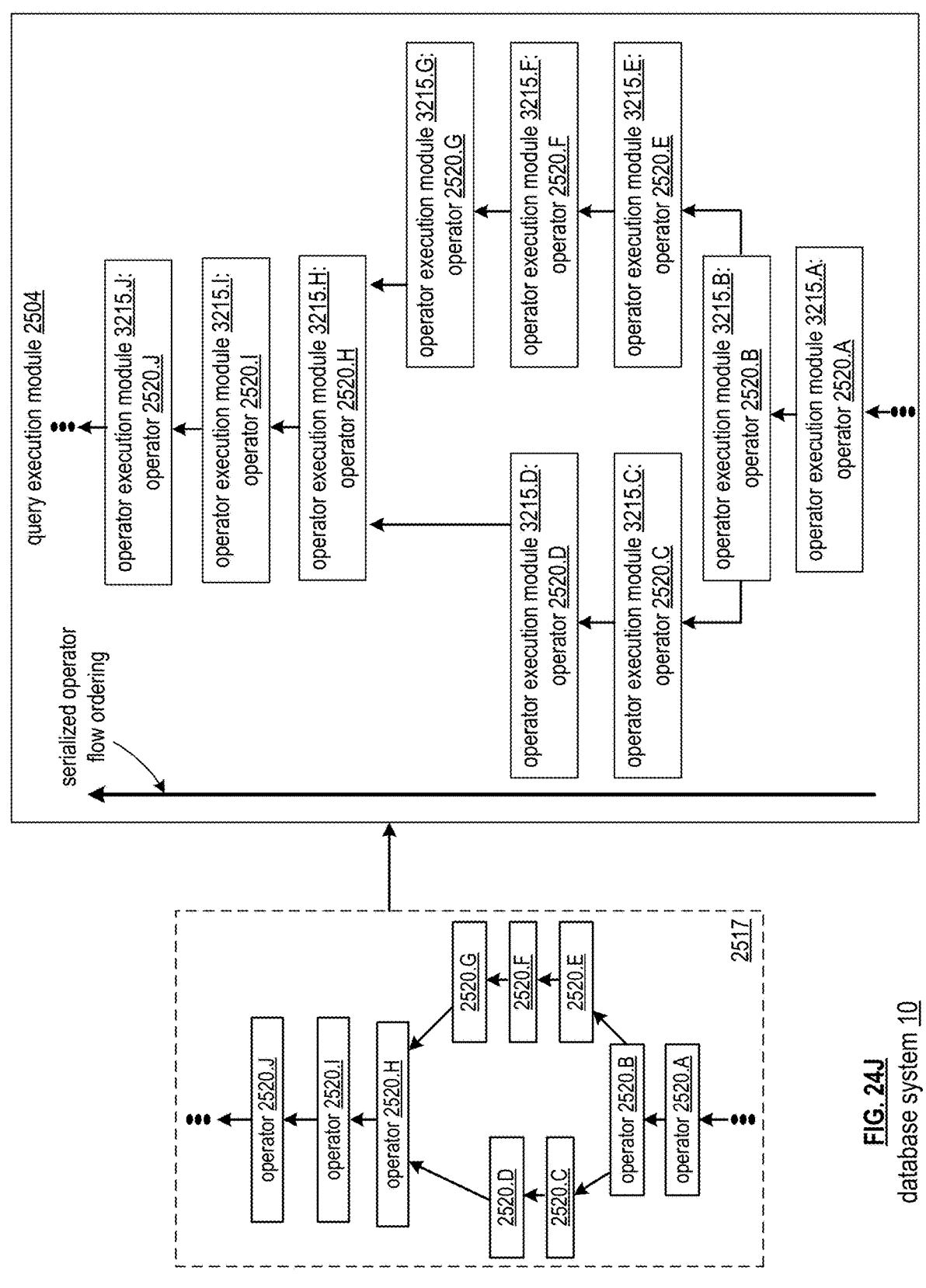
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
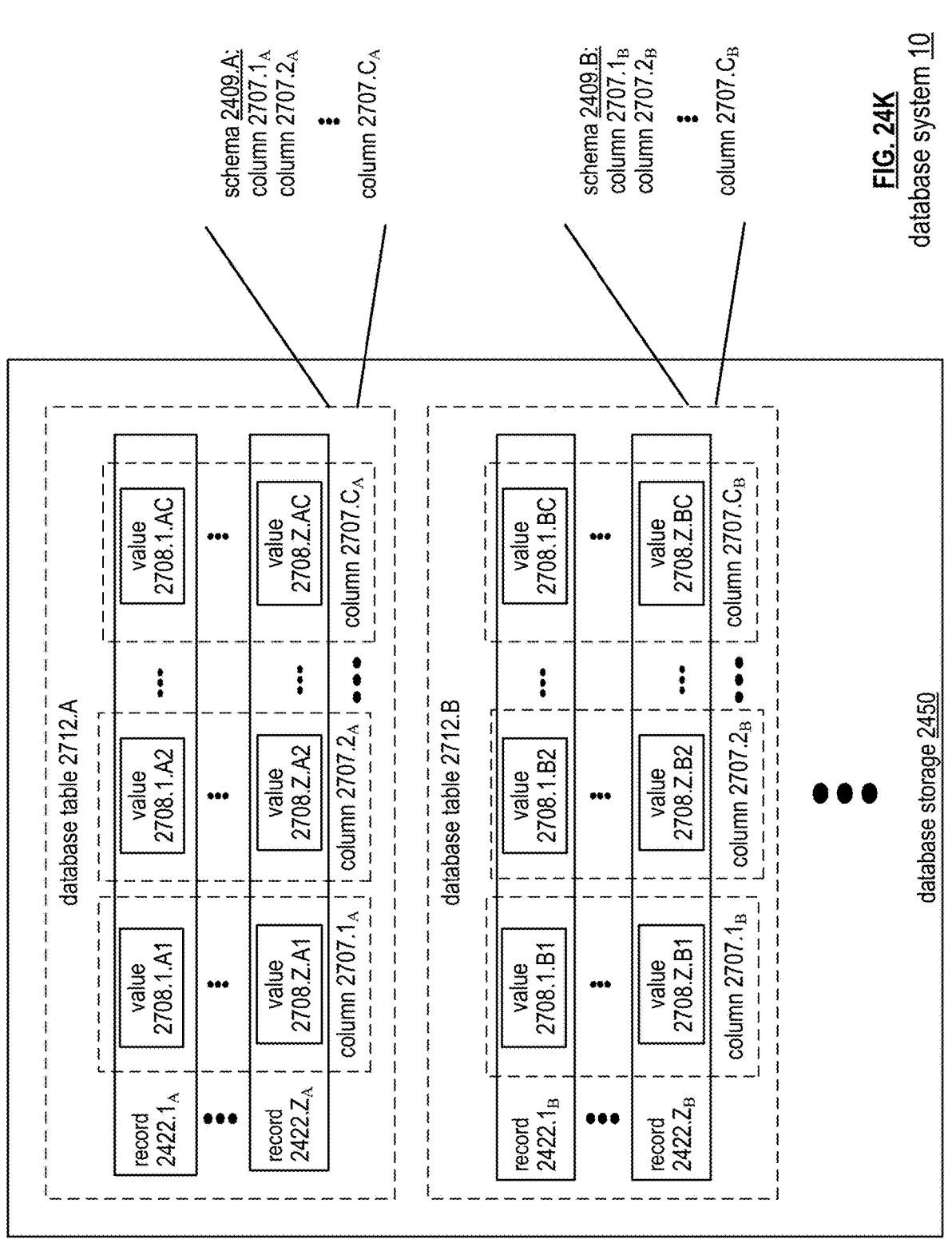
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709.A for database table 2712.A can have a different number of columns than and/or can have different datatypes for some or all columns of the set of columns $2707.1B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
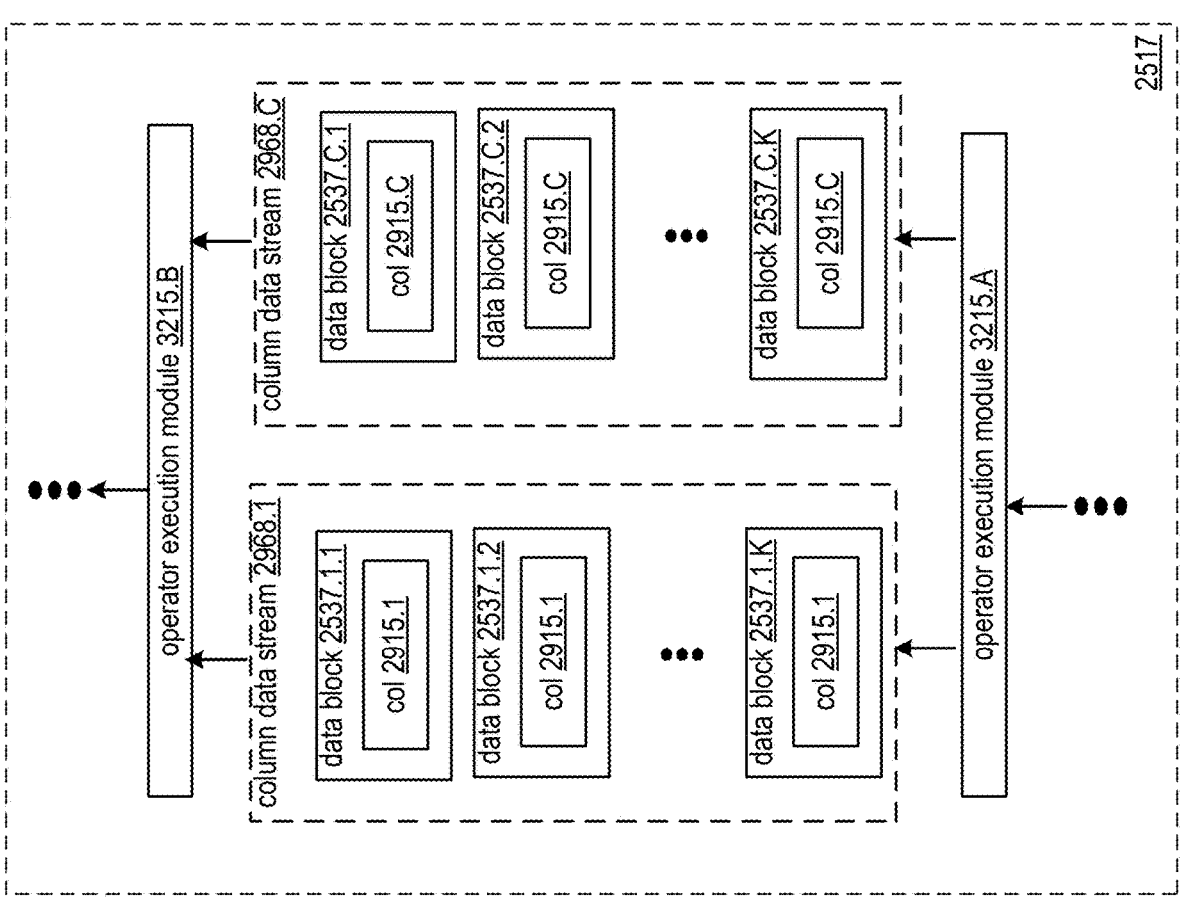
FIG. 24L is a schematic block diagram of a query execution module that implements a plurality of column data streams in accordance with various embodiments.
Figure 24M:
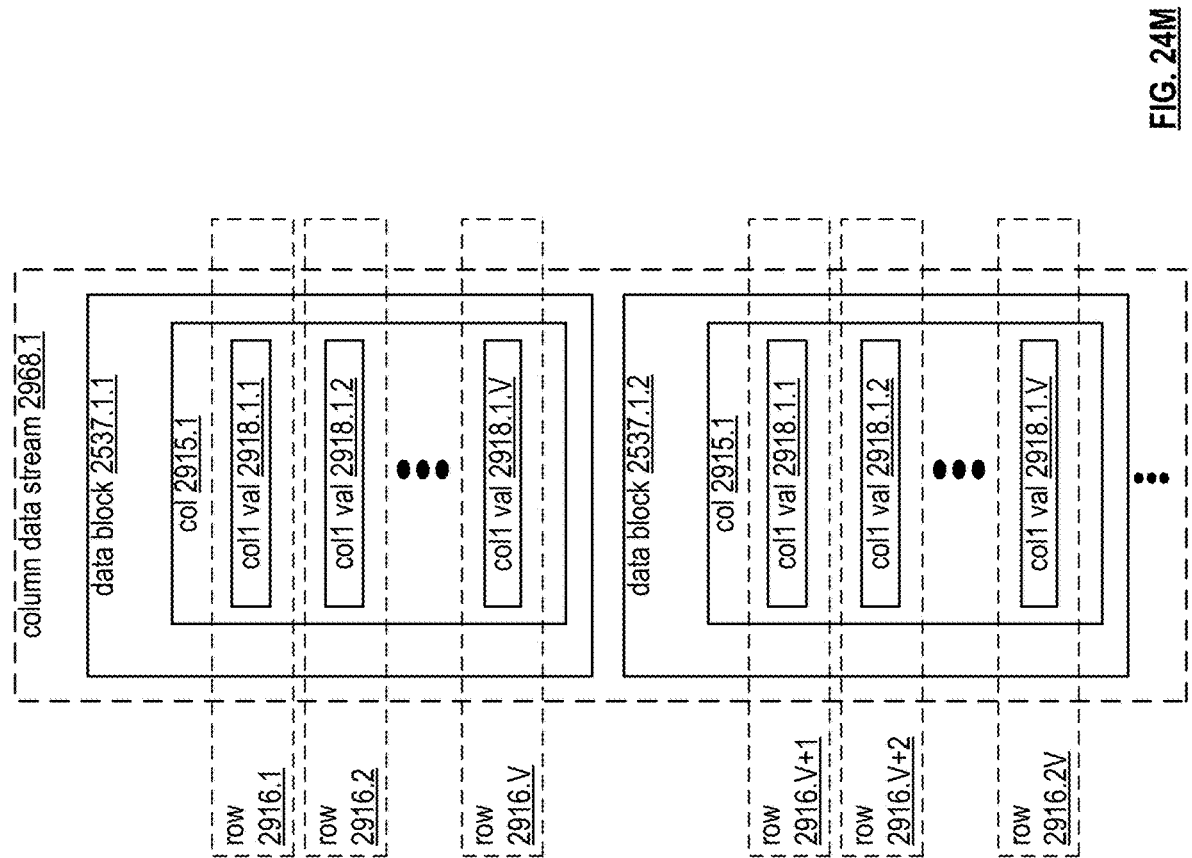
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
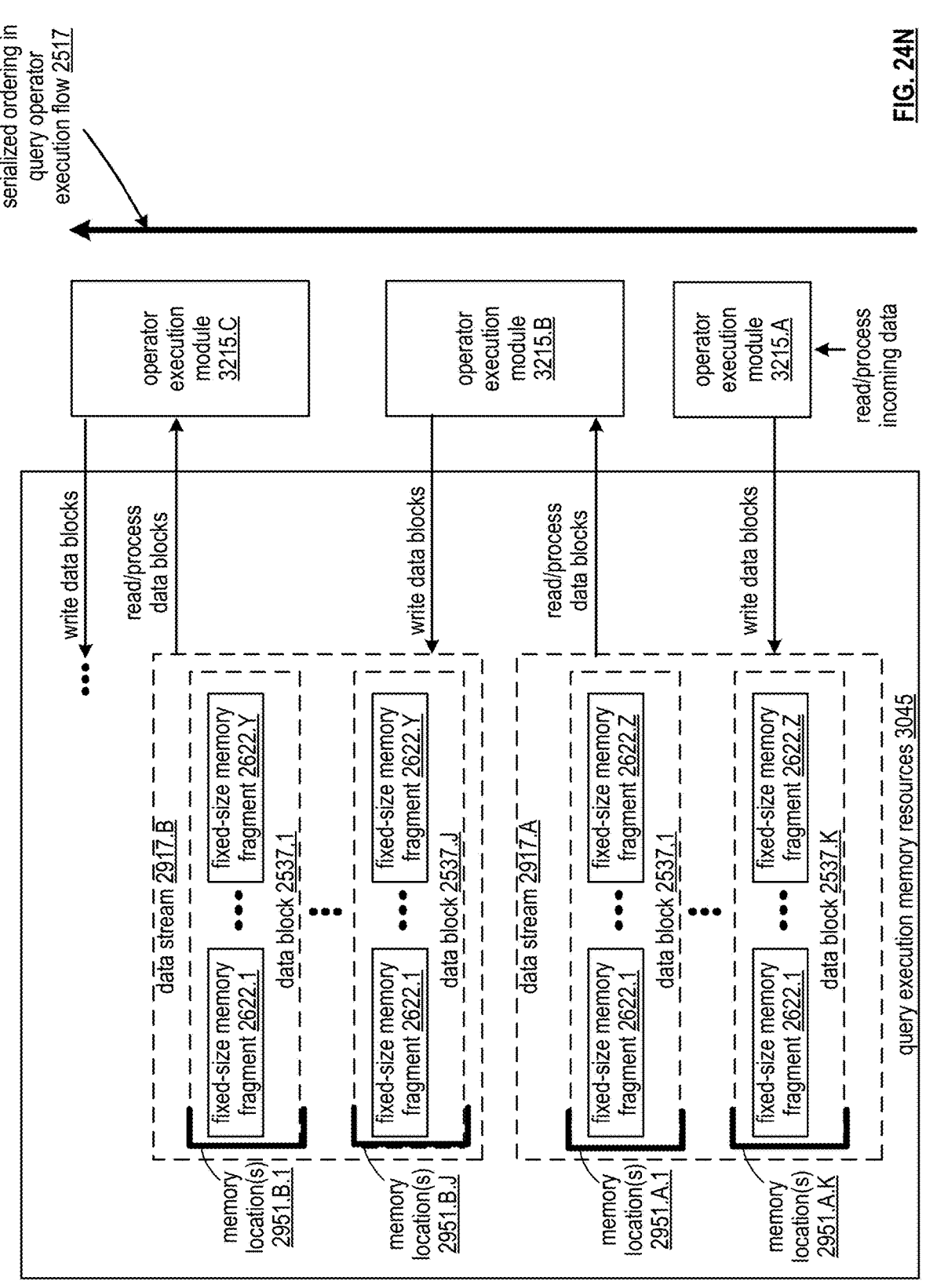
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622. Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/ or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding output-ted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 24O:
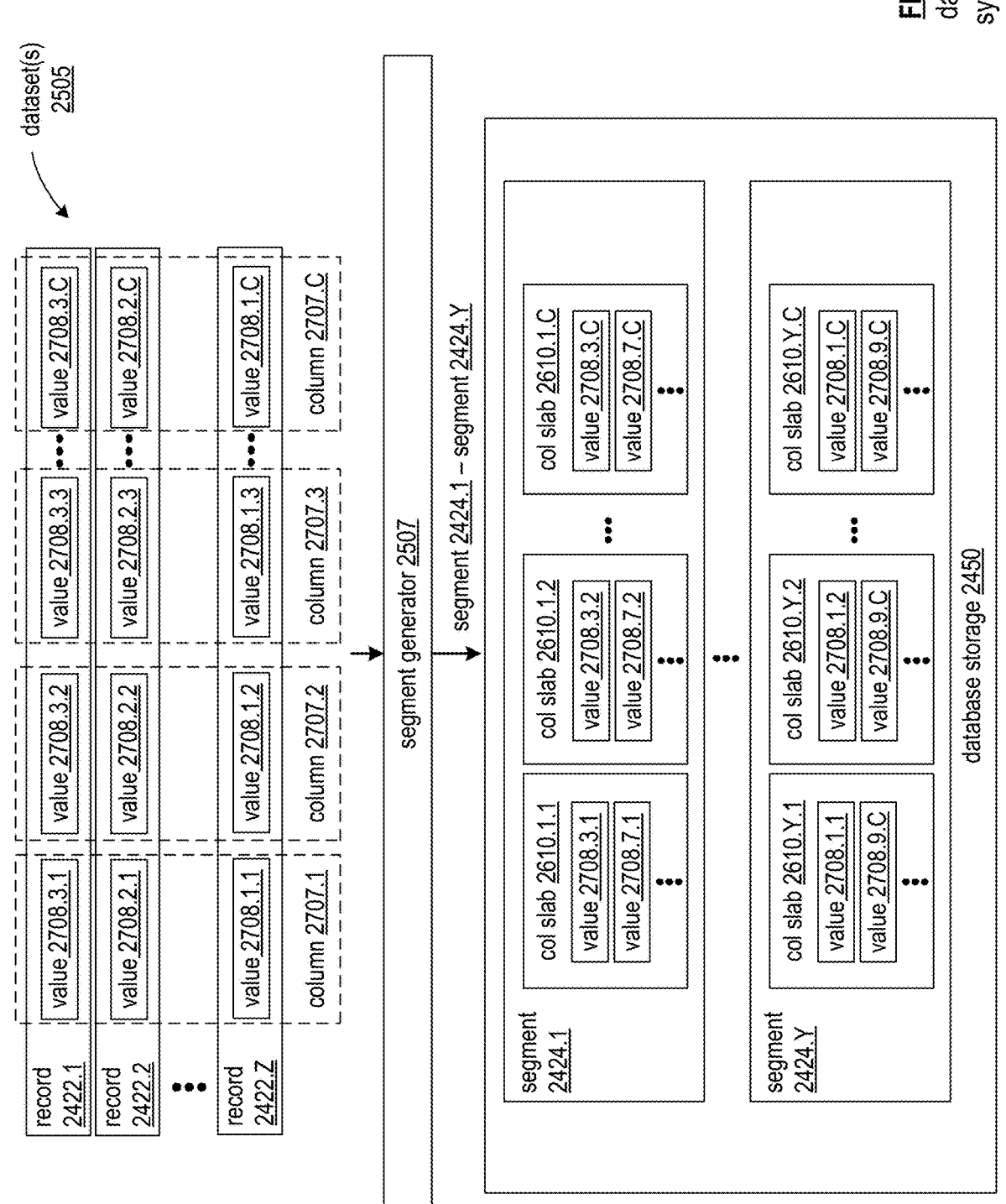
FIG. 24O is a schematic block diagram of a database system that implements a segment generator that generates segments from a plurality of records in accordance with various embodiments.

FIG. 24O illustrates an embodiment of a database system 10 that implements a segment generator 2507 to generate segments 2424. Some or all features and/or functionality of the database system 10 of FIG. 24O can implement any embodiment of the database system 10 described herein. Some or all features and/or functionality of segments 2424 of FIG. 24O can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/ data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/ read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24P:
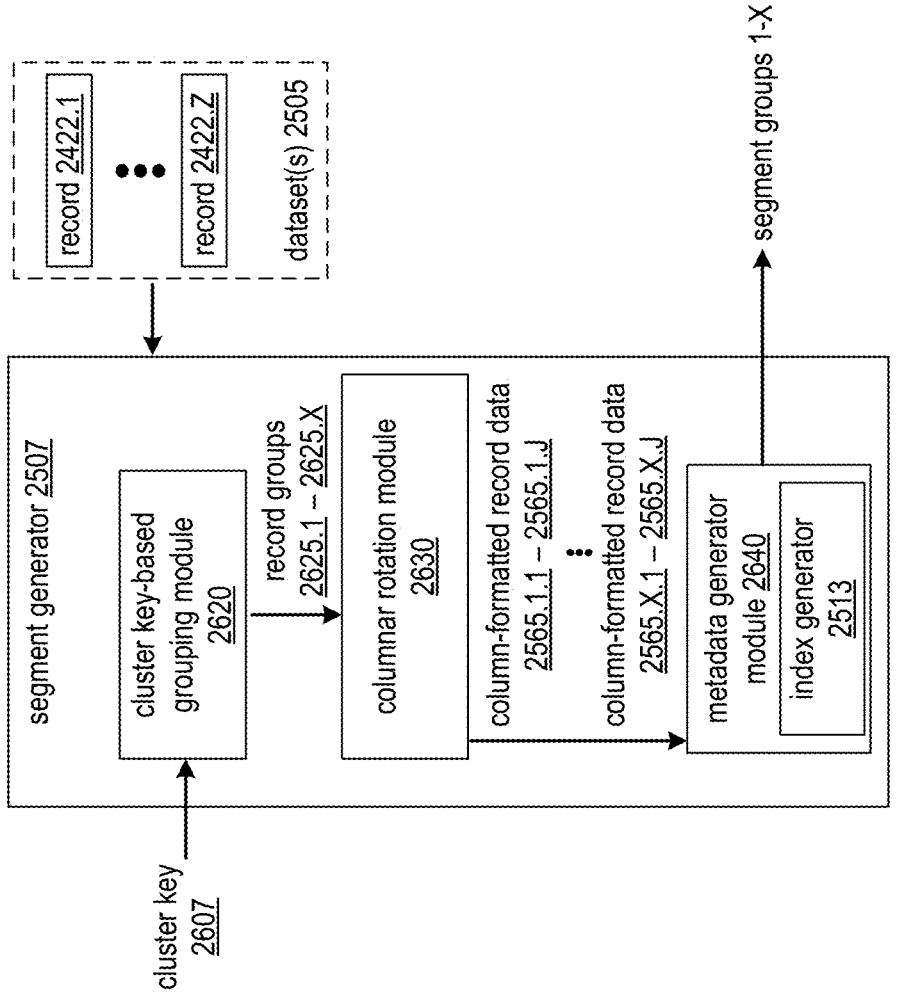
FIG. 24P is a schematic block diagram of a segment generator that implements a cluster key-based grouping module, a columnar rotation module, and a metadata generator module in accordance with various embodiments.

FIG. 24P illustrates an example embodiment of a segment generator 2507 of database system 10. Some or all features and/or functionality of the database system 10 of FIG. 24P can implement any embodiment of the database system 10 described herein. Some or all features and/or functionality of the segment generator 2507 of FIG. 24P can implement the segment generator 2507 of FIG. 24O and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator 2517 as disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes; and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system 2505 of U.S. Utility application Ser. No. 16/985,723, U.S. Utility application Ser. No. 16/985,957, and/or U.S. Utility application Ser. No. 16/985,930.

Figure 24Q:
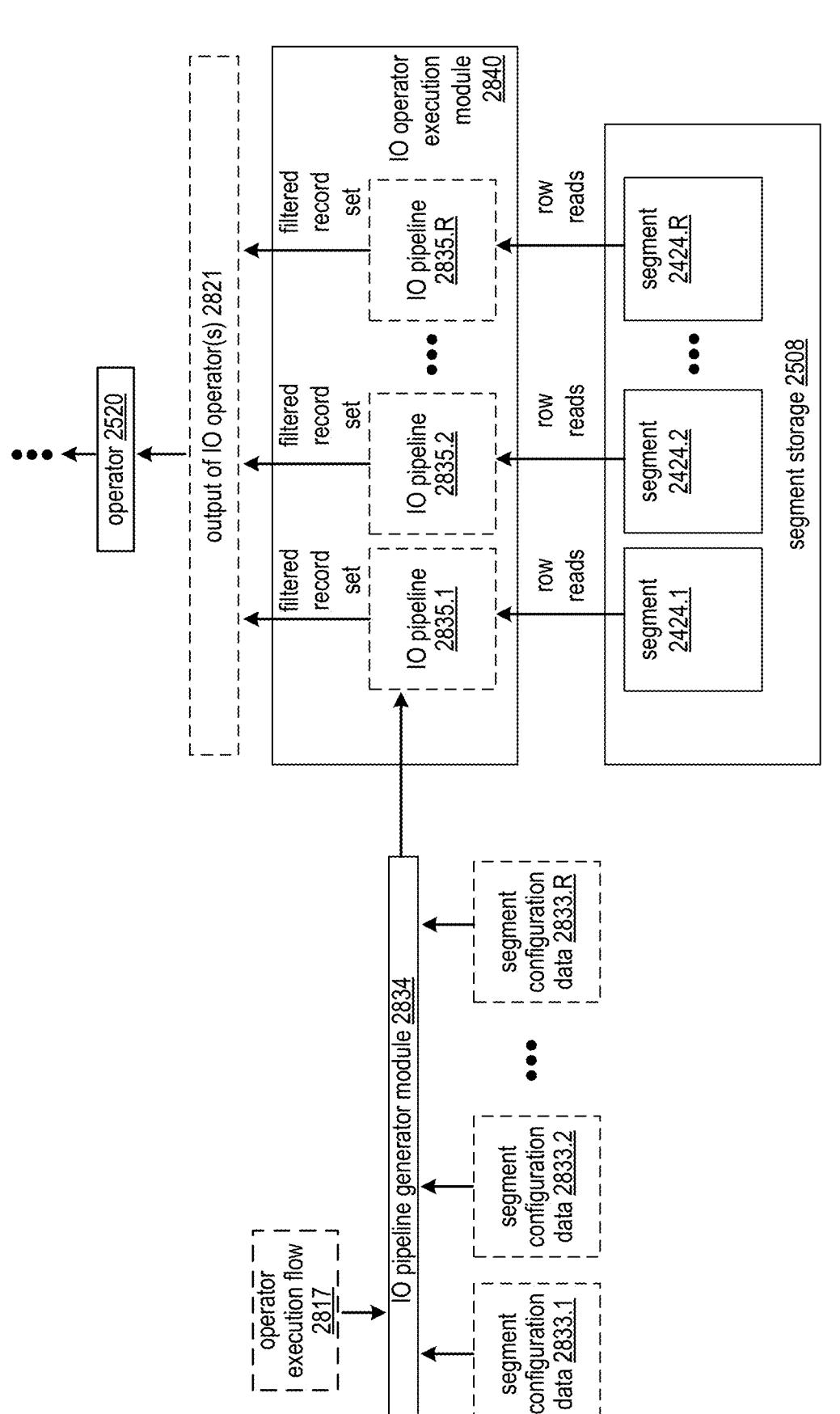
FIG. 24Q is a schematic block diagram of a query processing system that generates and executes a plurality of IO pipelines to generate filtered records sets from a plurality of segments in conjunction with executing a query in accordance with various embodiments.

FIG. 24Q illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24Q can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the columns slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24R:
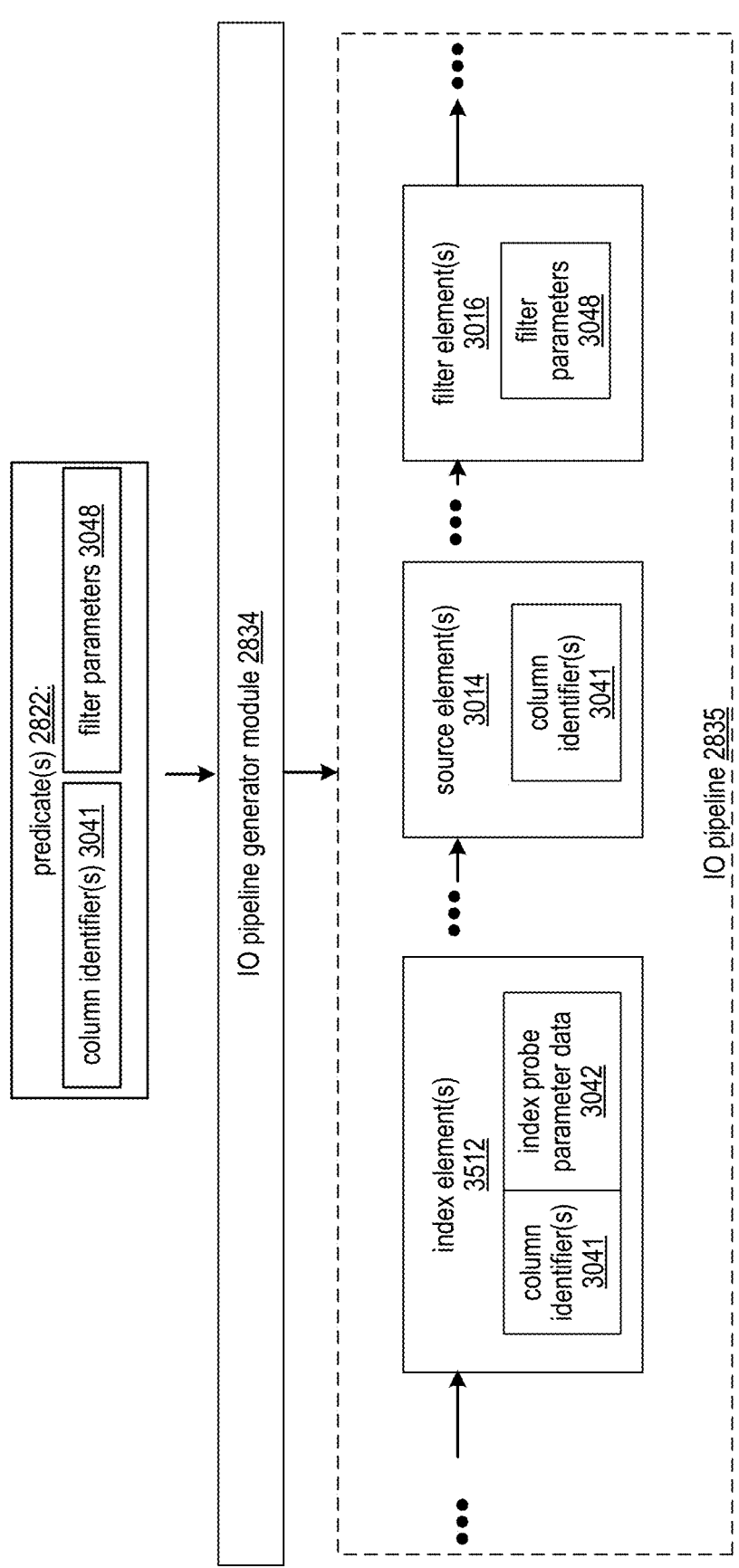
FIG. 24R is a schematic block diagram of a query processing system that generates an IO pipeline for accessing a corresponding segment based on predicates of a query in accordance with various embodiments.

FIG. 24R illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths. These elements can implement sourcing and/or filtering of rows based on query predicates 2822 applied one or more columns, identified by corresponding column identifiers 3041 and corresponding filter parameters 3048. Some or all features and/or functionality of the IO pipeline 2835 and/or IO pipeline generator module 2834 of FIG. 24R can implement the IO pipeline 2835 and/or IO pipeline generator module 2834 of FIG. 24Q, and/or any embodiment of IO pipeline 2835, of IO pipeline generator module 2834, or of any query execution via accessing segments described herein.

In some embodiments, the IO pipeline generator module 2834. IO pipeline 2835, and/or IO operator execution module 2840 implements some or all features and/or functionality of the IO pipeline generator module 2834. IO pipeline 2835, and/or IO operator execution module 2840 as disclosed by: U.S. Utility application Ser. No. 17/303,437, entitled "QUERY EXECUTION UTILIZING PROBABILISTIC INDEXING", filed May 28, 2021, which is hereby incorporated herein by reference in its entirety and made part of the present U.S. Utility Patent Application for all purposes. For example, the database system 10 can implement the indexing of segments 2424 and/or IO pipeline generation as execution for accessing segments 2424 during query execution via implementing some or all features and/or functionality as described in U.S. Utility application Ser. No. 17/303,437.

Figure 25A:
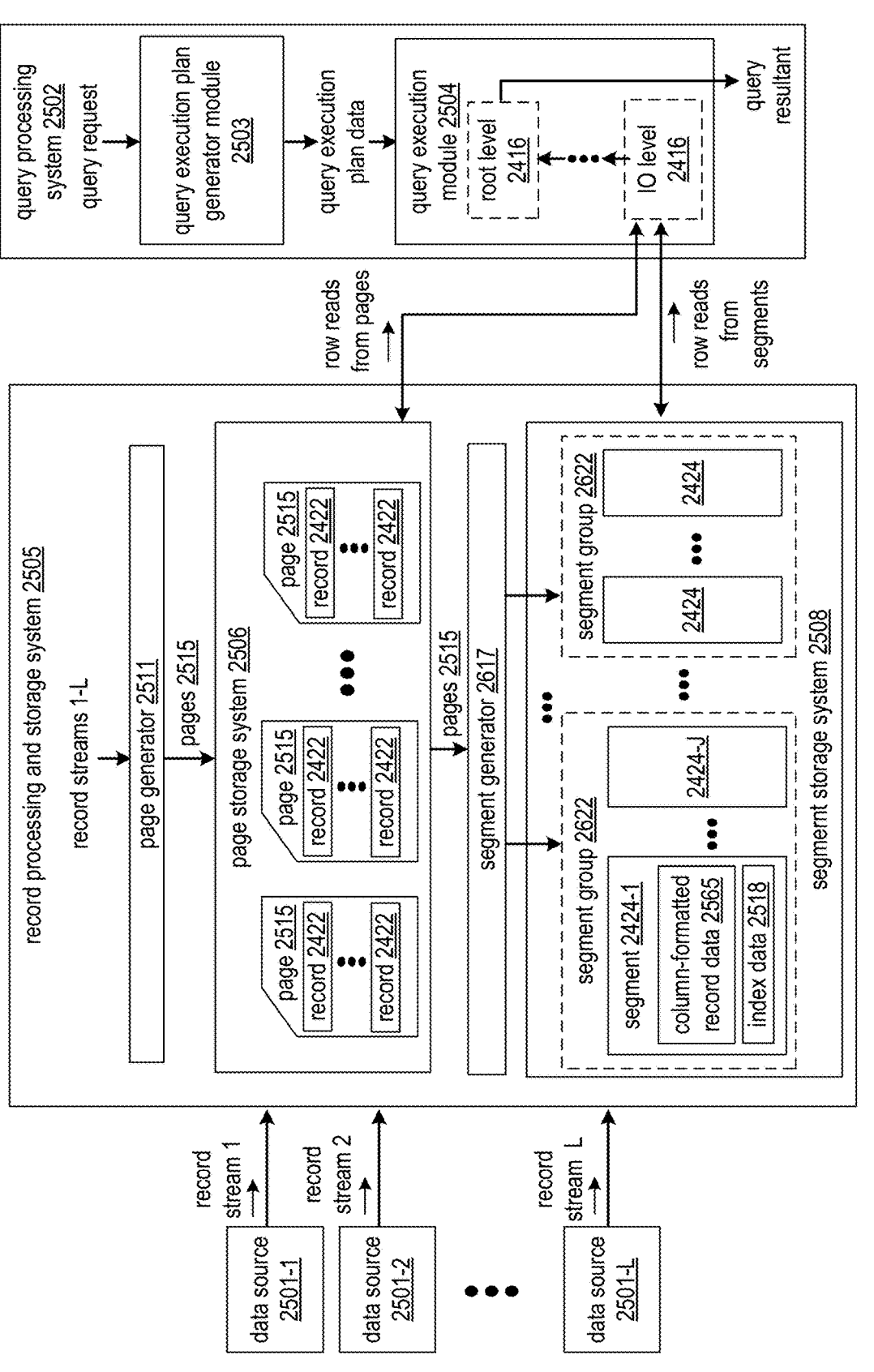
FIGS. 25A-25B are schematic block diagrams of embodiments of a database system that includes a record processing and storage system in accordance with various embodiments.
Figure 25B:
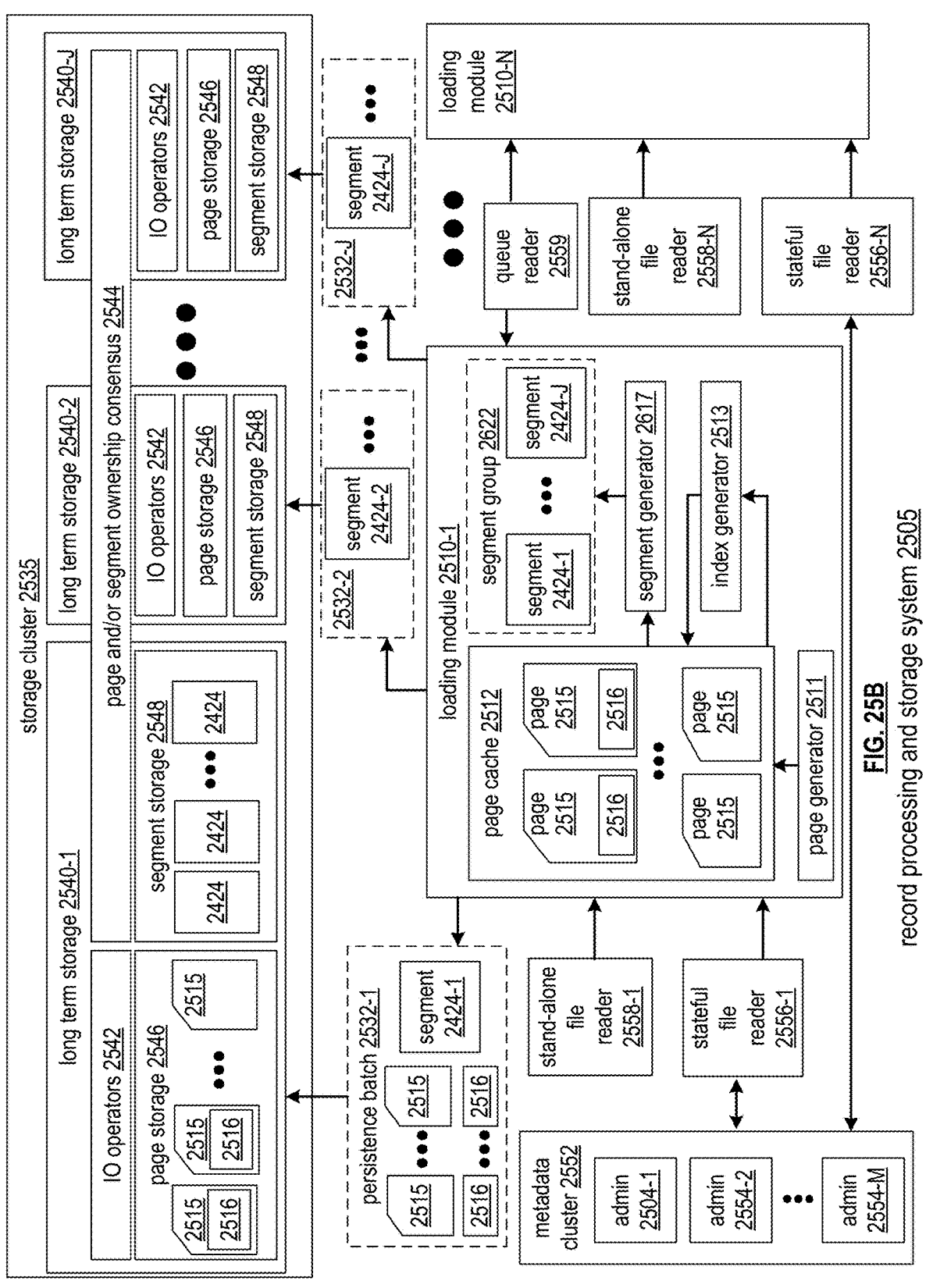
Figure 25C:
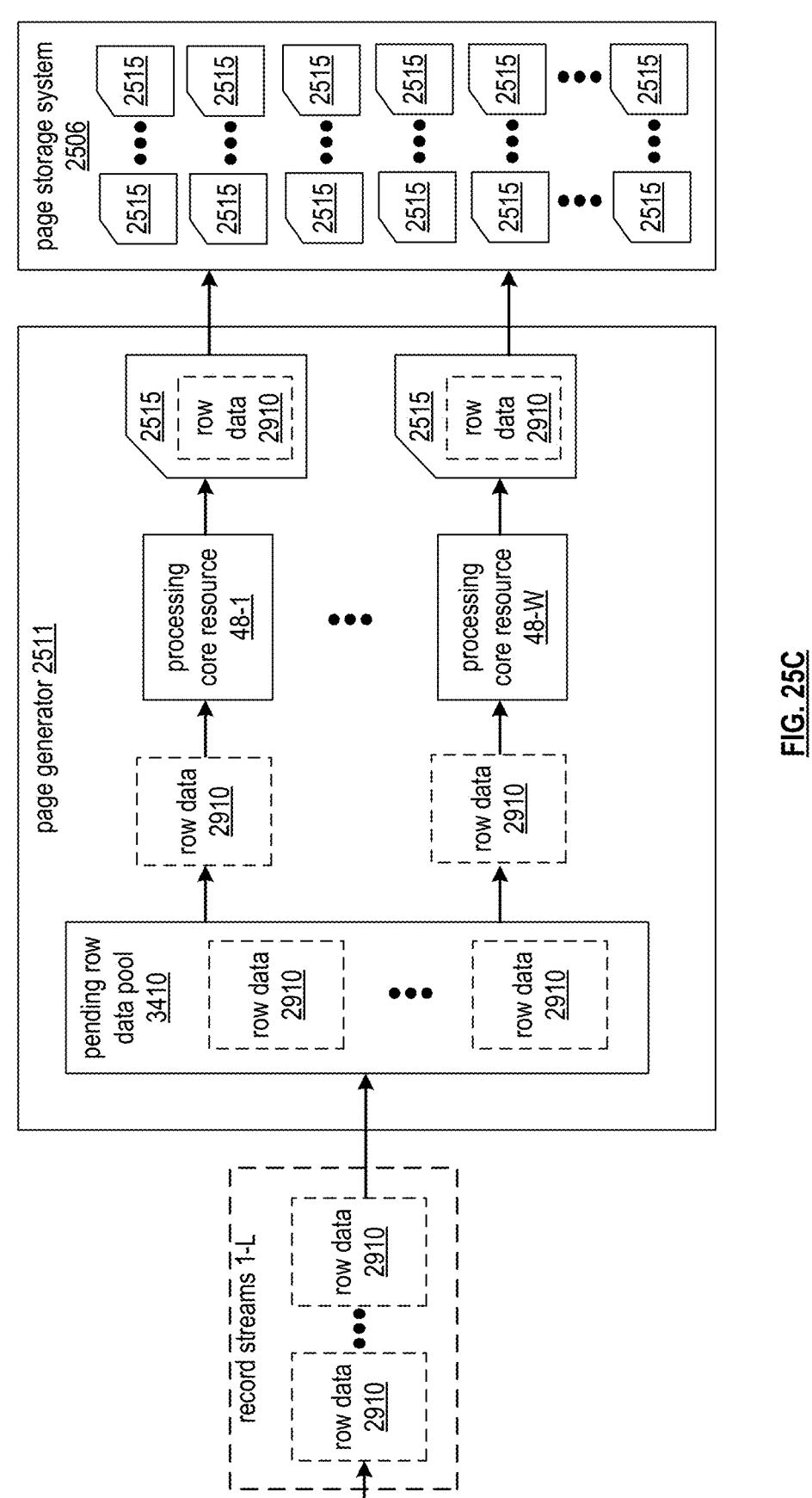
FIG. 25C is a is a schematic block diagrams of an embodiment of a page generator in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C, can be utilized to implement the database system 10 of FIGS. 24A-24I when executing queries indicating join expressions. Some or all features and/or functionality of FIGS. 25A-25C can be utilized to implement any embodiment of the database system 10 described herein.

FIG. 25A illustrates an embodiment of a database system 10 that implements a record processing and storage system 2505. The record processing and storage system 2505 can be operable to generate and store the segments 2424 discussed previously by utilizing a segment generator 2617 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2617 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 37 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1, 2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1, 2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering. For example, greater numbers of records with common cluster keys are expected to be included in the total set of pages 2515 of the page storage system 2506 when the page storage system 2506 accumulates pages over longer periods of time to include a greater number of pages. In other words, delaying the grouping of rows into segments as long as possible increases the chances of having sufficient numbers of records with same and/or similar cluster keys to group together in segments. Determining when to generate segments such that the conversion from pages into segments is delayed as long as possible, and/or such that a sufficient amount of records are converted all at once to induce more favorable levels of cluster, is discussed in further detail in conjunction with FIGS. 26A-26D. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2617 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2617 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2617, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2617, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2617; transfer of segments 2424 to the segment storage system 2508 once generated by the segment generator 2617; communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

The record processing and storage system 2505 and/or the query processing system 2502 of FIG. 25A, and/or any other embodiment of record processing and storage system 2505 and/or the query processing system 2502 described herein, can be implemented at a massive scale, for example, by being implemented by a database system 10 that is operable to receive, store, and perform queries against a massive number of records of one or more datasets, such as millions, billions, and/or trillions of records stored as many Terabytes. Petabytes, and/or Exabytes of data as discussed previously. In particular, the record processing and storage system 2505 and/or the query processing system 2502 can each be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the record processing and storage system 2505 and/or the query processing system 2502 at a massive scale.

Some or all functionality performed by the record processing and storage system 2505 and/or the query processing system 2502 as described herein cannot practically be performed by the human mind, particularly when the database system 10 is implemented to store and perform queries against records at a massive scale as discussed previously. In particular, the human mind is not equipped to perform record processing, record storage, and/or query execution for millions, billions, and/or trillions of records stored as many Terabytes, Petabytes, and/or Exabytes of data. Furthermore, the human mind is not equipped to distribute and perform record processing, record storage, and/or query execution as multiple independent processes, such as hundreds, thousands, and/or millions of independent processes, in parallel and/or within overlapping time spans.

Some or all features and/or functionality of FIG. 25A can be performed via at least one node 37 in conjunction with system metadata applied across a plurality of nodes 37, for example, where at least one node 37 participates in some or all features and/or functionality of FIG. 25A based on receiving and storing the system metadata in local memory of the at least one node 37 as configuration data, and/or based on further accessing and/or executing this configuration data to implement some or all functionality of the record processing storage system and/or to implement some or all functionality of the query processing system as part of its database functionality accordingly. Performance of some or all features and/or functionality of FIG. 25A can optionally change and/or be updated over time, and/or a set of nodes participating in executing some or all features and/or functionality of FIG. 25A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of loading modules 2510-1, 2510-N. Each loading module 2510 can be implemented via its own processing and/or memory resources. For example, each loading module 2510 can be implemented via its own computing device 18, via its own node 37, and/or via its own processing core resource 48. The plurality of loading modules 2510-1, 2510-N can be implemented to perform some or all of the functionality of the record processing and storage system 2505 in a parallelized fashion.

The record processing and storage system 2505 can include queue reader 2559, a plurality of stateful file readers 2556-1-2556-N. and/or stand-alone file readers 2558-1-2558-N. For example, the queue reader 2559, a plurality of stateful file readers 2556-1-2556-N, and/or stand-alone file readers 2558-1-2558-N are utilized to enable each loading modules 2510 to receive one or more of the record streams 1-L received from the data sources 2501-1, 2501-L as illustrated in FIG. 25A. For example, each loading module 2510 receives a distinct subset of the entire set of records received by the record processing and storage system 2505 at a given time.

Each loading module 2510 can receive records 2422 in one or more record streams via its own stateful file reader 2556 and/or stand-alone file reader 2558. Each loading module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given loading module 2510 is implemented via its own computing device 18 and/or node 37, the same computing device 18 and/or node 37 can optionally be utilized to implement the stateful file reader 2556, and/or each stand-alone file reader 2558 communicating with the given loading module 2510.

Each loading module 2510 can implement its own page generator 2511, its own index generator 2513, and/or its own segment generator 2617, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of loading modules 2510 as illustrated in FIG. 25B. Each page generator 2511 of FIG. 25B can process its own incoming records 2422 to generate its own corresponding pages 2515.

As pages 2515 are generated by the page generator 2511 of a loading module 2510, they can be stored in a page cache 2512. The page cache 2512 can be implemented utilizing memory resources of the loading module 2510, such as memory resources of the corresponding computing device 18. For example, the page cache 2512 of each loading module 2001-1, 2010-N can individually or collectively implement some or all of the page storage system 2506 of FIG. 25A.

The segment generator 2617 of FIG. 25A can similarly be implemented as a plurality of segment generators 2617 of a corresponding plurality of loading modules 2510 as illustrated in FIG. 25B. Each segment generator 2617 of FIG. 25B can generate its own set of segments 2424-1-2424-J included in one or more segment groups 2622. The segment group 2622 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2617 of a loading module 2510 can access the page cache 2512 of the loading module 2510 to convert the pages 2515 previously generated by the page generator 2511 into segments. In some cases, each segment generator 2617 requires access to all pages 2515 generated by the segment generator 2617 since the last conversion process of pages into segments. The page cache 2512 can optionally store all pages generated by the page generator 2511 since the last conversion process, where the segment generator 2617 accesses all of these pages generated since the last conversion process to cluster records into groups and generate segments. For example, the page cache 2512 is implemented as a write-through cache to enable all previously generated pages since the last conversion process to be accessed by the segment generator 2617 once the conversion process commences.

In some cases, each loading module 2510 implements its segment generator 2617 upon only the set of pages 2515 that were generated by its own page generator 2511, accessible via its own page cache 2512. In such cases, the record grouping via clustering key to create segments with the same or similar cluster keys are separately performed by each segment generator 2617 independently without coordination, where this record grouping via clustering key is performed on N distinct sets of records stored in the N distinct sets of pages generated by the N distinct page generators 2511 of the N distinct loading modules 2510. In such cases, despite records never being shared between loading modules 2510 to further improve clustering, the level of clustering of the resulting segments generated independently by each loading module 2510 on its own data is sufficient, for example, due to the number of records in each loading module's 2510 set of pages 2515 for conversion being sufficiently large to attain favorable levels of clustering.

In such embodiments, each loading modules 2510 can independently initiate its own conversion process of pages 2515 into segments 2424 by waiting as long as possible based on its own resource utilization, such as memory availability of its page cache 2512. Different segment generators 2617 of the different loading modules 2510 can thus perform their own conversion of the corresponding set of pages 2515 into segments 2424 at different times, based on when each loading modules 2510 independently determines to initiate the conversion process, for example, based on each independently making the determination to generate segments as discussed in conjunction with FIG. 26A. Thus, as discussed herein, the conversion process of pages into segments can correspond to a single loading module 2510 converting all of its pages 2515 generated by its own page generator 2511 since its own last the conversion process into segments 2424, where different loading modules 2510 can initiate and execute this conversion process at different times and/or with different frequency.

In other cases, it is ideal for even more favorable levels of clustering to be attained via sharing of all pages for conversion across all loading modules 2510. In such cases, a collective decision to initiate the conversion process can be made across some or all loading modules 2510, for example, based on resource utilization across all loading modules 2510. The conversion process can include sharing of and/or access to all pages 2515 generated via the process, where each segment generator 2617 accesses records in some or all pages 2515 generated by and/or stored by some or all other loading modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple loading modules 2510. As discussed herein, the conversion process of pages into segments can optionally correspond to multiple loading modules 2510 converting all of their collectively generated pages 2515 since their last conversion process into segments 2424 via sharing of their generated pages 2515.

An index generator 2513 can optionally be implemented by some or all loading modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-x of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a loading module 2510 and can utilize its index generator 2513 to generate index data 2516 for a particular page 2515 in response to having query execution plan data indicating that records 2422 be read the particular page from the page cache 2512 of the loading module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each loading modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from loading modules 2510 to storage cluster 2535 and/or to facilitate sending of data from storage cluster 2535 to loading modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-z of FIG. 6 can receive pages 2515, corresponding index data 2516, and/or segments 2424 from its own set of loading modules 2501-1, 2510-N, where the record processing and storage system 2505 of FIG. 25B can include z sets of loading modules 2510-1, 2510-N that each generate pages 2515, segments 2524, and/or index data 2516 for storage in its own corresponding storage cluster 35.

The processing and/or memory resources utilized to implement each long term storage 2540 can be distinct from the processing and/or memory resources utilized to implement the loading modules 2510. Alternatively, some loading modules can optionally share processing and/or memory resources long term storage 2540, for example, where a same computing device 18 and/or a same node 37 implements a particular long term storage 2540 and also implements a particular loading modules 2510.

Each loading module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a loading module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a loading module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2617. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a loading module 2510 maintains storage of pages 2515 via page cache 2512, even if they are sent to storage cluster 2535 in persistence batches 2532. This can enable the segment generator 2617 to efficiently read pages 2515 during the conversion process via reads from this local page cache 2512. This can be ideal in minimizing page movement, as pages do not need to be retrieved from long term storage 2540 for conversion into segments by loading modules 2510 and can instead be locally accessed via maintained storage in page cache 2512. Alternatively, a loading module 2510 removes pages 2515 from storage via page cache 2512 once they are determined to be successfully stored in long term storage 2540. This can be ideal in reducing the memory resources required by loading module 2510 to store pages, as only pages that are not yet durably stored in long term storage 2540 need be stored in page cache 2512.

Each long term storage 2540 can include its own page storage 2546 that stores received pages 2515 generated by and received from one or more loading modules 2010-1, 2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more loading modules 2010-1, 2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the loading module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a loading module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and/or segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and/or segment ownership consensus 2544 can include one or more versions of ownership data, for example, that is generated via execution of a consensus protocol mediated via the set of long term storage 2540-1-2540-J. The page and/or segment ownership consensus 2544 can dictate that every record is owned by exactly one long term storage 2540 via access to either a page 2515 storing the record or a segment 2424 storing the record, but not both. The page and/or segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and/or segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and/or segment ownership consensus 2544. For example, the long term storage 2540 can be solely responsible for durably storing the records utilized in query executions. In such embodiments, the cached and/or temporary storage of pages and/or segments of loading modules 2510, such as pages 2515 in page caches 2512, are not read for query executions via accesses to storage resources of loading modules 2510.

Some or all features and/or functionality of FIG. 25B can be performed via at least one node 37 in conjunction with system metadata applied across a plurality of nodes 37, for example, where at least one node 37 participates in some or all features and/or functionality of FIG. 25B based on receiving and storing the system metadata in local memory of the at least one node 37 as configuration data, and/or based on further accessing and/or executing this configuration data to implement some or all functionality of a loading module 2510, to implement some or all functionality of a file reader, and/or to implement some or all functionality of the storage cluster 2535 as part of its database functionality accordingly. Performance of some or all features and/or functionality of FIG. 25B can optionally change and/or be updated over time, and/or a set of nodes participating in executing some or all features and/or functionality of FIG. 25B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25C illustrates an example embodiment of a page generator 2511. The page generator 2511 of FIG. 25C can be utilized to implement the page generator 2511 of FIG. 25A, can be utilized to implement each page generator 2511 of each loading module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can be transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a loading module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each loading module 2510 can have its own pending row data pool 3410. Alternatively, multiple loading modules 2510 can access the same pending row data pool 3410 that stores all incoming row data 2910, for example, by utilizing queue reader 2559.

The page generator 2511 can facilitate parallelized page generation via a plurality of processing core resources 48-1-48-W. For example, each loading module 2510 has its own plurality of processing core resources 48-1-48-W, where the processing core resources 48-1-48-W of a given loading module 2510 is implemented via the set of processing core resources 48 of one or more nodes 37 utilized to implement the given loading module 2510. As another example, the plurality of processing core resources 48-1-48-W are each implemented by a corresponding one of the set of each loading module 2510-1, 2510-N, for example, where each loading module 2510-1, 2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding loading module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Some or all features and/or functionality of FIG. 25C can be performed via at least one node 37 in conjunction with system metadata applied across a plurality of nodes 37, for example, where at least one node 37 participates in some or all features and/or functionality of FIG. 25C based on receiving and storing the system metadata in local memory of the at least one node 37 as configuration data, and/or based on further accessing and/or executing this configuration data to implement some or all functionality of a loading module 2510, to implement some or all functionality of page generator 2511 and/or page storage system 2506 as part of its database functionality accordingly. Performance of some or all features and/or functionality of FIG. 25C can optionally change and/or be updated over time, and/or a set of nodes participating in executing some or all features and/or functionality of FIG. 25C can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 25D:
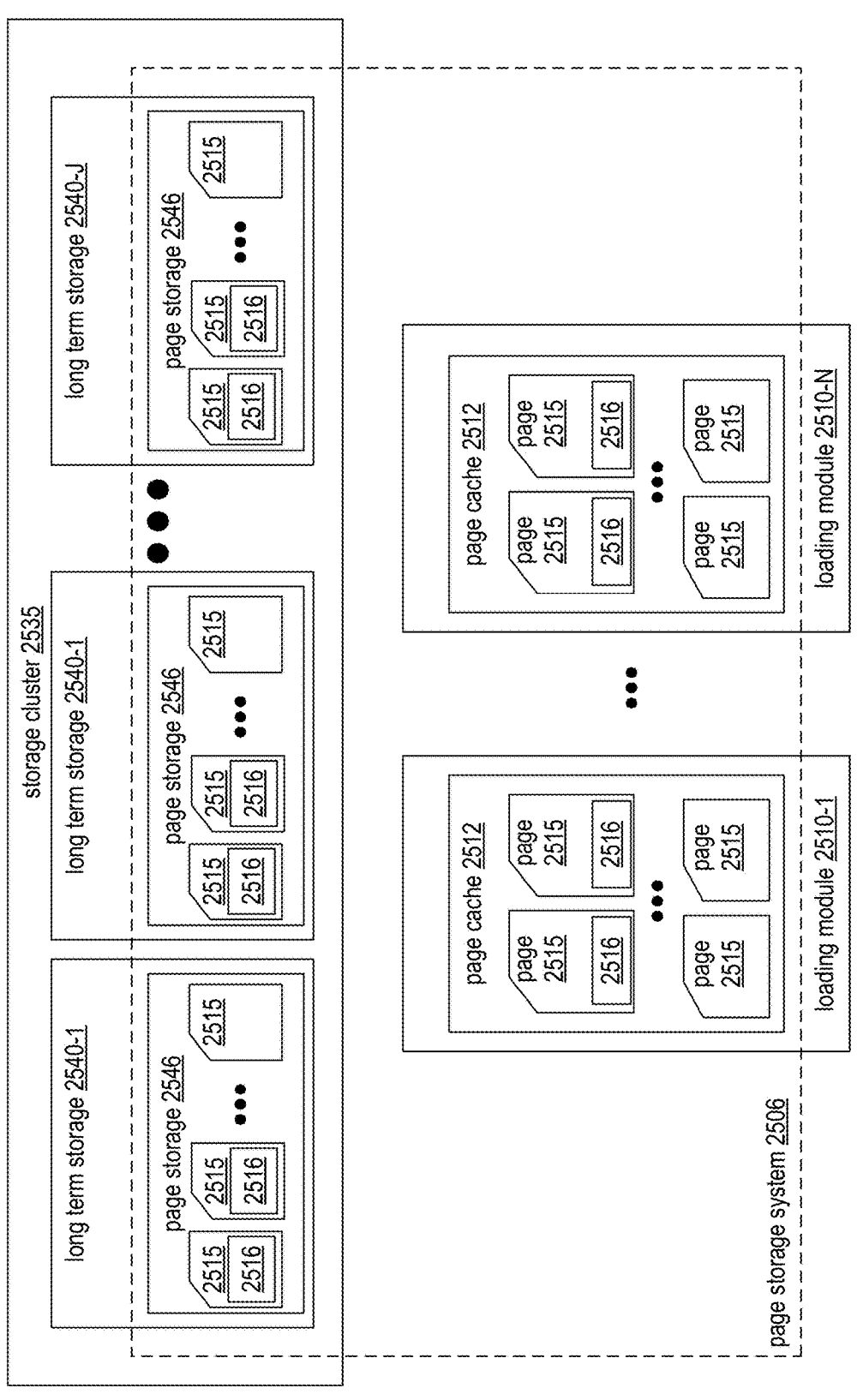
FIG. 25D is a schematic block diagrams of an embodiment of a page storage system of a record processing and storage system in accordance with various embodiments.
Figure 25E:
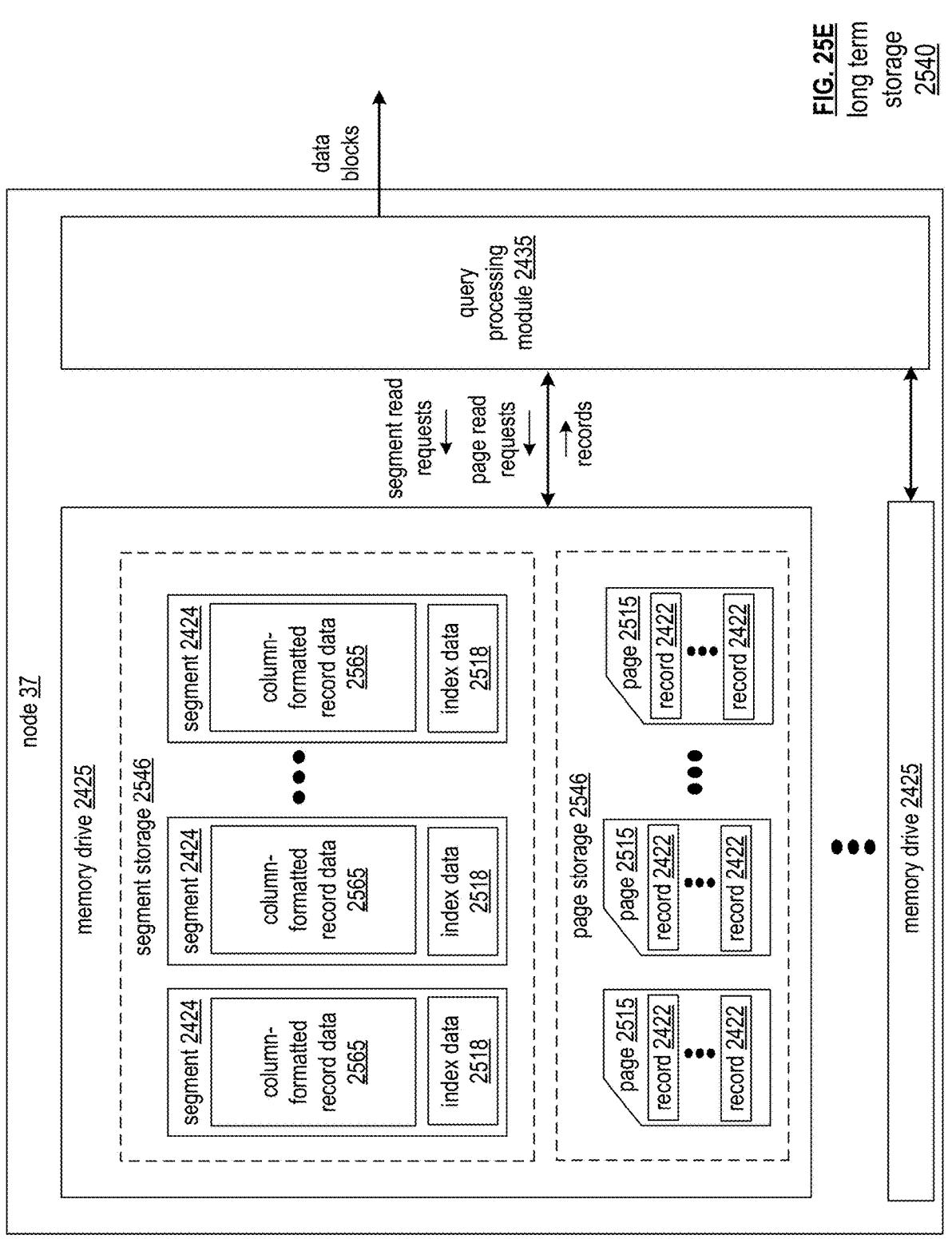
FIG. 25E is a schematic block diagrams of a node that implements a query processing module that reads records from segment storage and page storage in accordance with various embodiments.

FIG. 25D illustrates an example embodiment of the page storage system 2506. As used herein, the page storage system 2506 can include page cache 2512 of a single loading module 2510; can include page caches 2512 of some or all loading module 2510-1, 2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-z; and/or can include any other memory resources of database system 10 that are utilized to temporarily and/or durably store pages.

Some or all features and/or functionality of FIG. 25D can be performed via at least one node 37 in conjunction with system metadata, such as system metadata applied across a plurality of nodes 37, for example, where at least one node 37 participates in some or all features and/or functionality of FIG. 25D based on receiving and storing the system metadata in local memory of the at least one node 37 as configuration data and/or based on further accessing and/or executing this configuration data to implement some or all functionality of a loading module 2510 and/or a given long term storage 2540 as part of its database functionality accordingly. Performance of some or all features and/or functionality of FIG. 25D can optionally change and/or be updated over time, and/or a set of nodes participating in executing some or all features and/or functionality of FIG. 25D can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the IO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the IO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and/or segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Some or all features and/or functionality of FIG. 25E can be performed a given node 37 in conjunction with system metadata applied across a plurality of nodes 37, for example, where the given node 37 performs some or all features and/or functionality of FIG. 25E based on receiving and storing the system metadata in local memory of the at least one node 37 as configuration data and/or based on further accessing and/or executing this configuration data to implement some or all functionality of the given node 37 of FIG. 25E as part of its database functionality accordingly. Performance of some or all features and/or functionality of FIG. 25E can optionally change and/or be updated over time based on the system metadata applied across the plurality of nodes 37 being updated over time and/or based on nodes on updating their configuration data stored in local memory to reflect changes in the system metadata based on receiving data indicating these changes to the system metadata.

Figure 26A:
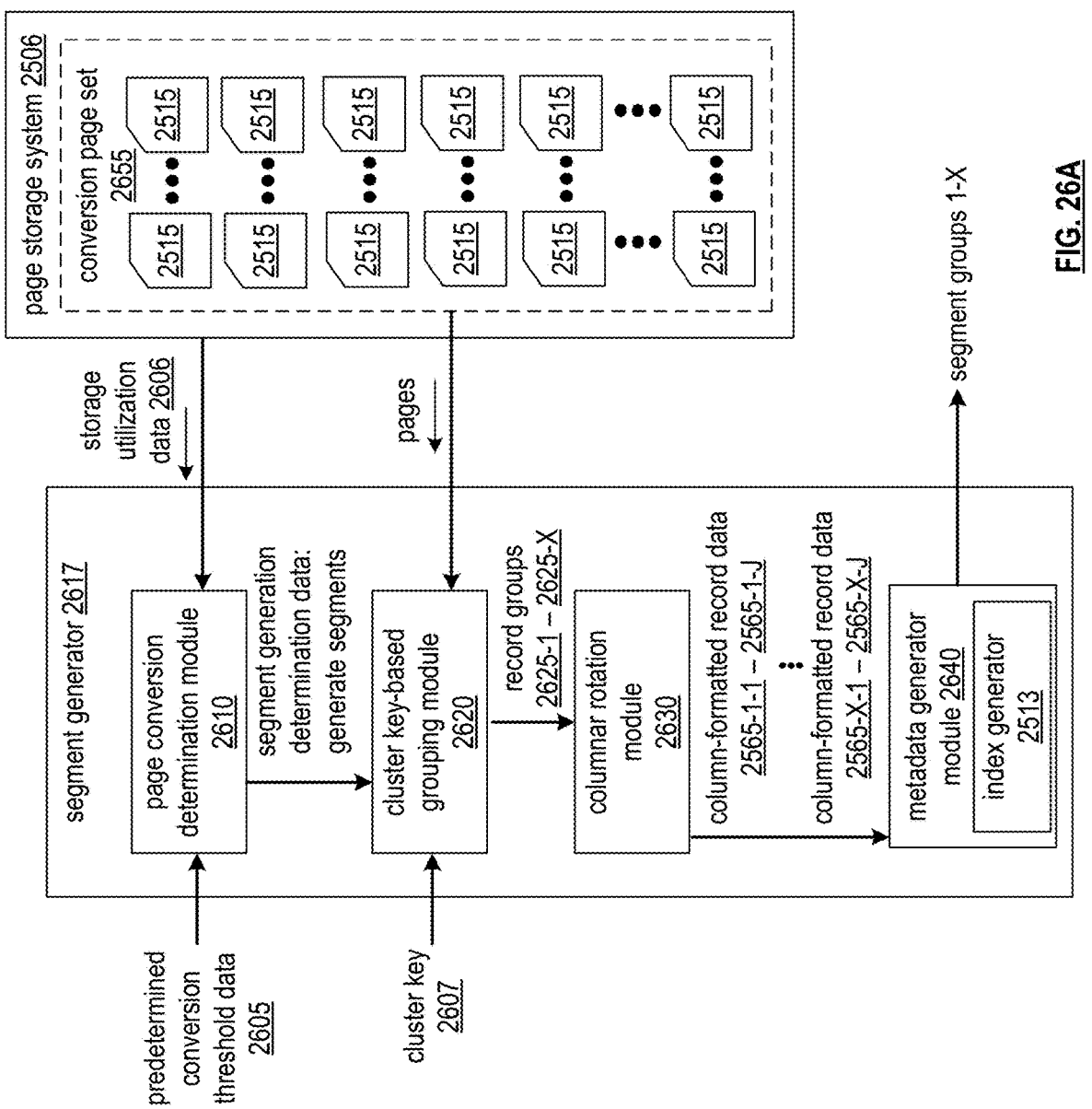
FIG. 26A is a schematic block diagram of a segment generator of a record processing and storage system in accordance with various embodiments.

FIG. 26A illustrates an example embodiment of a segment generator 2617. The segment generator 2617 of FIG. 26A can be utilized to implement the segment generator 2617 of FIG. 25A, can be utilized to implement each segment generator 2617 of each loading module 2510 of FIG. 25B, and/or can be utilized to implement any embodiments of segment generator 2617 described herein.

As discussed previously, the record processing and storage system 2505 can be operable to delay the conversion of pages into segments. Rather than frequently clustering rows and converting rows into column format, movement and/or processing of rows can be minimized by delaying the clustering and conversion process required to generate segments 2424, for example, as long as possible. This delaying of the conversion process "as long as possible" can be bounded by resource availability, such as disk and/or memory capacity of the record processing and storage system 2505. In particular, the conversion process can be delayed to accumulate as many pages in the page storage system 2506 that page storage system 2506 is capable of storing.

Maximizing the delay until pages are processed as enabled by storage resources of the record processing and storage system 2505 improves the technology of database systems by improving query efficiency. In particular, delaying the decision of which rows to group together into segments as long as possible increased the chances of having many records with common cluster keys to group together, as cluster key-based groups are formed from a largest possible set of records. These more favorable levels of clustering enable queries to be performed more efficiently as discussed previously. For example, rows that need be accessed in a given query as dictated by filtering parameters of the query are more likely to be stored together, and fewer segments and/or memory locations need to be accessed.

Maximizing the delay until pages are processed as enabled by storage resources of the record processing and storage system 2505 improves the technology of database systems by improving data ingress efficiency. By placing rows directly into pages without regard for clustering as they are received, this delayed approach minimizes the number of times a row "moves" through the system, such as from disk, to memory, and/or through the processor. In particular, by delaying all clustering until segment generation for the received rows all at once, the rows are moved exactly once, to their final resting place as a segment 2424. This conserves resources of the record processing and storage system 2505, enabling higher rates of records to be received and processed for storage via data sources 2501 and thus enabling a richer, denser database to be generated over time. For example, this can enable the record processing and storage system 2505 to effectively process incoming records at a scale of terabits per second.

This delay can be accomplished via a page conversion determination module 2610 implemented by the segment generator 2617 and/or implemented via other processing resources of the record processing and storage system 2505. The page conversion determination module 2610 can be utilized to generate segment generation determination data indicating whether the conversion process of pages into segments should be commenced at a given time. For example, the page conversion determination module 2610 generates an interrupt or notification that includes the generate segment generation determination data indicating it is time to generate segments based on determining to generate segments at the given time. The page conversion determination module 2610 can otherwise trigger the commencement of converting pages into segments once it deems the conversion process appropriate, for example, based on delaying as long as possible. The segment generator 2617 can commence the conversion process accordingly in response to the segment generation determination data indicating it is time to generate segments, for example, via a cluster key-based grouping module 2620, a columnar rotation module 2630, and/or a metadata generator module 2640.

In some cases, the page conversion determination module 2610 optionally generates some segment generation determination data indicating it is not yet time to generate segments. In some embodiments, this information may not be communicated if it is determined that is not yet time to generate segments, where only notifications instructing the conversion process be commenced is communicated to initiate the process via cluster key-based grouping module 2620, a columnar rotation module 2630, and/or a metadata generator module 2640.

The page conversion determination module 2610 can generate segment generation determination data: in predetermined intervals; in accordance with a schedule; in response to determining a new page has been generated and stored in page storage system 2506; in response determining at least a threshold number of new pages have been generated and stored in page storage system 2506; in response to determining the storage space and/or memory utilization of page storage system 2506 has changed; in response to determining the total storage capacity of page storage system 2506 has changed; in response to determining at least one memory drive of the page storage system 2506 has failed or gone offline; in response to receiving storage utilization data from page storage system 2506; based on instruction supplied via user input, for example, via administration sub-system 15 and/or configuration sub-system 16; based on receiving a request; and/or based on another determination.

The page conversion determination module 2610 can generate its segment generation determination data based on comparing storage utilization data 2606 to predetermined conversion threshold data 2605. The storage utilization data can optionally be generated by the page storage system 2506. The record processing and storage system 2505 can indicate and/or be based on one or more storage utilization metrics indicating: an amount and/or percentage of storage resources of the page storage system 2506 that are currently being utilized to store pages 2515; an amount and/or percentage of available resources of the page storage system 2506 that are not currently being utilized to store pages 2515; a number of pages 2515 currently stored by the page storage system 2506; a data size, such as a number of bytes, of the set of pages 2515 currently stored by the page storage system 2506; an expected amount of time until storage resources of the page storage system 2506 are expected to become fully utilized for page storage based on current and/or historical data rates of record streams 1-L; current health data and/or failure data of storage resources of the page storage system 2506; an amount of time since the last conversion process was initiated and/or was completed; and/or other information regarding the storage utilization of the page storage system 2506.

In some cases, the storage utilization data 2606 can relate specifically to storage utilization of a page cache 2512 of a loading module 2510 of FIG. 25B, where the segment generator 2617 of FIG. 26A is implemented by the corresponding loading module 2510 and where the segment generator 2617 of FIG. 26A is operable to perform the conversion process only upon pages 2515 in the page cache 2512. In some cases, the storage utilization data 2606 can relate specifically to storage utilization across all page caches 2512 of all loading modules 2510-1, 2510-N, where the page conversion determination module 2610 of FIG. 26A is implemented to dictate whether the conversion process be commenced across all corresponding loading modules 2510. In some cases, the storage utilization data 2606 can alternatively or additionally include storage utilization of page storage 2546 of one or more of the long term storage 2540-1-2540-J of FIG. 25B. The storage utilization data 2606 can relate to any combination of storage resources of page storage system 2506 as discussed in conjunction with FIG. 25D that are utilized to store a particular set of pages to be converted into segments in tandem via the conversion process performed by segment generator 2617.

The storage utilization data 2606 can be sent to and/or requested by the segment generator 2617; in predefined intervals; in accordance with scheduling data; based on the page conversion determination module 2610 determining to generate the segment generation determination data; based on a determination, notification, and/or instruction that the page conversion determination module 2610 should generate the segment generation determination data; and/or based on another determination. In some cases, some or all of the page conversion determination module 2610 is implemented via processing resources and/or memory resources of the page storage system 2506, for example, to enable the page conversion determination module 2610 to monitor and/or measure the storage utilization data 2606 of its own resources included in page storage system 2506.

The predetermined conversion threshold data 2605 can indicate one or more threshold metrics or other threshold conditions that, when met by one or more corresponding metrics of the storage utilization data 2606 at a given time, trigger the commencement of the conversion process. In particular, the page conversion determination module generates the segment generation determination data indicating that segments be generated when the at least one metric of the storage utilization data 2606 meets the threshold metrics and/or conditions of the predetermined conversion threshold data 2605 and/or otherwise compares favorably to a condition for page conversion indicated by the predetermined conversion threshold data 2605. If the none of the metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, the page conversion determination module generates the segment generation determination data indicating that segments be generated only when at least a predetermined threshold number of metrics of the storage utilization data 2606 compare favorably to the corresponding threshold metrics of the predetermined conversion threshold data 2605. In such cases, if less than the predetermined threshold number of metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, there is only one metric in the storage utilization data 2606 that is compared to a corresponding metric of the predetermined conversion threshold data 2605, and the page conversion determination module generates the segment generation determination data when the metric in the storage utilization data 2606 meets or otherwise compares favorably to the corresponding metric of the predetermined conversion threshold data 2605.

As used herein, the storage utilization data 2606 compares favorably to the predetermined conversion threshold data 2605 when the conditions indicated in the predetermined conversion threshold data 2605 that dictate the conversion process be initiated are met by corresponding metrics of the storage utilization data 2606. As used herein, the storage utilization data 2606 compares unfavorably to the predetermined conversion threshold data 2605 when the conditions indicated in the predetermined conversion threshold data 2605 that dictate the conversion process be initiated are not met by corresponding metrics of the storage utilization data 2606. In some embodiments, the page conversion determination module 2610 generates the segment generation determination data indicating that segments be generated and/or otherwise indicating that the conversion process be initiated only when the storage utilization data 2606 compares favorably to the predetermined conversion threshold data 2605.

The predetermined conversion threshold data 2605 can indicate one or more conditions that trigger the conversion process such as: a total memory capacity of page storage system 2506; a threshold maximum amount and/or percentage of storage resources of the page storage system 2506 that can be utilized to store pages 2515; a threshold minimum amount and/or percentage of resources page storage system that must remain available; a threshold minimum number of pages 2515 that must be included in the set of pages for conversion; a threshold maximum number of pages 2515 that can be converted in a single conversion process; a threshold maximum and/or threshold a data size of the set of pages that can be converted in a single conversion process; a threshold minimum amount of time that storage resources of the page storage system can be expected to become fully utilized for page storage based on current and/or historical data rates of record streams 1-L; threshold requirements for health data and/or failure data of storage resources of the page storage system 2506; a threshold minimum and/or threshold maximum amount of time at which a new conversion process must commence since the last conversion process was initiated and/or was completed; and/or other information regarding the requirements and/or conditions for initiation of the conversion process.

The predetermined conversion threshold data 2605 can be received and/or configured based on user input, for example, via administrative sub-system 15 and/or via configuration sub-system 16. The predetermined conversion threshold data 2605 can alternatively or additionally be determined automatically by the record processing and storage system 2505. For example, the predetermined conversion threshold data 2605 can be determined automatically to indicate and/or be based on determining a threshold memory capacity of the page storage system 2506; based on determining a threshold amount of bytes worth of pages 2515 the page storage system 2506 can store; and/or based on determining a threshold expected and/or average amount of time that pages can be generated and stored in the page storage system 2506 by the page generator 2511 until the page storage system 2506 becomes full. Note that these thresholds can be automatically buffered to account for a threshold percentage of drive failures, a historical expected rate of drive failures, a threshold amount of additional pages data that may be stored in communication lag since the storage utilization data 2606 was sent, a threshold amount of additional pages data that may be stored in processing lag to perform some or all of the conversion process, and/or other buffering to ensure that segment generation is completed before page storage system 2506 reaches its capacity.

As another example, the predetermined conversion threshold data 2605 can be determined automatically based on determining a sufficient number of records 2422 and/or a sufficient number of pages 2515 that can achieve sufficiently favorable levels of clustering. For example, this can be based on tracking and/or measuring clustering metrics for records in previous iterations of the conversion process and/or based on analysis of the measuring clustering metrics for records in previous iterations of the process to determine and/or estimate these thresholds. The storage utilization data 2606 can also be measured and/or tracked for each of this plurality of previous conversion processes to determine average and/or estimated storage utilization metrics that rendered conversion processes with favorable levels of clustering based on the corresponding clustering metrics measured for these previous conversion processes.

The clustering metrics can be based on a total or average number and/or proportion of records in each segment that: match cluster key of at least a threshold proportion of other records in the segment, are within a threshold vector distance and/or other similarity measure from at least a threshold number of other records in the segment. The clustering metrics can alternatively or additionally be based on an average and/or total number of segments whose records have a variance and/or standard deviation of their cluster key values that compare favorably to a threshold. The clustering metrics can alternatively or additionally be determined in accordance with any other similarity metrics and/or clustering algorithms.

Once the page conversion determination module 2610 generates segment generation determination data indicating that segments be generated via the conversion process, the segment generator 2617 can initiate the process of generating stored pages into segments. This can include identifying the pages for conversion in the conversion process. For example, all pages currently stored by the page storage system 2506 and awaiting their conversion into segments 2424 at the time when segment generation determination data is generated to indicating that the conversion process commence are identified for conversion. This set of pages can constitute a conversion page set 2655, where only the set of pages identified for conversion in the conversion page set 2655 are processed by segment generator 2617 for a given conversion process. For example, the record processing and storage system 2505 may continue to receive records from data sources 2501, and rather than buffering all of these records until after this conversion process is completed, additional pages can be generated at this time for storage in page storage system 2506. However, as processing of pages into segments has already commenced, these pages may not be clustered and converted during this conversion process, and can await their conversion in the next iteration of the conversion process. As another example, the page storage system 2506 may still be storing some other pages that were previously converted into segments but were not yet deleted. These pages are similarly not included in the conversion page set 2655 because their records are already included in segments via the prior conversion.

Figure 26B:
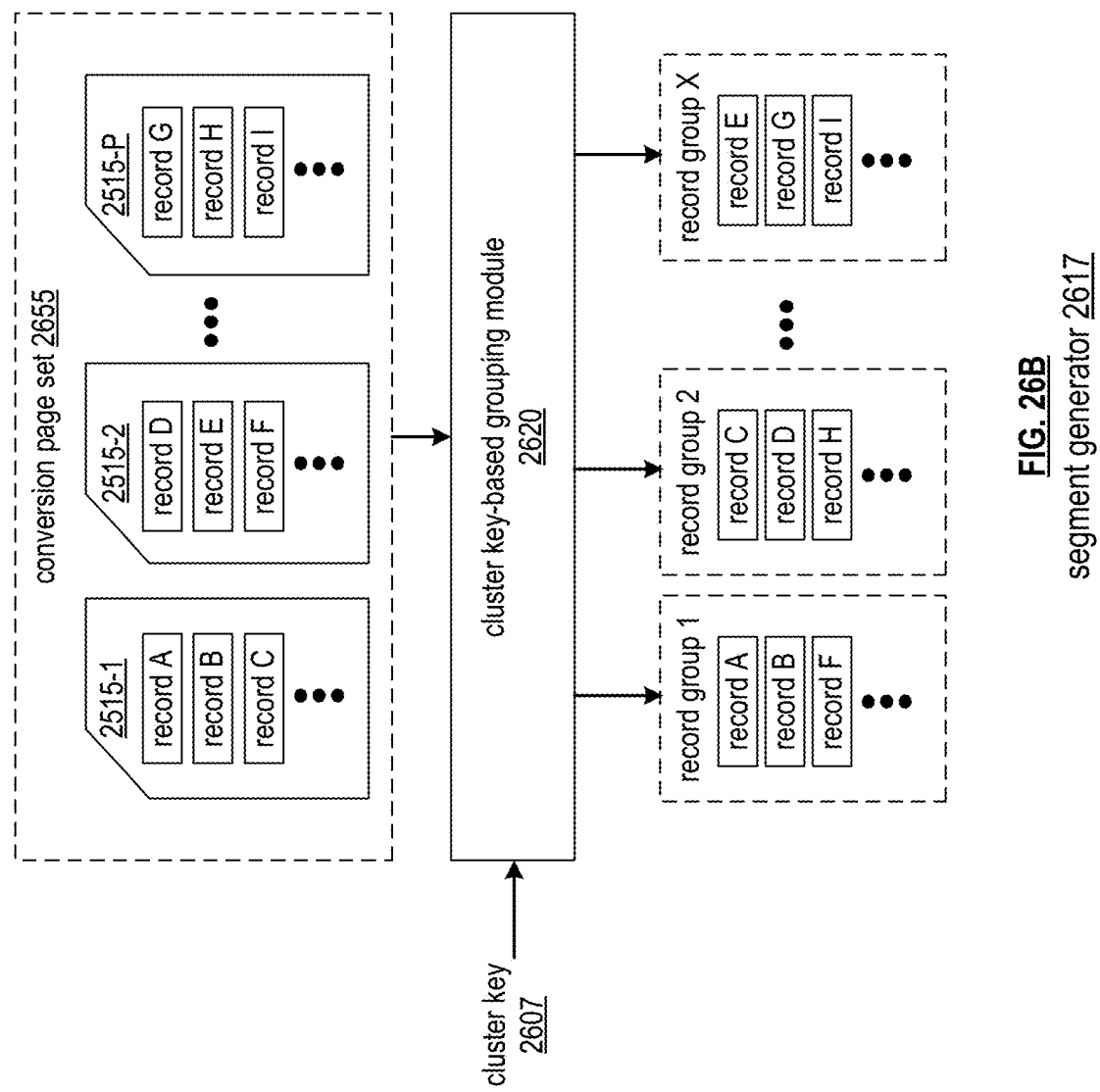
FIG. 26B is a schematic block diagram of a cluster key-based grouping module of a segment generator in accordance with various embodiments.

The segment generator can implement a cluster key-based grouping module 2620 to generate a plurality of record groups 2625-1-2625-X from the plurality of records 2422 included in the conversion page set 2655. The cluster key-based grouping module 2620 can receive and/or determine a cluster key 2607, which can be automatically determined by the cluster key-based grouping module 2620, can be stored in memory, can be received from another computing device, and/or can be configured via user input. The cluster key can indicate one or more columns, such as the key column(s) of FIGS. 18-22, by which the records are to be sorted and segregated into the record groups. For example, the plurality of records 2422 included in the conversion page set 2655 are sorted and/or grouped by cluster key, where records 2422 with matching cluster keys and/or similar cluster keys are grouped together in the resulting record groups 2625-1-2625-X. The record groups 2625-1-2625-X can be a fixed size, or can be dynamic in size, for example, based on including only records that have matching and/or similar cluster keys. An example of generating the record groups 2625-1-2625-X via the cluster key-based grouping module 2620 is illustrated in FIG. 26B.

The records 2422 of each record group in the set of record groups 2625-1-2625-X generated by the cluster key-based grouping module 2620 are ultimately included in one segment 2424 of a corresponding segment group in the set of segment groups 1-X generated by the segment generator 1-X. For example, segment group 1 includes a set of segments 2424-1-2424-J that include the records 2422 from record groups 2625-1, segment group 2 includes another set of segments 2424-1-2424-J that include the records 2422 from record groups 2625-2, and so on. The identified record groups 2625-1-2625-X can be converted into segments in a same or similar fashion as discussed in conjunction with FIGS. 18-23.

The record groups are processed into segments via a columnar rotation module 2630 of the segment generator 2617. Once the plurality of record groups 2625-1-2625-X are formed, the columnar rotation module 2630 can be implemented to generate column-formatted record data 2565 for each record group 2625. For example, the records 2422 of each record group are extracted from pages 2515 as row-formatted data. In particular, the records 2422 can be received from data sources 2501 as row-formatted data and/or can be stored in pages 2515 as row-formatted data. All records 2422 in the same record group 2625 are converted into column-formatted row data 2565 in accordance with a column-based format, for example, by performing a columnar rotation of the row-formatted data of the records 2422 in the given record group 2625. The column-formatted row data 2565 generated for a given record group 2625 can be divided into a set of column-formatted row data 2565-1-2565-J, for example, where the column-formatted row data 2565 is redundancy storage error encoded by the segment generator 2617 as discussed previously, and where each column-formatted row data 2565-1-2565-J is included in a corresponding segment of a set of J segments 2424 of a segment group 2622.

The final segments can be formed from the column-formatted row data 2565 to include metadata generated via a metadata generator module 2640. The metadata generator module 2640 can be operable to generate the manifest section, statistics section, and/or the set of index sections 0-x for each segment as illustrated in FIG. 23. The metadata generator module 2640 can generate the index data 2518 for each segment 2424 by utilizing the same or different index generator 2513 of FIG. 25B, where index data 2518 generated for segments 2424 via the metadata generator module 2640 is the same as or similar to the index data 2516 generated for pages as discussed in conjunction with FIG. 25B. The column-formatted row data 2565 and its metadata generated via metadata generator module 2640 can be combined to form a final corresponding segment 2424.

Some or all features and/or functionality of FIG. 26A can be performed via at least one node 37 in conjunction with system metadata applied across a plurality of nodes 37, for example, where at least one node 37 participates in some or all features and/or functionality of FIG. 26A based on receiving and storing the system metadata in local memory of the at least one node 37 as configuration data and/or based on further accessing and/or executing this configuration data to implement some or all functionality of segment generator 2617 and/or page storage system 2508 as part of its database functionality accordingly. Performance of some or all features and/or functionality of FIG. 26A can optionally change and/or be updated over time, and/or a set of nodes participating in executing some or all features and/or functionality of FIG. 26A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 26B illustrates an example embodiment of a cluster key-based grouping module 2620 implemented by segment generator 2617. This example serves to illustrate that the grouping of sets of records in pages does not necessarily correlate with the sets of records in the record groups generated by the cluster key-based grouping module 2620. In particular, in embodiments where the pages can be generated directly from sets of incoming records as they arrive without any initial clustering, the grouping of sets of records in pages may have no bearing on the record groups generated by the cluster key-based grouping module 2620 due to the timestamp and/or receipt time of various records not necessarily having a correlation with cluster key. The embodiment of cluster key-based grouping module 2620 of FIG. 26B can be utilized to implement the segment generator 2617 of FIG. 26A and/or any other embodiment of the segment generator 2617 discussed herein.

In this example, a plurality of P pages 2515-1-2515-P of conversion page set 2655 include records received from one or more sources over time up until the page conversion determination module 2610 dictated that conversion of this conversion page set 2655 commence. The plurality of records in pages 2515-1-2515-P can be considered an unordered set of pages to be clustered into record groups. Regardless of which pages these records may belong to, records are grouped into their record groups in accordance with cluster key. In this example, records of page 2515-1 are dispersed across at least record groups 1 and 2; records of page 2515-2 are dispersed across at least record groups 1, 2, and X, and records of page 2515-P are dispersed across at least record groups 2 and X.

The value of X can be: predetermined prior to clustering, can be the same or different for different conversion page sets 2655; can be determined based on a predetermined minimum and/or maximum number of records that are included per record group; can be determined based on a predetermined minimum and/or maximum data size per record group; can be determined based on each record group having a predetermined level of clustering, for example, in accordance with at least one clustering metric, and/or can be determined based on other information. In some cases, different record groups of the set of record groups 1-X can include different numbers of records, for example, based on maximizing a clustering metric across each record group.

For example, all records with a matching cluster key, such as having one or more columns corresponding to the cluster key with matching values, can be included in a same record group. As another example, a set of records having similar cluster keys can all be included in a same record group. As another example, if the value of the cluster key can be represented as a continuous variable, numeric variable, or other variable with an inherent ordering with respect to a cluster key domain, the cluster key domain can be subdivided into a plurality of discrete intervals. In such cases, a given record group, or a given set of record groups, can include records with cluster keys having values in the same discrete interval of the cluster key domain. As another example, a record group has cluster key values that are within a predefined distance from, or otherwise compare favorably to, an average cluster key value of cluster keys within the record group. In such cases, a Euclidian distance metric, another vector distance metric, and/or any other similarity and/or distance metric can be utilized to measure distance between cluster key values of the record group. In some cases, a clustering algorithm and/or an unsupervised machine learning model can be utilized to form record groups 1-X.

Some or all features and/or functionality of FIG. 26B can be performed via at least one node 37 in conjunction with system metadata applied across a plurality of nodes 37, for example, where at least one node 37 participates in some or all features and/or functionality of FIG. 26B based on receiving and storing the system metadata in local memory of the at least one node 37 as configuration data and/or based on further accessing and/or executing this configuration data to implement some or all functionality of cluster key-based grouping module 2620 as part of its database functionality accordingly. Performance of some or all features and/or functionality of FIG. 26B can optionally change and/or be updated over time, and/or a set of nodes participating in executing some or all features and/or functionality of FIG. 26B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIGS. 27A-29G illustrate embodiments of a database system 10 operable to execute queries based on performing aggregation during IO. Some or all features and/or functionality of FIGS. 27A-29G can implement any embodiment of database system 10 described herein.

In some embodiments, a database system performs queries involving aggregation. For example, one or more requesting entities can request queries be performed that involve primarily aggregation. As a particular example, primary IAS, cube IAS, and/or any cube queries and/or other aggregation-based queries include a GROUP BY clause (e.g. in accordance with SQL) with aggregation on one or more columns (e.g. via SUM).

In some embodiments, computing such aggregations can be an expensive part of the workload (e.g. the most expensive portion). Such aggregation can be particularly expensive in embodiment where an IO operator produces every row matching filter predicates (e.g. WHERE filters), where and grouping and/or aggregation is done higher up in the execution tree.

Pushing some or all of this grouping and/or aggregation to the IO level can improve efficiency of executing these aggregations in query execution. For example, such IO-level aggregation can improve the technology of database systems based on avoiding the cost of materializing and sending rows upstream. Alternatively or in addition, such IO-level aggregation can take advantage of data locality to compute aggregates per-column in a way that is CPU cache efficient, and/or otherwise efficient. Alternatively or in addition, such IO-level aggregation can leverage advantages of increased parallelism when computing sub-aggregates. Alternatively or in addition, such IO-level aggregation can leverage indexes, when available, for example, to avoid computing a group key hash on every row. In some embodiments, these improvements can result in a significant (e.g. order-of-magnitude) improvement in aggregation throughput during query execution by database system 10.

In some embodiments, this functionality is achieved based on IO operators making best-effort attempt to compute aggregates for multiple rows within and across segments. To minimize memory usage, the IO operator may still return multiple sub-aggregate rows for the same group key. In any case, the same group key can appear in output data blocks from multiple operator instances, so a re-aggregation operator can appear upstream in the plan (e.g. a re-aggregation operator is required to always appear upstream as required for performing global aggregation). The corresponding implementation of performing aggregation via IO operators can significantly reduce the number of rows that aggregation operator needs to process, even while not necessarily eliminating the need to do global aggregation. Examples of implementing such functionality are illustrated in the embodiments of FIGS. 27A-28D.

Figure 27A:
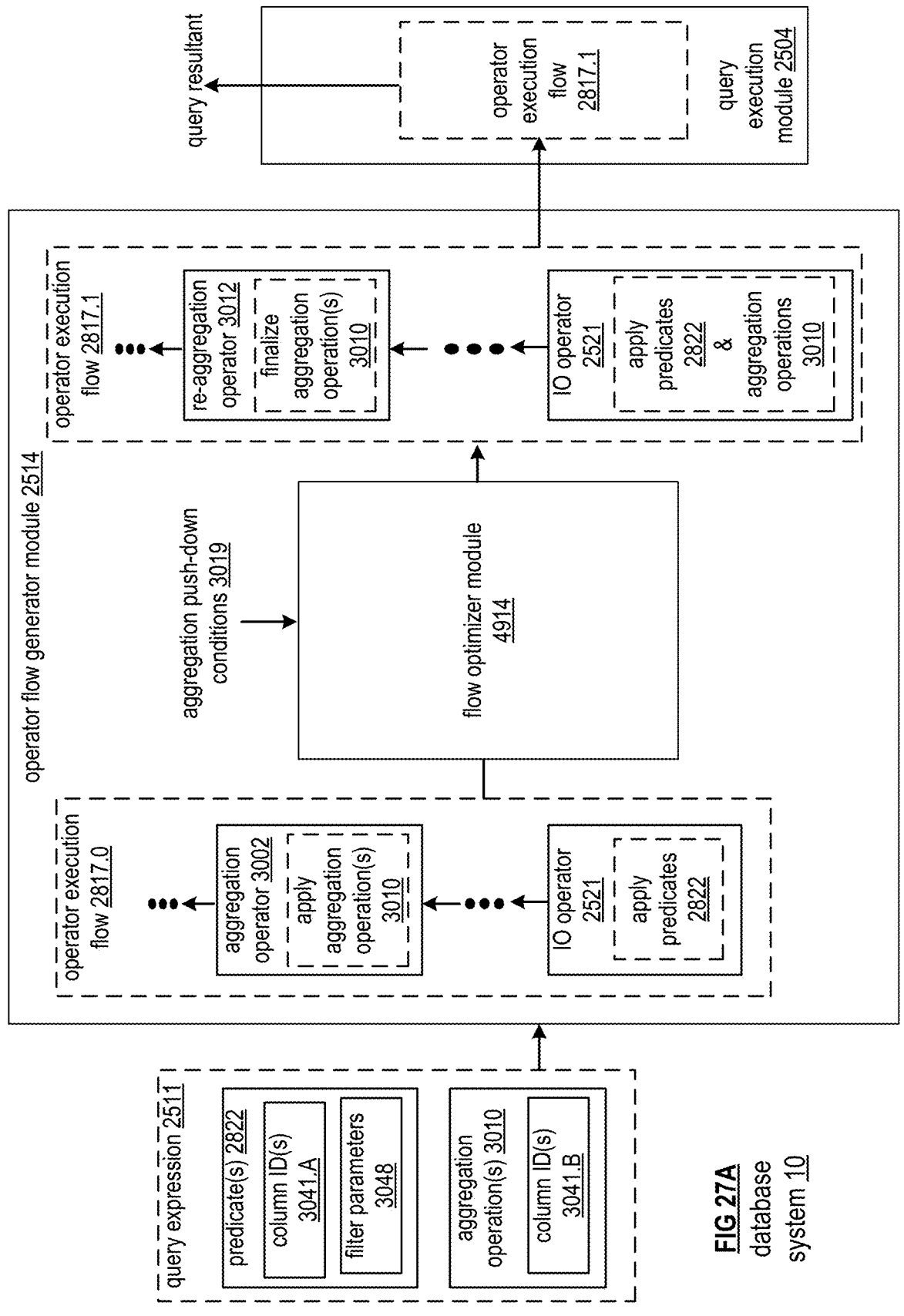
FIG. 27A is a schematic block diagram of an operator flow generator module that implements a flow optimizer module in accordance with various embodiments.
Figure 27B:
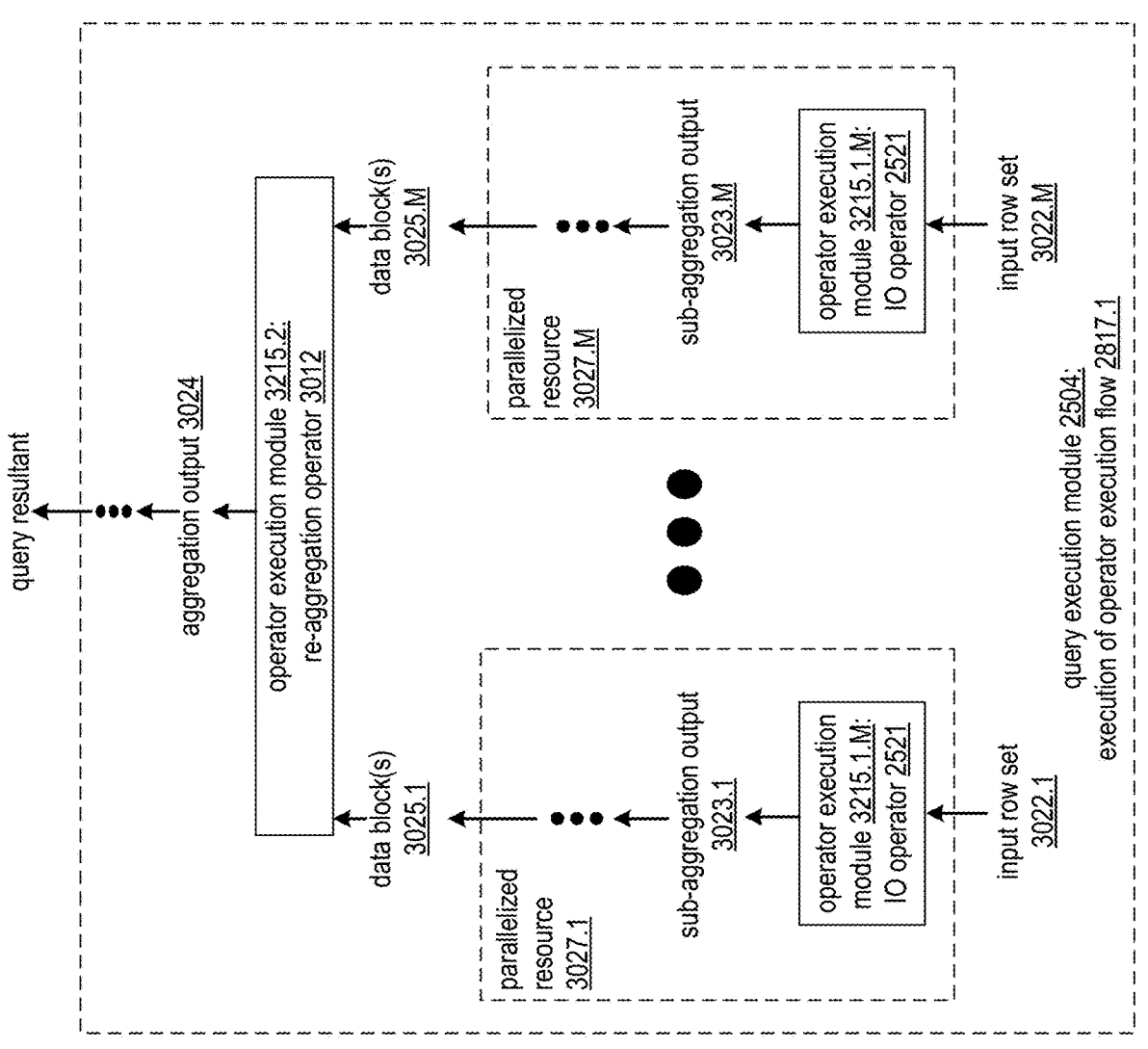
FIG. 27B is a schematic block diagram illustrating execution of an operator execution flow via generating sub-aggregation output via a plurality of parallelized resources in accordance with various embodiments.

FIGS. 27A and 27B present embodiment of a database system 10 implementing a flow optimizer module 4914 operable to generate an updated operator execution flow 2817.1 from an initial operator execution flow 2817.0 in conjunction with optimizing the operator execution flow 2817 for execution by query execution module 2504. Some or all features and/or functionality of FIGS. 27A and/or 27B can implement any embodiment of database system 10 described herein.

As illustrated in FIG. 27A, an operator flow generator module 2514 can generate an operator execution flow 2817 for executing a corresponding query expression based on applying a flow optimizer module 4914 change the operator execution flow 2817 one or more times in accordance with applying corresponding optimizations. A final operator execution flow 2817 can be executed via query execution module 2504 to produce the corresponding query resultant. The operator flow generator module 2514 can be implemented via a query processing system 2510 and/or any processing resources of database system 10. Some or all features and/or functionality of operator execution flow 2817 of FIG. 27A can implement some or all features and/or functionality of any embodiment of operator execution flow 2433 and/or operator execution flow 2517 described herein.

In some embodiments, the flow optimizer module 4914 can generate updated operator execution flow 2817.1 based on pushing one or more aggregation operations 3010 of an aggregation operator 3002 that is serially after the IO operator in initial operator execution flow 2817.0 for performance by the IO operator in the updated operator execution flow 2817.1, and based on including a re-aggregation operator 3012 after the IO operator. The initial operator execution flow 2817.0 can correspond to a first iteration of the operator execution flow 2817, or the initial operator execution flow 2817.0 can correspond to a version of operator execution flow 2817.0 generated after one or more other optimizations were already applied.

The query expression 2511 can indicate one or more predicates 2822 (e.g. for filtering rows, for example, via a WHERE clause in conjunction with a SQL expression). The one or more predicates 2822 can indicate one or more corresponding column IDs 3021 and corresponding filter parameters. These predicates 2822 can be pushed to IO operators 2521, for example, to be applied in a corresponding IO pipeline 2835 via some or all functionality of applying filtering during IO discussed herein.

The flow optimizer module 4914 can determine that these predicates 2822 be pushed to IO operators 2521 prior to further optimizing the query operator execution flow 2817 to also push aggregations to query operators as illustrated in the example of FIG. 27A. In other embodiments, the flow optimizer module 4914 can optionally collectively push both predicates and aggregations to the IO operators 2521.

The aggregation operations 3010 can be indicated in the query expression, for example, indicating any type of aggregation for execution (e.g. any SQL aggregation function or other aggregation function). The aggregation operation can be indicated by one or more column identifiers 3014.B indicating which columns be aggregated (e.g. for a database indicating sales, sum a column indicating individual transactions to render total sales income). The one or more column identifiers 3014.B can be the same as or different from the column identifiers 3041.A indicating performance of filtering (e.g. first filter sales by a column corresponding to date to sum only sales in the last year). In some cases, no filtering is performed, where predicates 2822 optionally indicate simply which table/dataset be accessed in performing the corresponding query.

The one or more column identifiers 3014.B can further indicate columns by which the corresponding aggregation be grouped (e.g. as indicated by a GROUP BY clause in the query expression 2511). For example, for a database indicating sales, the query expressions indicates a column indicating individual transactions be summed, grouping by one or more other columns (e.g. generate a sum for each store, based on purchases at different stores being denoted by a store column; generate a sum for each month, based on different purchases at different times being denoted by a date/time column; generate a sum for each product, based on purchases of different products being denoted by a product column; generate a sum for multiple ones of these categories, such as sum per product, per store, per month based on applying the corresponding multiple columns etc.)

In some embodiments, the flow optimizer module 4914 determines to push the aggregation operations 3010 to IO based on determining whether the initial operator execution flow 2817.0 meets one or more aggregation push-down conditions 3019. For example, the aggregation operations 3010 are pushed to IO operator in generating the updated operator execution flow 2817.1 based on determining all of the aggregation push-down conditions 3019 are met by the initial operator execution flow 2817.0 and/or that the initial operator execution flow 2817.0 otherwise compares favorably to aggregation push-down conditions 3019. The flow optimizer module 4914 can be implemented to generate operator execution flow 2817.1 such that is it is semantically equivalent (e.g. guaranteed to produce the same resultant as) the operator execution flow 2817.0, and/or can be implemented to generate one or more versions of operator execution flow 2817 such that these versions are semantically equivalent to each other, and also semantically equivalent to the query expression 2511 (e.g. guaranteed to produce the correct result being requested by the query expression 2511).

In some embodiments, an optimizer implemented via flow optimizer module 4914 will always heuristically attempt to push aggregation operators down in the plan if the aggregation is eligible to be pushed into the IO operator. In some embodiments, the optimizer will execute this logic after aggregations have been pushed below joins, which can optionally occur later in optimization, for example, during post-optimization, or during another portion of the optimization.

In some embodiments, aggregation will push into a directly adjacent IO operator if the IO operator and aggregation operator. In some embodiments, aggregation will push any IO operator below the aggregation, even if not directly adjacent.

In some embodiments, the aggregation operation 3010 is pushed into the IO operator if a series of conditions are met (e.g. the aggregation push-down conditions 3019). In some embodiments, this set of conditions includes one or more of:

The aggregation operation 3010 not being paired with an ORDER BY clause

The aggregation operation 3010 not performing distinct operations

The aggregation only performing one of a set of aggregation operation types such as a set that includes: COUNT(*), SUM, PRODUCT, MAX, or MIN (or optionally another set of aggregation operation types, such as a set of more different aggregation types)

non-nullable COUNTs being translated into COUNT(*) by the optimizer

The aggregation operation 3010 is not "force one partition"

The aggregation operation 3010 does not perform an unnest within an original aggregation operator 3002

The input columns to the aggregation operation 3010 and/or the IO operator 2521 are of a particular data type (e.g. the input type must be of an integral type or floating type, and/or other data types)

The output columns to the aggregation operation 3010 and/or the IO operator 2521 are of a particular data type (e.g. the input type must be of an integral type or floating type, and/or other data types)

The IO operator 2521 is a pipeline IO operator (e.g. implements an IO pipeline 2835)

The IO operator is not already performing a limit

The aggregation push-down conditions 3019 can optionally include some or all of these conditions. The aggregation push-down conditions 3019 can optionally include only some of these conditions and not others (e.g. based on some of these conditions being determined to not be necessary, based on the functionality of database system 10 being further enhanced over time, etc.). The aggregation push-down conditions 3019 can optionally other conditions not included in this list (e.g. in further enhancing the database system 10, if it is determined that it is not always beneficial to push all aggregation operators into IO, extra conditions that prevent certain aggregation operators from pushing into IO can be applied via the aggregation push-down conditions 3019).

The IO operator already has another aggregation implemented IO (e.g. a novel aggregation will never become adjacent to this IO again. It would be blocked by the re-aggregation. So, practically this will just block the higher order re-aggregation from entering the IO).

In some embodiments, one or more IO operators 2521 of a given query operator execution flow 2817 only implements a single aggregation operation 3010 (e.g. single type of aggregation; aggregation grouped on only one set of columns, etc.), where this single aggregation operation 3010 is pushed down via flow optimizer module 4914.

In some embodiments, one or more IO operators 2521 of a given query operator execution flow 2817 implements multiple aggregation operation 3010 (e.g. multiple types of aggregation; different aggregations grouped on different set of columns, etc.), where these multiple aggregation operations 3010 are pushed down via flow optimizer module 4914 (e.g. in a single update or over multiple updates).

In some embodiments, the flow optimizer module 4914 is operable to push aggregations into IO even when the aggregation cannot be pushed directly next to the IO (e.g. when the aggregation cannot push below a particular operator).

Some or all of these requirements can be implemented via the aggregation push-down conditions 3019. The aggregation push-down conditions 3019 can be determined by flow optimizer module 4914 based on: being accessed in memory, being received, being configured via user input, being automatically generated (e.g. in conjunction with evaluating database performance over time and/or automatically determining which types of query operator execution flows perform efficiently vs. inefficiently and automatically enforcing corresponding conditions based on automatically analyzing these observations, etc.)

In some embodiments, after an aggregation has been pushed into IO, another aggregation (e.g. the re-aggregation operator 3012) can be created by the flow optimizer module 4914 for placement after the IO operator. This re-aggregation operator 3012 can perform identical operations to its matching aggregation in the IO, but it will perform higher-order aggregations (i.e. if the aggregation operation 3010 implemented in IO is COUNTing in IO, the re-aggregation operator is SUMing after IO). In some embodiments, the database system 10 "re-aggregates" in a similar manner in other contexts, for example, when deciding (e.g. via the flow generator module 4914) to aggregate at a cluster level with multiple nodes without a shuffle, and then re-aggregate at a higher cluster level with one node.

In some embodiments, the flow generator module 4914 inserts the "re-aggregation" operator in the plan such that the resulting updated query operator execution plan 2817.1 always produces the same results (e.g. is semantically equivalent to) the initial query operator execution plan 2817.0 generated before applying the optimization to push the aggregation into IO. In some embodiments, depending on some plan characteristics, this aggregation can be performed in different but equivalent ways.

In some embodiments, the flow generator module 4914 inserts the re-aggregation operator 3012 by selecting the placement of the re-aggregation operator 3012 from a plurality of possible positions.

In some embodiments, this selection of re-aggregation operator 3012 placement can be based on pushing the re-aggregation higher in the plan even though it was pushed closer to IO, for example, in order to trigger the aggregation-into-IO optimization. In this context, the aggregation can be on the same level (e.g. same node level of the query execution plan 2405) that it was on previously (e.g. in an initial query execution plan 2405 for the initial query operator execution flow 2817.0, for example, where the flow optimizer module 4914 optionally further determines which levels of a query execution plan will perform the different portions of the query operator execution flow 2817 in creating and/or optimizing the query operator execution flow 2817. In some embodiments, this selection can be based on ensuring the re-aggregation stays below JOIN operations (E.g. non-global dictionary compression-based joins).

In some embodiments, this selection of re-aggregation operator 3012 placement can be based on selecting to perform the re-aggregation immediately after IO in order to filter out rows as soon as possible.

In some embodiments, this selection of re-aggregation operator 3012 placement can be in conjunction with determining whether/how aggregation shuffling is performed (e.g. via shuffle node set and/or corresponding shuffle operations). In some embodiments, the flow optimizer module 4914 determines whether to perform the re-aggregation completely on the level that IO is at by shuffling beforehand. In such cases, the flow optimizer module 4914 optionally further determines to copy this re-aggregation for performance before such as shuffle operation, for example, with degenerate multiplexer as well.

In some embodiments, the flow optimizer module 4914 determines to perform the re-aggregation completely on level(s) that have exactly one node (e.g. the root level). In such embodiments, the flow optimizer module 4914 optionally selects this option based on no shuffles being necessary.

In some embodiments, the flow optimizer module 4914 determines to perform the re-aggregation exactly as it was before the optimization (i.e. if it was shuffling before, it will continue to shuffle) and/or to perform it directly after IO. In some embodiments, the flow optimizer module 4914 makes similar decisions earlier on in optimization. In some embodiments, flow optimizer module 4914 recalculates these decisions (and/or maybe other optimization decisions) after this pushing of aggregation into IO, for example, because pushing an aggregation into IO can significantly reduce the amount of rows and column cardinalities coming out of IO.

In some embodiments, a Protobuf plan can be implemented to have a field (e.g. in PipelineIoOperator, segment_io_aggregations) that will flag all aggregation operations that will be pre-computed by IO. In some embodiments, this field will have exactly 0 or 1 entries. In other embodiments, this field could have multiple entries, for example, if multiparent IO is enabled where each parent stream applies a different aggregation or none at all.

In some embodiments, the database system 10 generates and/or executes a query operator execution flow 2817.1 implemented via pushing aggregation into IO based on selecting and/or otherwise determining at least one of: the type of aggregation operation (e.g. whether the aggregation is a SUM vs. a MAX vs. an AVERAGE operation, etc.); the column to perform the aggregation operation upon; the name to give the column created by the aggregation operation (e.g. a new column identifier for the new corresponding column); the type of column created by the aggregation operation (e.g. whether the column values generated via aggregation are integers vs. floating point values, etc.); a string delimiter; and/or an unnest layer. Some or all of this information is optionally indicated in respective fields of in a first corresponding message (e.g. a SegmentIOAggregationOperation message), for example, that is generated by and/or received by the flow optimizer module 4914. Some or all of this information is optionally utilized to perform segment-local aggregation (e.g. via a corresponding IO pipeline generated for the respective segment). Some or all of this information optionally corresponds to the aggregation operation 3010 that is pushed to IO.

In some embodiments, the database system 10 generates and/or executes a query operator execution flow 2817.1 implemented via pushing aggregation into IO based on selecting and/or otherwise determining at least one of: a set of one or more GROUP BY columns (or optionally no such GROUP BY columns, for example, where the corresponding aggregation is scalar; which one or more aggregation operations to perform (e.g. as indicated by some or all of the information of the first corresponding message for the respective aggregation listed above); whether a partition is forced; and/or whether a vector is utilized. Some or all of this information is optionally indicated in respective fields of in a second corresponding message (e.g. a SegmentIoAggregation message), for example, that is generated by and/or received by the flow optimizer module 4914. Some or all of this information is optionally utilized to perform segment-local aggregation (e.g. via a corresponding IO pipeline generated for the respective segment). Some or all of this information optionally corresponds to the aggregation operation 3010 that is pushed to IO.

In some embodiments, the database system 10 generates and/or executes a query operator execution flow 2817.1 implemented via pushing aggregation into IO based on selecting and/or otherwise determining at least one of: aggregations that should be pre-computed at local IO to segments, optionally indicating whether a single aggregation be performed or multiple aggregations be performed, and/or their respective types/information, for example, as indicated in the first corresponding message or the second corresponding message. Some or all of this information is optionally indicated in respective fields of in a third corresponding message (e.g. a PipelineIoOperator message), for example, that is generated by and/or received by the flow optimizer module 4914. Some or all of this information is optionally utilized to perform segment-local aggregation (e.g. via a corresponding IO pipeline generated for the respective segment). Some or all of this information optionally corresponds to the aggregation operation 3010 that is pushed to IO.

FIG. 27B illustrates an example of executing the operator execution flow 2817.1, for example, based on having been generated via pushing at least one aggregation operation 3010 to IO via some or all features and/or functionality of FIG. 27A.

A plurality of parallelized instances of an operator execution module 3215.1.1-3215.1.M can correspond to multiple instances of implementing a corresponding an operator execution module 3215.1, which can correspond to execution of IO operator 2521. Each operator execution module 3215 can execute the IO operator 2521 (e.g. via execution of a corresponding IO pipeline 2835) to generate corresponding sub-aggregation output 3023. This corresponding sub-aggregation output 3023 can be generated via a corresponding input row set 3022, where a plurality of input row sets 3022.1-3022.M collectively constitute a full set of rows (e.g. full table/full dataset) that is processed via the operator execution modules 3215.1.1-3215.1.M in parallel (e.g. input row sets 3022.1-3022.M are mutually exclusive sets of rows, where each row of the table/dataset is included in exactly one input row set 3022). This sub-aggregation output 3023 can be indicated in corresponding data blocks 3025 (e.g. generated after further processing of sub-aggregation output 3023 via other operators, or directly indicating sub-aggregation output 3023). A re-aggregation operator 3012 implemented via an operator execution module 3515.2 (E.g. operating as a parent, or other ancestor, of IO operators 2521) can receive and process the incoming data blocks 3025.1-3025.M generated based on the parallelized instances of IO operator 2521 to generate aggregation output 3024 (e.g. as a function of the plurality of sub-aggregation output 3023.1-3023.M indicated across the plurality of data blocks 3025.1-3025.M). Example embodiments of generating and processing sub-aggregation output 3023 are discussed in conjunction with FIGS. 28A-28D.

The operator execution modules 3215 of FIG. 27B can implement some or all features and/or functionality of the operator execution modules 3215 of FIG. 24J and/or any other embodiment of operator execution module 3215 described herein. The parallelized resources 3027.1-3027.M can be implemented via a corresponding plurality of nodes 37.1-37.M (e.g. implemented at the IO level 2416 of a corresponding query execution plan 2405), a corresponding plurality of processing core resources 48.1-48.M of one or more nodes 37, and/or any other parallelized resources (e.g. implementing respective operator execution modules 3215 independently and/or without coordination to separately execute the IO operator 2521). For example, the parallelized resources 3027.1-3027.M execute IO operator 2521 via one or more nodes 37 at IO level of query execution plan 2405, while operator execution module 3215.2 is implemented to execute re-aggregation operator 3012 via one or more nodes 37 (e.g. parent nodes or peer nodes in a shuffle node set) at a higher level of query execution plan 2405 (e.g. an inner level, such as an immediately higher inner level or different inner level, or the root level). The re-aggregation operator 3012 can be a direct parent and/or other ancestor of the IO operator 2521. The re-aggregation operator 3012 can optionally be implemented via multiple nodes in a shuffle node set in conjunction with performing a corresponding shuffle operation upon data blocks received from respective children operators (e.g. respective IO operators 2521), where each IO operator 2521 sends data blocks to one parent and a shuffle is performed across these parents, or performed later via higher level ancestors after subsequent processing of these data blocks).

FIG. 27C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27C. For example, a node 37 can participate in some or all steps of FIG. 27C based on participating in consensus protocols to mediate consensus data with other nodes 37. Some or all of the methods of FIG. 27C can be performed by nodes executing a query in conjunction with a query execution, for example, via one or more nodes 37 implemented as nodes of a query execution module 2504 implementing a query execution plan 2405. Some or all of the steps of FIG. 27C can optionally be performed by any other processing module of the database system 10. Some or all of the steps of FIG. 27C can be performed to implement some or all of the functionality of the database system 10 as described in conjunction with FIGS. 27A-27B, for example, by implementing flow optimizer module 4914 and/or query execution module 2504 that executes parallelized instances of an IO operator 2521 that implements aggregation operations 3010. Some or all steps of FIG. 27C can be performed by database system 10 in accordance with other embodiments of the database system 10 and/or nodes 37 discussed herein.

Step 2782 includes generating an initial query operator execution flow for a corresponding query for execution that includes an IO operator for execution serially before an aggregation operator indicating performance of an aggregation. Step 2784 includes converting the initial query operator execution flow into an updated query operator execution flow semantically equivalent to the initial query operator execution flow. Step 2786 includes executing the corresponding query against a plurality of rows by applying the updated query operator execution flow.

Performing step 2784 can include performing step 2788 and/or 2790. Step 2788 includes updating the IO operator to include the performance of the aggregation. Step 2790 includes adding a re-aggregation operator serially after the IO operator. In various examples, the re-aggregation operator is configured to further aggregate a plurality output data blocks generated via a plurality of parallelized executions of the IO operator via a plurality of parallelized resources.

Performing step 2784 can include performing step 2792 and/or 2794. Step 2792 includes executing, via each of the plurality of parallelized resources, the IO operator to produce at least one data block indicating corresponding sub-aggregation output via performance of the aggregation upon a corresponding subset of the plurality of rows. Step 2794 includes executing the re-aggregation operator upon a plurality of data blocks generated based on execution of the IO operator across the plurality of parallelized resources to generate aggregation output.

In various examples, the method further includes determining whether the initial query operator execution flow meets a set of aggregation push-down conditions. In various examples, the initial query operator execution flow is converted into the updated query operator execution flow in response to determining the initial query operator execution flow meets the set of aggregation push-down conditions.

In various examples, the set of aggregation push-down conditions includes a condition requiring that the aggregation operator is not paired with an ORDER BY clause. In various examples, the set of aggregation push-down conditions includes at least one of: an input type condition requiring input to the IO operator and the aggregation operator be one of a set of data types; and/or an output type condition requiring output of the IO operator and the aggregation operator be one of the set of data types. In various examples, the set of aggregation push-down conditions includes at least one of: an aggregation type condition requiring the aggregation be one of a set of aggregation types. In various examples, the set of aggregation types includes at least one of: a count aggregation type, a summation aggregation type, a product aggregation type, a maximum aggregation type, or a minimum aggregation type. In various examples, the set of aggregation push-down conditions includes any other condition/requirement for pushing the aggregation to the IO level discussed herein.

In various examples, converting the initial query operator execution flow into an updated query operator execution flow includes selecting a position of the re-aggregation operator in the updated query operator execution flow from a plurality of possible positions in the updated query operator execution flow serially after the IO operator, where the re-aggregation operator is included in the updated query operator execution flow at the selected position. In various examples, the position of the re-aggregation operator in the updated query operator execution flow is selected to be immediately after the IO operator. In various examples, the position of the re-aggregation operator in the updated query operator execution flow is selected based on a position of the aggregation operator in the initial query operator execution flow. In various examples, the position of the re-aggregation operator in the updated query operator execution flow is selected based on further selecting a position of a shuffle operation in the updated query operator execution flow, wherein the re-aggregation operator is performed serially after the shuffling operator.

In various examples, converting the initial query operator execution flow into the updated query operator execution flow includes applying a plurality of updates to the initial query operator execution flow one at a time to ultimately produce the updated query operator execution flow. In various examples, one of the plurality of updates includes updating the IO operator to include the performance of the aggregation and including the re-aggregation operator serially after the IO operator.

In various examples, the initial query operator execution flow includes the aggregation operator serially after a join operator. In various examples, a prior one of the plurality of updates includes pushing the aggregation operator to a new position serially before the join operator and serially after the IO operator. In various examples, the one of the plurality of updates is performed after the prior one of the plurality of updates and further includes removing the aggregation operator from the new position based on including the performance of the aggregation within the IO operator. In various examples, the re-aggregation operator is in the new position after performing the one of the plurality of updates based on replacing the aggregation operator in the new position with the re-aggregation operator in the new position.

In various examples, the re-aggregation operator is added serially after the IO operator in an initial position based on performing the one of the plurality of updates. In various examples, a subsequent one of the plurality of updates is performed after the one of the plurality of updates and includes re-positioning the re-aggregation operator to a new position different from the initial position. In various examples, the new position is also serially after the IO operator.

In various examples, updating the IO operator to include the performance of the aggregation is based on updating an IO pipeline implemented via the IO operator to include the performance of the aggregation. In various examples, executing the IO operator includes executing the IO pipeline.

In various examples, a database table that includes the plurality of rows includes a plurality of columns. In various examples, the aggregation is performed to generate the corresponding sub-aggregation output corresponding to applying the aggregation to at least one column of the plurality of columns.

In various examples, the initial query operator execution flow further includes a second aggregation operator indicating performance of a second aggregation, and wherein the IO operator is serially before the second aggregation operator in the initial query operator execution flow. In various examples, converting the initial query operator execution flow into the updated query operator execution flow further includes: updating the IO operator to further include the performance of the second aggregation; and/or adding a second re-aggregation operator serially after the IO operator. In various examples, executing the corresponding query against the plurality of rows further includes executing the second re-aggregation operator to further generate second aggregation output.

In various examples, the aggregation corresponds to a first type of aggregation, and the second aggregation corresponds to a second type of aggregation different from the first type of aggregation. In various examples, the aggregation is applied to a first column of a database table that includes the plurality of rows, and the second aggregation is applied to a second column of the database table that is different from the first column.

In various examples, performing the method of FIG. 27C includes performing some or all features and/or functionality of one or more steps of FIG. 28E.

In various embodiments, any one of more of the various examples listed above are implemented in conjunction with performing some or all steps of FIG. 27C. In various embodiments, any set of the various examples listed above can be implemented in tandem, for example, in conjunction with performing some or all steps of FIG. 27C, some or all steps of FIG. 28E, and/or any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27C, for example, in conjunction with further implementing any one or more of the various examples described above.

In various embodiments, the operational instructions, when executed by the at least one processor, cause the database system to: generate an initial query operator execution flow for a corresponding query for execution that includes an IO operator for execution serially before an aggregation operator indicating performance of an aggregation; convert the initial query operator execution flow into an updated query operator execution flow semantically equivalent to the initial query operator execution flow based on updating the IO operator to include the performance of the aggregation and/or adding a re-aggregation operator serially after the IO operator, where the re-aggregation operator is configured to further aggregate a plurality output data blocks generated via a plurality of parallelized executions of the IO operator via a plurality of parallelized resources; and/or executing the corresponding query against a plurality of rows by applying the updated query operator execution flow based on executing, via each of the plurality of parallelized resources, the IO operator to produce at least one data block indicating corresponding sub-aggregation output via performance of the aggregation upon a corresponding subset of the plurality of rows, and executing the re-aggregation operator upon a plurality of data blocks generated based on execution of the IO operator across the plurality of parallelized resources to generate aggregation output.

FIGS. 28A-28D illustrate embodiments of a database system 10 that generates and processes sub-aggregation output 3023. Some or all features and/or functionality of database system 10 of FIGS. 28A-28D can implement any embodiment of database system 10 described herein.

Executing an IO operator 2521 that generates sub-aggregation output 3023, for example, in conjunction with performing an aggregation pushed to IO, can be implemented via a corresponding IO pipeline 2835. Such an IO pipeline 2835 can optionally implement some or all features and/or functionality of IO pipeline 2835 described herein, for example, as discussed in conjunction with FIG. 24R and/or as disclosed by U.S. Utility application Ser. No. 17/303,437. Such an IO pipeline 2835 can be further adapted to perform aggregation, for example, via an aggregation module 3140.

Figure 28A:
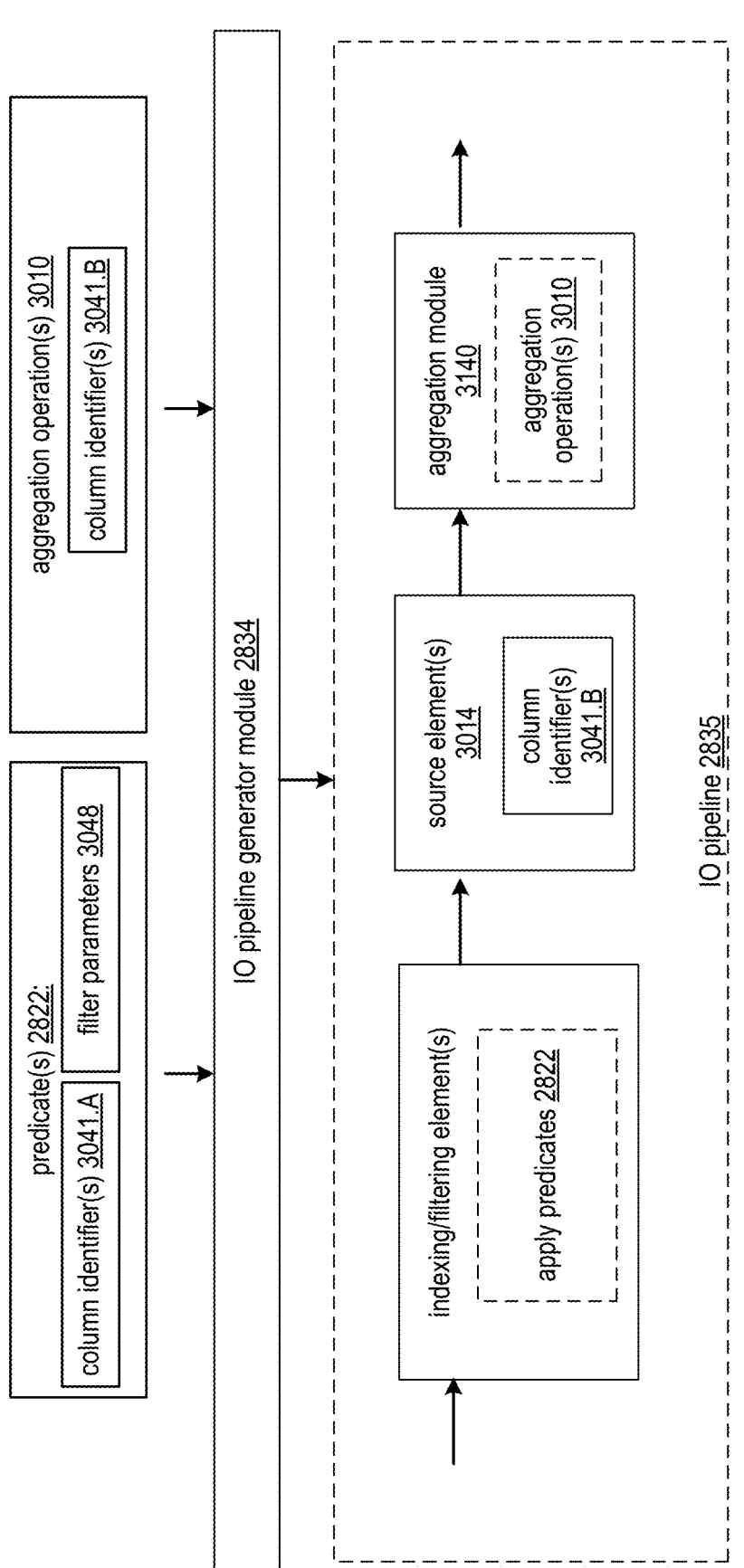
FIG. 28A is a schematic block diagram of an IO pipeline generator module that generates an IO pipeline that includes an aggregation module in accordance with various embodiments.

FIG. 28A illustrates an IO pipeline 2835 generated by an IO pipeline generator module 2834 that includes one or more source elements 3041 to source one or more columns indicated by one or more column identifiers 3041.B (e.g. the columns being aggregated and/or the columns by which aggregations are grouped) and that further includes at least one aggregation module 3140 serially after the source elements (e.g. to generate sub-aggregation output based on processing the column values sourced via source elements 3041). For example, the IO pipeline 2835 is generated to include these one or more source elements 3041 and the aggregation module 3140 based on implementing one or more corresponding aggregation operations 3010 during IO, for example, based on determination to push aggregation into IO and/or optimization of a corresponding operator execution flow as discussed in conjunction with some or all of FIGS. 27A-27C.

The IO pipeline 2835 can further include one or more filtering and/or indexing elements that apply filtering predicates 2822. For example, this indexing and/or filtering is implemented via some or all functionality of IO pipeline discussed herein based on some or all filtering (E.g. as indicated by at least one WHERE clause) being pushed to IO as discussed herein. These filtering and/or indexing elements can be implemented via a serialized and/or parallelized flow of index elements 3512 and/or filter elements 3048 to implement the applying of filtering predicates 2822, for example, as discussed in conjunction with FIG. 24R and/or as disclosed by U.S. Utility application Ser. No. 17/303,437. The applying of filtering predicates 2822 can optionally further include source elements 3014, for example, to source columns 3041.A indicated by the predicates 2822 for filtering via filter elements 3048. Such source elements 3014 implementing the application of filtering predicates 2822 can further implement some or all of the source elements 3014 utilized for the sourcing the columns 3041.B for the corresponding aggregation (e.g. based on overlap in columns 3041.A for filtering and columns 3041.B for aggregation).

Figure 28B:
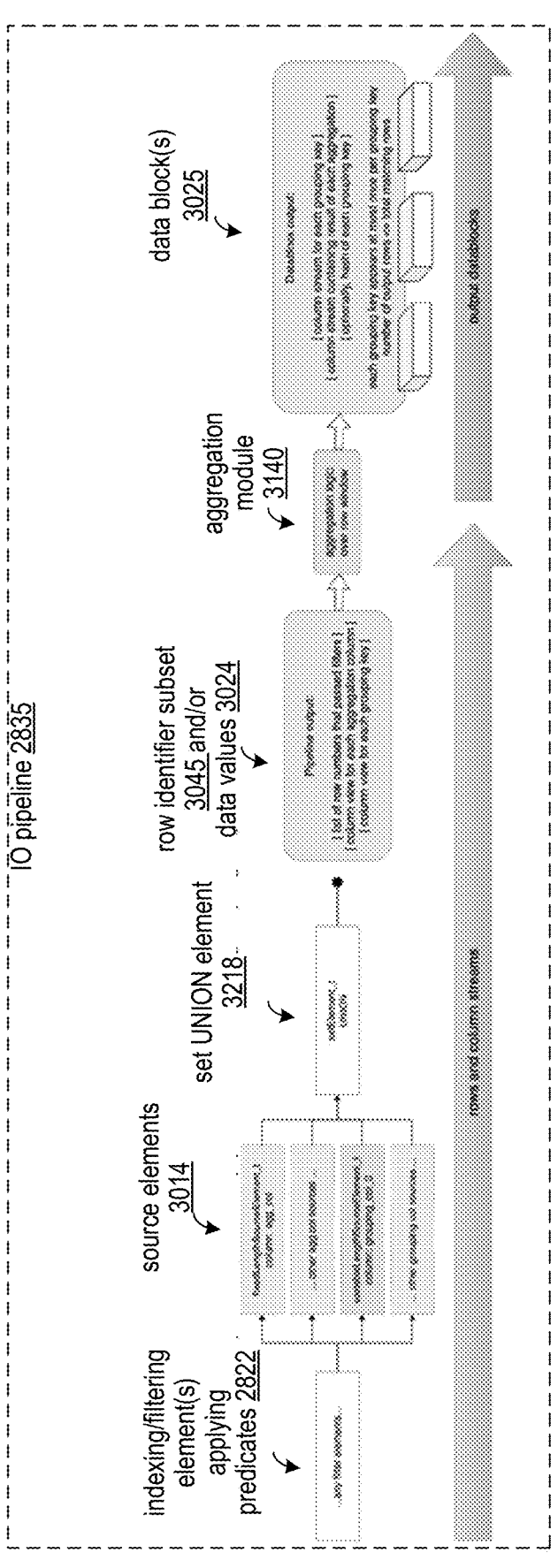
FIG. 28B illustrates an example IO pipeline in accordance with various embodiments.

FIG. 28B illustrates a particular example of IO pipeline 2835. Some or all features and/or functionality of the example IO pipeline 2835 of FIG. 28B can implement the IO pipeline 2835 of FIG. 28A and/or any embodiment of IO pipeline 2835 described herein. Some or all features and/or functionality of the example IO pipeline 2835 of FIG. 28B can be executed in conjunction with executing a corresponding IO operator to implement performance of aggregation in IO as described herein.

As illustrated in the example of FIG. 28B, predicates 2822 can be applied via corresponding IO pipeline elements, and source elements 3014 can be applied to source column values for rows (e.g. the filtered subset of rows) filtered via predicates 2822, where a union element (e.g. UNION element 3218 as disclosed by U.S. Utility application Ser. No. 17/303,437) can be applied to render pipeline output, (e.g. the pipeline output can indicate a row identifier subset 3045 and/or corresponding column values 3024 for this filtered subset of rows, for example, as disclosed by U.S. Utility application Ser. No. 17/303,437). Aggregation module 3140 can be applied to process this pipeline output as part of a final step of emitting corresponding data blocks 3025, where the data blocks indicate corresponding sub-aggregation output 3023.

In some embodiments, the IO operator 2521 can be implemented as a new operator instance, for example, that is implemented via adapting some or all features and/or functionality of IO operators implementing IO pipelines discussed herein (e.g. this adapted IO operator 2521 shares a majority of its code with, and/or possibly inherits from, a pipelineIoOperatorInstance_t utilized to implement other embodiments of IO operator described herein. For example, an IO operator 2521 implementing aggregation can compile and/or execute pipelines 2835 with few-to-no changes in order to continue to support arbitrary indexes & filtering in the WHERE clause of aggregation queries.

In some embodiments of an IO pipeline adapted to perform aggregation, aggregation logic runs on the final output of the IO pipeline, for example, in corresponding pull and emit functionality of the operator (e.g. in conjunction with applying a corresponding pullAndEmit function) rather that inside a dedicated pipeline element. For example, the aggregation logic of FIG. 28B and/or the corresponding aggregation module 3041 of FIGS. 28A and/or 28B is implemented via this pull and emit functionality.

In some embodiments of an IO pipeline adapted to perform aggregation, before the aggregation is computed, the pipeline applies any filters from the plan (e.g. applies predicates 2822 via corresponding index elements, filter elements, and/or source elements).

In some embodiments of an IO pipeline adapted to perform aggregation, after applying filters from the plan, rows for all columns consumed in the aggregations, as well as the grouping keys, are sourced (e.g. via source elements 3014).

In some embodiments of an IO pipeline adapted to perform aggregation, the IO pipeline is configured to emit the hash of each group key, for example, instead of emitting the grouping keys themselves. In such embodiments, the pipeline can compute a group key hash value for each row and/or can optionally skip materializing and emitting the corresponding grouping keys.

In some embodiments of an IO pipeline adapted to perform aggregation, the IO pipeline is configured to emit a grouping key or hash for each row number.

In some embodiments, the IO pipeline 2835 is configured based on applying one or more pipeline requirements of a set of IO pipeline requirements, for example, applied by the IO pipeline generator module 2834 to generate the IO pipeline 2835 meeting these requirements (e.g. optimizing the flow of the pipeline while adhering to these requirements). Such a set of IO pipeline requirements can be received, accessed in memory, automatically generated (e.g. based on automatically evaluating past performance of pipelines and determining conditions for generating more optimal pipelines automatically), configured via user input, and/or otherwise determined. Some or all of the embodiments of IO pipeline adapted to perform aggregation discussed above and/or illustrated in the examples of FIGS. 28A and/or 28B can be applied in generating a given IO pipeline 2835 based on applying these embodiments as corresponding requirements of this set of IO pipeline requirements.

Figure 28C:
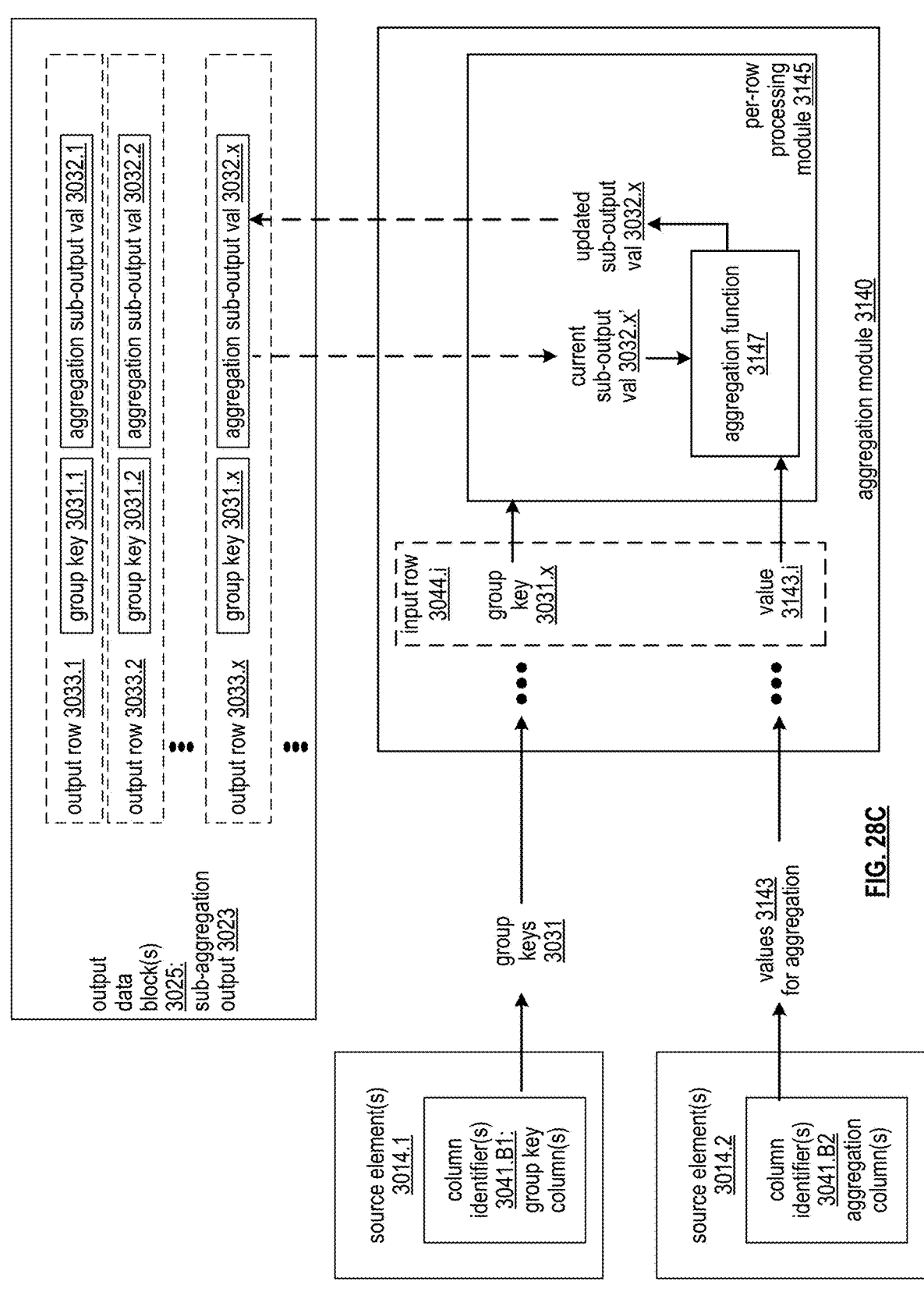
FIG. 28C is a schematic block diagram illustrating generation of sub-aggregation output via an aggregation module in accordance with various embodiments.

FIG. 28C illustrates an embodiment of an aggregation module 3410 processing of incoming column values and group keys to generate aggregation sub-output values included in one or more data blocks 3025 to collectively implement the aggregation sub-output of a given aggregation implemented via a given IO operator 2521.

The source elements 3014 of IO pipeline can include one or more first source elements 3014.1 implemented to source one or more columns corresponding to group keys 3031 for a given aggregation (e.g. if aggregating sales by product and by store, the group key 3031 of a given row can each correspond to a given (product, store) pair, or a corresponding hash value generated based on this given (product, store) pair, where the store column and the product column are thus columns 3014.1 that have respective values sourced for rows in the set of rows (e.g. only rows in the filtered subset that were filtered via the filtering of IO pipeline 2835).

The source elements 3014 of IO pipeline can include one or more second source elements 3014.2 implemented to source values 3143 one or more columns corresponding to columns being aggregated for the given aggregation (e.g. if aggregating sales by product and by store, the value 3143 of a given row can correspond the value of a transaction amount column indicating the amount of money in a corresponding purchase and/or the number of items sold in a corresponding purchase, where the transaction amount column is thus a column 3014.2 that has values sourced for rows in the set of rows (e.g. only rows in the filtered subset that were filtered via the filtering of IO pipeline 2835).

Each given input row 3044.*i* (e.g. denoted by a corresponding row identifier and/or having respective group key 3142.*i* and/or value 3143 mapped to this row identifier) can be processed via a per-row processing module 3145, where an aggregation function is applied to update corresponding aggregation sub-output values 3032.*i* in a corresponding data block 3025. In particular, one or more data block 3025 can be generated to include a plurality of output rows 3033 that each indicate a corresponding group key 3031, and a running aggregation sub-output value 3032 for that group key 3031. For example, sub-aggregation output is implemented via a corresponding group key column stream and a corresponding aggregation sub-output value column stream, for example, by implementing some or all features and/or functionality of column data streams 2968 as discussed in conjunction with FIGS. 24L-24N.

Thus, as a given input row 3044.*i* is processed indicating a particular group key 3031.*x*, the per-row processing module 3145 can apply aggregation function 3147 to update the aggregation sub-output value 3032.*x* in a corresponding output row 3033 having the given group key 3031.*x* based on the value 3143.*i* to this given row (e.g. if the aggregation is a summation, the aggregation function 3147 adds the value 3143 to the current sub-output value 3032.*x'* to render an updated sub-output value 3032.*x* to replace the current sub-output value 3032.*x'* in the output row 3033.*x*). In some cases, multiple sub-output columns may be required to track the running aggregation (e.g. if the aggregation is an average, the running sum/average is tracked as well as the number of rows included in this running sum/average to enable computing of the average correctly).

In the case where a given input row 3044.*j* has a group key 3031.*y* not included in the sub-aggregation output 3023 (e.g. in data blocks 3025 currently being generated, even if included in a previously emitted data block), a new output row 3033.*y* can be added to the sub-aggregation output 3023 having this group key 3031.*y* and an initial aggregation sub-output value 3032.*y* (e.g. aggregation sub-output value 3032.*y* is set as the value 3143.*j* of this input row 3044.*j*).

Addition of new rows for new group keys over time can render filling of corresponding data blocks (e.g. based on having been allocated with a fixed/predetermined amount of memory) which can require these data blocks be emitted and new data blocks be allocated for remaining rows. Thus, a given group key 3031.*x* may appear across multiple data blocks 3025 emitted over time as different portions of sub-aggregation output (e.g. the new data block 3025 does not yet have a row 3033 for group key 3031.*x* so a new row is added with the initial value for aggregation sub-output value, where all aggregation sub-output values 3032.*x* for a given group key across multiple data blocks emitted by a given IO operator 2521 will ultimately be aggregated together via re-aggregation operator 3012, in conjunction with also aggregating aggregation sub-output values 3032.*x* for a given group key indicated in data blocks 3025 emitted via other IO operators 2521 (e.g. in parallel). Meanwhile, a given group key 3031.*x* optionally may not appear in all data blocks 3025 emitted by a given IO operator 2521 (e.g. the group key 3031.*x* appears in some data blocks but not others based on arbitrary ordering of processing input rows 3044).

In some embodiments of an IO operator implemented to perform aggregation, IO operators 2521 can apply an aggregation module that is operable to: compute the hash of group keys for the aggregation, and/or calculate one or more sub-aggregations for each group and return these aggregation rows in output blocks. In some embodiments, IO operators 2521 implementing aggregation can manage multiple output data blocks and/or can compute/store/update running aggregations directly into data block rows.

In some embodiments of an IO operator implemented to perform aggregation, IO operators 2521 can be configured to manage a configurable and/or flexible number of multiple output data blocks (e.g. at a given time) For example, more active data blocks means a fewer duplicate group aggregation rows, but more memory (e.g. at a given time where multiple data blocks are maintained, a given group key is included in only one output row in only one of the multiple data blocks). The IO operator (e.g. its operator execution module 3215) and/or other processing resources of query execution module 2504 and/or query processing module 2510 can automatically select how many data blocks be managed simultaneously via the IO operator (e.g. based on available memory, a number of different group keys, etc.)

In some embodiments of an IO operator implemented to perform aggregation. IO operators 2521 can be configured to pull and/or emit data blocks (e.g. via a corresponding pullAndEmit function implemented via the IO pipeline and/or by aggregation module 3104) which can be configured to allow the IO operator 2521 to: emit group key columns into the output data block; computes aggregates directly into the matching output data block value; sends the oldest data block upstream when all managed data blocks are full; and/or try to allocate a replacement for this oldest data block accordingly in response to being sent.

In some embodiments of an IO operator implemented to perform aggregation. IO operator 2521 is executed to internally compute a hash to identify the group for each row, for example, using the same hashing algorithm as other aggregation operators 3002 implemented outside of the IO operator. This can include constructing the hash value with a column-major traversal, for example, for cache efficiency. In some embodiments, this can all be performed in conjunction with the pull and emit functionality performed in conjunction with processing the IO pipeline output. In other embodiments, the IO pipeline can generate/determine these hash values, for example, to take advantage of index group information (e.g. indexes for the corresponding group keys/corresponding columns).

In some embodiments of an IO operator implemented to perform aggregation. IO operators 2521 can return the group hash in a column to avoid having to re-compute this hash in the upstream aggregation operator. In some embodiments, the group keys are a prefix of a primary or additional cluster key (CK) index, and can computing the hash on every row can be avoided where each group key is only hashed once. Such indexes can provide the group-to-row mapping.

In some embodiments of an IO operator implemented to perform aggregation, IO operators 2521, the aggregation operation 3010 implemented via aggregation module 3145 where a corresponding aggregation function is performed is implemented as: a count function (e.g. count/track the number of rows corresponding to each group key), a summation function (e.g. compute/track the sum for each group key), a product function (e.g. compute/track the product for each group key), a maximum function (e.g. identify/track maximum value for corresponding group key), a minimum function (e.g. identify/track minimum value for corresponding group key), an average function (e.g. identify/track average value for corresponding group key, and/or track both the average and the count in multiple corresponding columns where the average is re-computed in each update based on the current average, new value, and current count, and where the count is also incremented), a mode function, a range function, a standard deviation function, a variance function, and/or other aggregation functions (e.g. a blocking operator producing output as a function of all rows.

In some embodiments of an IO operator implemented to perform aggregation, IO operators 2521, the aggregation operation 3010 corresponds to a self-decomposable aggregate function, for example, requiring that the result of aggregating a subset of values can be combined with other aggregates to get the result over the total set. For example sum(A)+sum(B))=sum (A U B) and min(min (A), min(B)) =min(A U B) (e.g. where 'U' a union operator and/or an OR operator). The operator can thus emit a single aggregate result per group per data block, where the query execution module 2504 (e.g. re-aggregation operator 3012) then aggregates these results across data blocks and across all instances of the IO operators.

In some embodiments of an IO operator implemented to perform aggregation, IO operators 2521, more complex decomposable functions can be implemented via aggregation operation 3010, where one or more additional values are necessary to aggregate the result of the function. For example, the aggregation operation 3010 include average (e.g. average and count are tracked and emitted), and/or standard deviation (e.g. sum, count, and average are tracked and emitted, and/or where standard deviation is implemented as a stdevp function). These can also be handled in the query execution module 2504 (e.g. via re-aggregation operator 3012) without changes at the IO layer by pushing down separate sum and count aggregators and coalescing them into average or standard deviation.

In some embodiments of an IO operator implemented to perform aggregation, IO operators 2521, an IO operator 2521 implementing aggregation is implemented to calculate groups for a batch of rows in a given pull, where the operator calculates zero or more aggregates. For cache efficiency, aggregates are optionally computed per-column and/or per-group.

As a particular example of functionality of aggregation module 3140 of an IO operator 2521, aggregation module 3140 is operable to (e.g. once); allocate a buffer of configurable size to hold intermediate column data; calculate the minimum number of fixed-length group of aggregate column rows that fit into our buffer (e.g. this is the sub-batch size; and/or allocate a second buffer large enough to hold one sub-batch's worth of group hashes.

Continuing with this particular example of functionality of aggregation module 3140 of an IO operator 2521, aggregation module 3140 is operable to (e.g. in each pull of a plurality of pulls), until every row in our pull batch is examined, compute the group hash and/or find or add this group aggregate to the output based on, for each row in the sub-batch; for each fixed-length group column (e.g. nested as a for loop executed for within the each row in the sub-batch); bulk materialize column values into buffer, and/or update row hash with each materialized row.

Continuing with this particular example of functionality of aggregation module 3140 of an IO operator 2521, aggregation module 3140 is operable to, for each variable-length group column; each group key value is materialized into the output data block and the group hash is updated, if the group key does not fit roll back this row, flush the block, and attempt to replace; and/or if no block available, this will be the final sub-batch of the pull (e.g. limited to rows already processed). For example, this scheme avoids an allocation and copy of the group keys at the cost of wasting one tow of space in each data block.

Continuing with this particular example of functionality of aggregation module 3140 of an IO operator 2521, aggregation module 3140 is operable to, for each fixed-length group column: for each new tow (e.g. nested as a for loop within the each fixed-length group column), contig-range materialize column values into the output data block.

Continuing with this particular example of functionality of aggregation module 3140 of an IO operator 2521, aggregation module 3140 is operable to update the aggregate values based on: for each aggregate column (e.g. always fixed-length): bulk materialize the sub-batch of values into an intermediate buffer and for each aggregate function e.g. nested for loop within the each aggregate column): for each group (e.g. nested for loop within the each aggregate function): iterate over group rows in buffered values, updating aggregate (e.g. in a register) and/or update the aggregate in the corresponding existing output tow.

Continuing with this particular example of functionality of aggregation module 3140 of an IO operator 2521, to avoid long-running cycles, aggregation is short-circuited based on cycle timing.

In some embodiments of an IO operator implemented to perform aggregation, the pipeline aggregation IO operator instance emits the following columns: one or more group key columns and one or more aggregation columns. The group key column can be a collection of either fixed or variable-length columns that are emitted normally, each distinct tuple (e.g. distinct group key) is ideally emitted as few times as possible, where the same group (e.g. any given tuple) can be guaranteed will only appear once in a given output data block, but may appear in multiple different data blocks. The one or more aggregation column can hold the result of zero or more aggregations, and is optionally always fixed-length.

In some embodiments of an IO operator implemented to perform aggregation, at any time, the operator instance manages a configurable number of pending output data blocks. For example, the more data blocks it has, the more active group aggregations it can maintain, which can reduce duplicate groups emitted. When all of the current data blocks are full and a new group is encountered, the oldest block can be flushed upstream and a new one can be acquired. Data blocks can be filled across segments for a given operator instance. For example, results for a query with a small number of group keys, for example, might fit into a single data block. In this case, the data block would be flushed only once all segments had been processed.

In some embodiments of IO operators implemented to perform aggregation, some or all corresponding IO pipelines is configured to process a corresponding segment 2424 (e.g. stored by the respective node). In some embodiments of IO operators implemented to perform aggregation, one or more IO operators are configured to process a corresponding page (e.g. in conjunction with processing rows that have not yet been converted into segments but are still durably stored/otherwise already considered part of the corresponding dataset that should be processed in query execution). In such embodiments, processing of pages (e.g. via a corresponding page operator) can include maintaining an output data block format that matches the IO Operator output format for IO operators configured to process segments. In such embodiments, aggregation won't actually be performed in the operator, and the output data blocks may have the same group appearing multiple times. The output data blocks will have the same number of rows as the rows in the page data, in row order, where the aggregate value in each row is the result of the aggregation evaluated for only that row. For aggregations where the aggregate type matches the column type (sum, product, max, and min), this means that the "aggregate" column can simply contain the column value for that row. For count, which optionally has a different aggregate result type different from the column type, the aggregate column can contain the result of the aggregation for each row (1 if non-null, 0 if null).

Figure 28D:
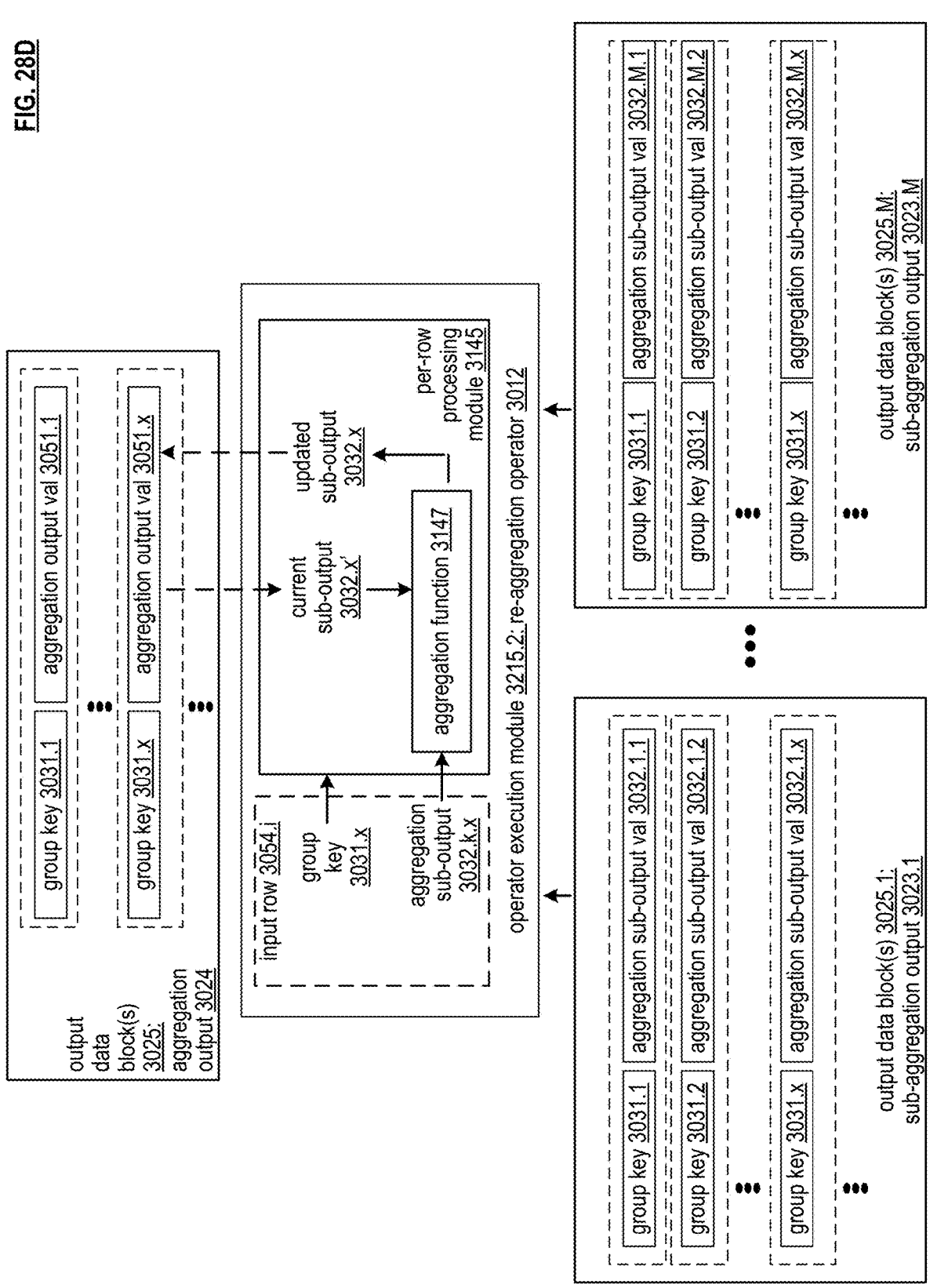
FIG. 28D is a schematic block diagram illustrating processing of sub-aggregation output to generate aggregation output in accordance with various embodiments.

FIG. 28D illustrates an embodiment of executing a re-aggregation operator 2012 via a corresponding operator execution module 3215.2 that processes sub-aggregation outputs 3023.1-3023.M of corresponding sets of output data blocks 3025.1-3025.M, for example, generated via parallelized instances of IO operator 2521 implementing the aggregation operation 3010. For example, the functionality of FIG. 28D implements the execution of re-aggregation operator 3012 illustrated in FIG. 27B, for example, based on sub-aggregation outputs 3023.1-3023.M of corresponding sets of output data blocks 3025.1-3025.M being generated via execution of each respective IO operator of a set of IO operator instances 1-M in conjunction with independently implementing some or all features and/or functionality of FIG. 28C.

Output data blocks generated via execution of re-aggregation operator can indicate final aggregation output values 3051 for each group key 3031 based on further aggregating aggregation sub-output values 3032 for each given group key 3031 received across multiple data blocks generated via multiple different parallelized instances of IO operator 2521. In particular, the given group key 3031.x of FIG. 28C can have aggregation output value generated 3051.*x* generated via a per-row processing module 3145 of the re-aggregation operator 3012 based on processing each output row 3033 across data blocks received from different parallelized instances. A given parallelized instance may have emitted multiple output row 3033 for group key 3031.*x* (e.g. across multiple data blocks). Another given parallelized instance may have emitted exactly one output row 3033 for group key 3031.*x* (e.g. incidentally and/or based on the dataset being small). Another given parallelized instance may have emitted no output row 3033 for group key 3031.*x* (e.g. this group key was not included in its input rows that were processed). The same or different aggregation function can be applied to further aggregate the sub-output values for each given group key to update respective aggregation output values (e.g. in a same or similar fashion as maintaining running aggregations as performed by IO operators as illustrated in FIG. 28C). The re-aggregation operator 3012 thus renders aggregation output 3024 being generated, rendering semantically equivalent implementation of the corresponding aggregation indicated by the query expression 2511.

FIG. 28E illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28E. For example, a node 37 can participate in some or all steps of FIG. 28E based on participating in consensus protocols to mediate consensus data with other nodes 37. Some or all of the method of FIG. 28E can be performed by nodes executing a query in conjunction with a query execution, for example, via one or more nodes 37 implemented as nodes of a query execution module 2504 implementing a query execution plan 2405. Some or all of the steps of FIG. 28E can optionally be performed by any other processing module of the database system 10. Some or all of the steps of FIG. 28E can be performed to implement some or all of the functionality of the database system 10 as described in conjunction with FIGS. 28A-28D, for example, by implementing IO pipeline 2835 and/or applying a corresponding aggregation module 3140. Some or all steps of FIG. 28E can be performed by database system 10 in accordance with other embodiments of the database system 10 and/or nodes 37 discussed herein.

Step 2882 includes determining a query operator execution flow for execution of a query that includes an IO operator that implements performance of an aggregation via an IO pipeline that includes at least one source element and aggregation logic (e.g. implemented via some or all features and/or functionality of aggregation module 3140) serially after the at least one source element. Step 2884 includes executing the IO operator in conjunction with executing a corresponding query.

Performing step 2884 can include performing step 2886 and/or 2888. Step 2886 includes applying the at least one source element of the IO pipeline to source, for each of a plurality of rows, a set of column values for a set of columns. Step 2888 includes applying the aggregation logic of the IO pipeline to generate a set of output data blocks of the IO operator that includes a plurality of aggregation sub-outputs of the plurality of rows based on, for each of a set of group keys corresponding to the set of columns, generating a corresponding aggregation sub-output.

In various examples, a query resultant of the corresponding query is generated based on processing the plurality of aggregation sub-outputs included in the set of output data blocks.

In various examples, the set of columns includes a single column. In various examples, the set of columns includes multiple columns. In various examples, the set of columns is a proper subset of a full set of columns of a corresponding dataset that includes the plurality of rows. In various examples, the set of columns includes all of the full set of columns of the corresponding dataset that includes the plurality of rows.

In various examples, each of the set of columns has one of a set of data types. In various examples, the set of data types corresponds to data types required for implementing the aggregation via the IO operator. In various examples, the set of data types includes an integer type and/or a floating point type (and optionally only includes these types and not other data types). In various examples, the set of data types further includes a matrix type, a decimal type, and/or a tuple type.

In various examples, the IO operator is executed via each of a plurality of parallelized resources to generate a corresponding plurality of aggregation sub-outputs for a corresponding plurality of rows. In various examples, different ones of the plurality of parallelized resources are applied to process different corresponding pluralities of rows corresponding to distinct proper subsets of a full set of rows. In various examples, the query resultant of the corresponding query is generated based on processing a plurality of corresponding pluralities of aggregation sub-outputs generated across the plurality of parallelized resources.

In various examples, the query operator execution flow further includes a re-aggregation operator serially after the IO operator. In various examples, the method further includes executing the re-aggregation operator to processes the plurality of corresponding pluralities of aggregation sub-outputs generated across the plurality of parallelized resources in conjunction with executing the corresponding query based on generating, for each of the set of group keys, generating corresponding aggregation output based on aggregating all of a corresponding subset of aggregation sub-outputs of plurality of corresponding pluralities of aggregation sub-outputs that correspond to aggregation sub-outputs for the each of the set of group keys.

In various examples, the set of column values are sourced for each of the corresponding plurality of rows via execution of the IO operator via the each of a plurality of parallelized resources based on accessing column values stored in at least one segment of a plurality of segments storing column values for the set of columns in conjunction with a column-based format. In various examples, different ones of the plurality of parallelized resources access a corresponding subset of the plurality of segments.

In various examples, the plurality of parallelized resources are implemented via a corresponding plurality of nodes collectively storing the plurality of segments, and wherein different ones of the plurality of parallelized resources access the corresponding subset of the plurality of segments based on a corresponding node of the corresponding plurality of nodes storing the corresponding subset of the plurality of segments.

In various examples, the plurality of segments collectively store a first proper subset of a full set of rows. In various examples, each of a first set of aggregation sub-outputs are generated from multiple corresponding rows included in the first proper subset of the full set of rows. In various examples, a plurality of pages collectively store a second proper subset of the full set of rows in conjunction with a row-based format different from the column-based format. In various examples, execution of the IO operator via at least one of the plurality of parallelized resources includes accessing column values stored in at least one page of the plurality of pages based on, for each row stored in the at least one page, generating a corresponding aggregation sub-output of the plurality of aggregation sub-outputs from only the each row. In various examples, each of a second set of aggregation sub-outputs are each generated from exactly one corresponding row included in the second proper subset of the full set of rows.

In various examples, the corresponding query is indicated by a query expression, and wherein the set of group keys is determined based on applying a GROUP BY clause indicated by the query expression.

In various examples, the set of output data blocks includes a plurality of output data blocks generated over time. In various examples, each output data block of the plurality of output data blocks includes up to one aggregation sub-output for any given group key of the set of group keys.

In various examples, multiple ones of the set of output data blocks include different corresponding aggregation sub-outputs for a given group key of the set of group keys each generated from different corresponding subsets of the plurality of rows.

In various examples, generating the set of output data blocks includes concurrently generating multiple output data blocks at a given time. In various examples, an oldest data block of the multiple output data blocks is emitted once the multiple output data blocks are full. In various examples, a new data block is concurrently generated with remaining ones of the multiple output data blocks based on emitting the oldest data block. In various examples, aggregation sub-output for any given group key is included up to one time in the multiple output data blocks being generated a given time.

In various examples, plurality of aggregation sub-outputs are generated as a corresponding plurality of output rows that include a corresponding plurality of output columns. In various examples, each output row of the corresponding plurality of output rows includes: at least one group key column indicating, for the each output row, a corresponding group key; and/or an aggregation column indicating, for the each output row, an aggregation value computed for the each corresponding group key. In various examples, the at least group key column indicates the corresponding group key as a computed hash value indicating the corresponding group key.

In various examples, the plurality of aggregation sub-outputs are included across a plurality of column streams generated via execution of the IO operator. In various examples, the corresponding plurality of output column are emitted via a corresponding plurality of column streams. In various examples, a first column stream of the plurality of column streams corresponds to a column stream for group keys, and a second column stream of the plurality of column streams corresponds to a column stream for aggregation sub-outputs.

In various embodiments, executing the IO operator is further based on applying at least one other IO pipeline element to identify the plurality of rows as a filtered subset of a second plurality of row. In various examples, the plurality of rows is a proper subset of the second plurality of row based on filtering out at least one of the second plurality of rows via the applying at least one other IO pipeline element. In various examples, the at least one other IO pipeline element includes at least one of: at least one index element, at least one filter element, and/or at least one additional source element.

In various examples, the set of columns includes at least one first column corresponding to the set of group keys. In various examples, the set of columns includes at least one second column corresponding to values to be aggregated by group key. In various examples, the set of columns sourced via the at least one source element includes only the at least one first column and the at least one second column.

In various examples, each group key of the set of group keys indicates a corresponding at least one of column value for the at least one first column. In various examples, applying the aggregation logic to generate the corresponding aggregation sub-output for the each group key is based on aggregating column values in the at least one second column for only ones of the plurality of rows having the at least one of column value for the at least one first column. In various examples, the at least one first column is indicated by a GROUP BY clause of the query expression. In various examples, column values of the at least one first column are sourced via a first at least one source element in the IO pipeline and/or column values of the at least one second column are sourced via a second at least one source element in the IO pipeline.

In various examples, executing the IO operator is further based on determining, for the each of the plurality of rows, a corresponding one of the set of group keys for the each of the plurality of rows based on at least one of the set of column values sourced for the each row corresponding to the at least one first column. In various examples, a given corresponding aggregation sub-output is generated for a given one of the set of group keys based on performing the aggregation as a function of column values in the at least one second column for only a corresponding subset of the plurality of rows determined to have the given one of the set of group keys.

In various examples, performing the method of FIG. 28E includes performing some or all features and/or functionality of one or more steps of FIG. 27C.

In various embodiments, any one of more of the various examples listed above are implemented in conjunction with performing some or all steps of FIG. 28E. In various embodiments, any set of the various examples listed above can be implemented in tandem, for example, in conjunction with performing some or all steps of FIG. 28E, some or all steps of FIG. 27C, and/or any other method described herein.

In various embodiments, at least one memory device, memory section, and/or memory resource (e.g. a non-transitory computer readable storage medium) can store operational instructions that, when executed by one or more processing modules of one or more computing devices of a database system, cause the one or more computing devices to perform any or all of the method steps of FIG. 28E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28E, for example, in conjunction with further implementing any one or more of the various examples described above.

In various embodiments, the operational instructions, when executed by the at least one processor, cause the database system to: determine a query operator execution flow for execution of a query that includes an IO operator that implements performance of an aggregation via an IO pipeline that includes at least one source element and aggregation logic serially after the at least one source element; and/or execute the IO operator in conjunction with executing a corresponding query based on: applying the at least one source element of the IO pipeline to source, for each of a plurality of rows, a set of column values for a set of columns, and/or applying the aggregation logic of the IO pipeline to generate a set of output data blocks of the IO operator that includes a plurality of aggregation sub-outputs of the plurality of rows based on, for each of a set of group keys corresponding to the set of columns, generating a corresponding aggregation sub-output. In various examples, a query resultant of the corresponding query is generated based on processing the plurality of aggregation sub-outputs included in the set of output data blocks.

FIGS. 29A-29F illustrate embodiments of a database system 10 that perform aggregation via hash-computation-free techniques, where hash values of group keys are not computed in generating aggregation output for each of a set of group keys. Some or all features and/or functionality of database system 10 of FIGS. 29A-29F can implement any embodiment of database system 10 described herein.

In some embodiments, one of the most expensive aspects of aggregation with grouping (e.g. with GROUP BY) is assigning each row to the appropriate aggregate group. In some embodiments, this grouping is done by hashing the group key for each row, which is the collection of row values corresponding to the columns specified in the GROUP BY statement (e.g. as discussed in conjunction with pushed-down-to-IO aggregation implementations described in conjunction with FIGS. 27A-28C, where column values for group keys are optionally sourced via at least one corresponding source element 3014, and where the corresponding group keys are generated via a hash function applied to each respective set of column values for a set of columns by which an aggregation is grouped). This approach can require database to read each group key row value from disk, compute a hash of the entire group key (either together or piecewise), and/or do a lookup to associate the resulting hash with some group.

In some embodiments, pushing aggregation operations for performance to IO, for example, via implementing pushed-down-to-IO aggregation implementations utilized to implement IO operators 2521 in performing IO via database system 10, for example, as described in conjunction with FIGS. 27A-28C, can enable optimizations that can make the process of grouping cheaper. Such optimizations can include implementing one or more hash-computation-free techniques 3315, where hash values for group keys are not computed based on the corresponding grouping being performed via a different mechanism via the IO operator (e.g. via a corresponding IO pipeline 2835). Employing more hash-computation-free techniques 3315 can thus improve database system 10 based on reducing the computational overhead that would otherwise be required to perform the required grouping via the generation of hash values.

Figure 29A:
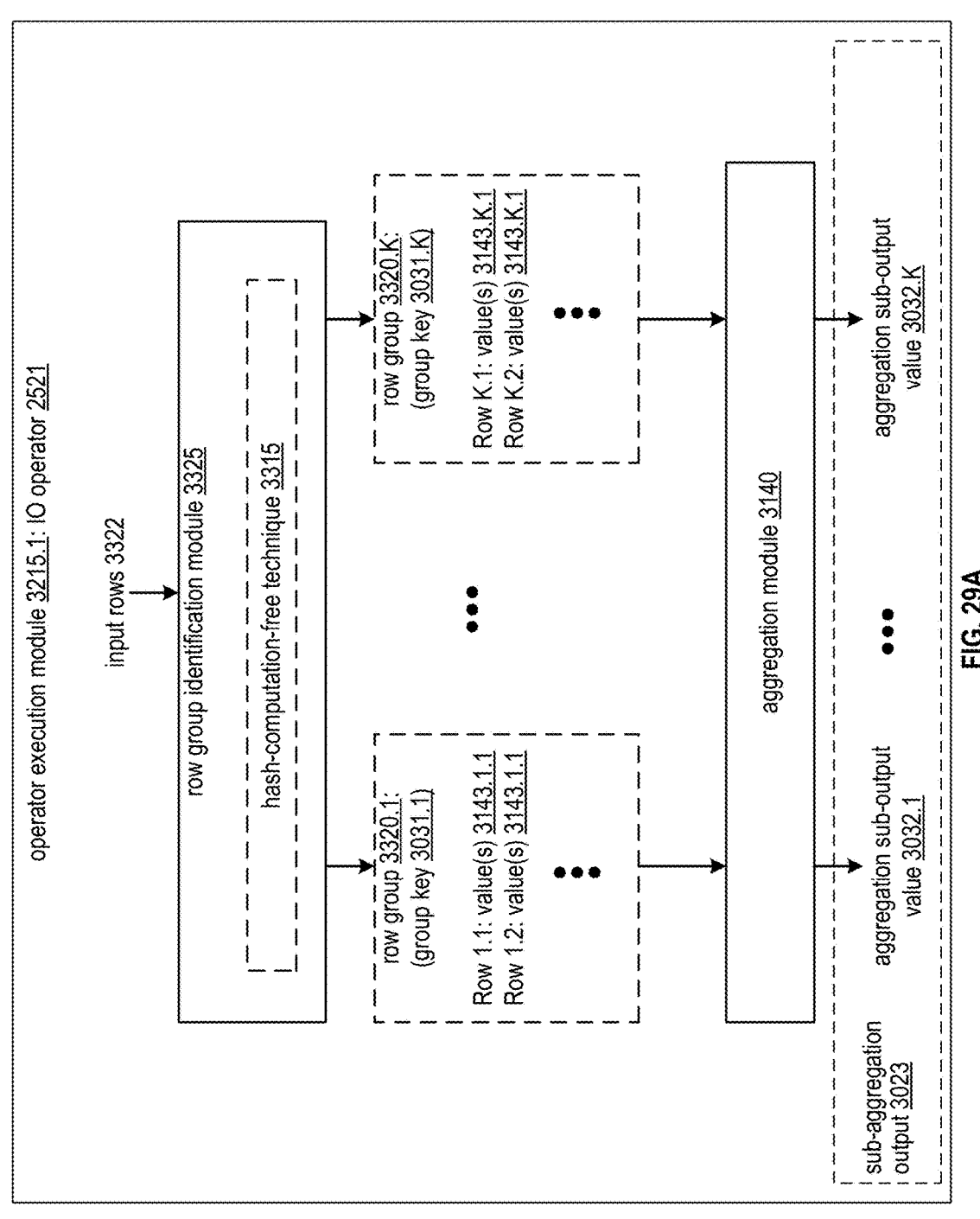
FIG. 29A is a schematic block diagram illustrating execution an IO operator that implements a hash-computation free technique in accordance with various embodiments.

FIG. 29A illustrates an embodiment of operator execution module 3215 that executes an IO operator 2521 implementing at least one aggregation operation 3010 pushed to IO, for example, via a corresponding aggregation module 3140 as discussed previously. Some or all features and/or functionality of the operator execution module 3215 and/or corresponding execution of at least one aggregation operation 3010 via IO operator 2521 can implement some or all of the operator execution modules 3215 of FIG. 27B, can implement the generation of sub output values 3032 execution modules 3215 of FIG. 28C, and/or can implement any embodiment of operator execution module 3215 and/or corresponding execution of at least one aggregation operation 3010 via IO operator 2521 described herein.

Aggregation operations 3010 pushed to IO can be applied to each of a set of row groups 3320.1-3320.K, grouped by corresponding row keys 3031.1-3031.K (e.g. row keys 3031.1-3031.K includes all possible sets of column values for a set of columns by which the aggregation is grouped, for example, as indicated by a corresponding GROUP BY clause in the query expression 2511 being executed). The rows belonging to each row group 3320 can be identified via implementing a row group identification module 3325 that is implemented via employing at least one hash-computation-free technique 3315. Each row group 3320 can undergo the corresponding one or more aggregation operations 3010 (e.g. via aggregation module 3140) to render generation of a corresponding aggregation sub-output value 3032, where the aggregation module 3140 thus generates a plurality of aggregation sub-output value 3032.1-3032.K to collectively render generation of its aggregation sub-output 3023.

The row group identification module 3325 can be applied to identify row groups for each row in a set of input rows 3322. For example, the input rows 3322 correspond to the input row set 3022 of the IO operator, and/or is optionally a proper subset of this input row set 3022 based on prior filtering having already been applied in the IO pipeline prior to the grouping for corresponding aggregation.

In some embodiments, the at least one hash-computation-free technique 3315 is implemented via a first technique corresponding to a cluster key index access technique utilizing a cluster key (CK) index. For example, cluster key (CK) indexes can be implemented to apply to a collection of one or more columns, specified in some order, and can be used for efficient lookups on any prefix of column values (for example, when indexing columns A B C, this index can efficiently apply filters to ABC, AB, A). When such an index exists, it can be used to determine the assignment of rows to groups without hashing when the group key is a supported prefix of columns. This can be accomplished using a same index traversal as a search, but instead of applying a filter, each path (e.g. to a |num prefix group keys|level) indicates a distinct group. By enumerating the rows corresponding to these groups (e.g. which may be disjoint in the index when the prefix is smaller than the total number of indexed columns), the group to row mapping can thus be determined without hashing of group key values. In particular, enumerating of the rows corresponding to these groups can render identification of the row groups 3320. Some or all features and/or functionality of the example embodiments of FIGS. 29B and/or 29C can implement some or all of this example functionality of this first technique corresponding to the cluster key index access technique as the hash-computation-free technique 3315.

In some embodiments, the at least one hash-computation-free technique 3315 is implemented via a second technique corresponding to a non-probabilistic secondary index access technique utilizing single-column secondary indexes. For example, when a non-probabilistic secondary index (e.g. inverted index or effectively-non-probabilistic hash index) exists for every group key column, groups can be determined by:

(a) In the IO pipeline, creating a new element that reads from the collection of secondary indexes in order of least to greatest cardinality (b) Computing (e.g. recursively) for each distinct value in each index, the intersection of distinct values in subsequent indexes (e.g., logically implementing a tree where each level corresponds to an index corresponding to a group key column) based on:

(b.1) Each index lookup producing a list of matching rows for each distinct value. At each stage of recursion, each distinct value for the next key column can be examined and their row lists can be intersected.

(b.2) If the intersection is empty, the operation can backtrack immediately, for example, as no rows exist for that combination of group key values where the corresponding row group(s) are empty/are not identified.

(b.3) When the intersection is non-empty, continuing to the next level in a depth-first traversal.

(c) When some complete path has been examined, its associated key values can identify a distinct group and the row list intersection can indicate the rows in that group.

Figure 29B:
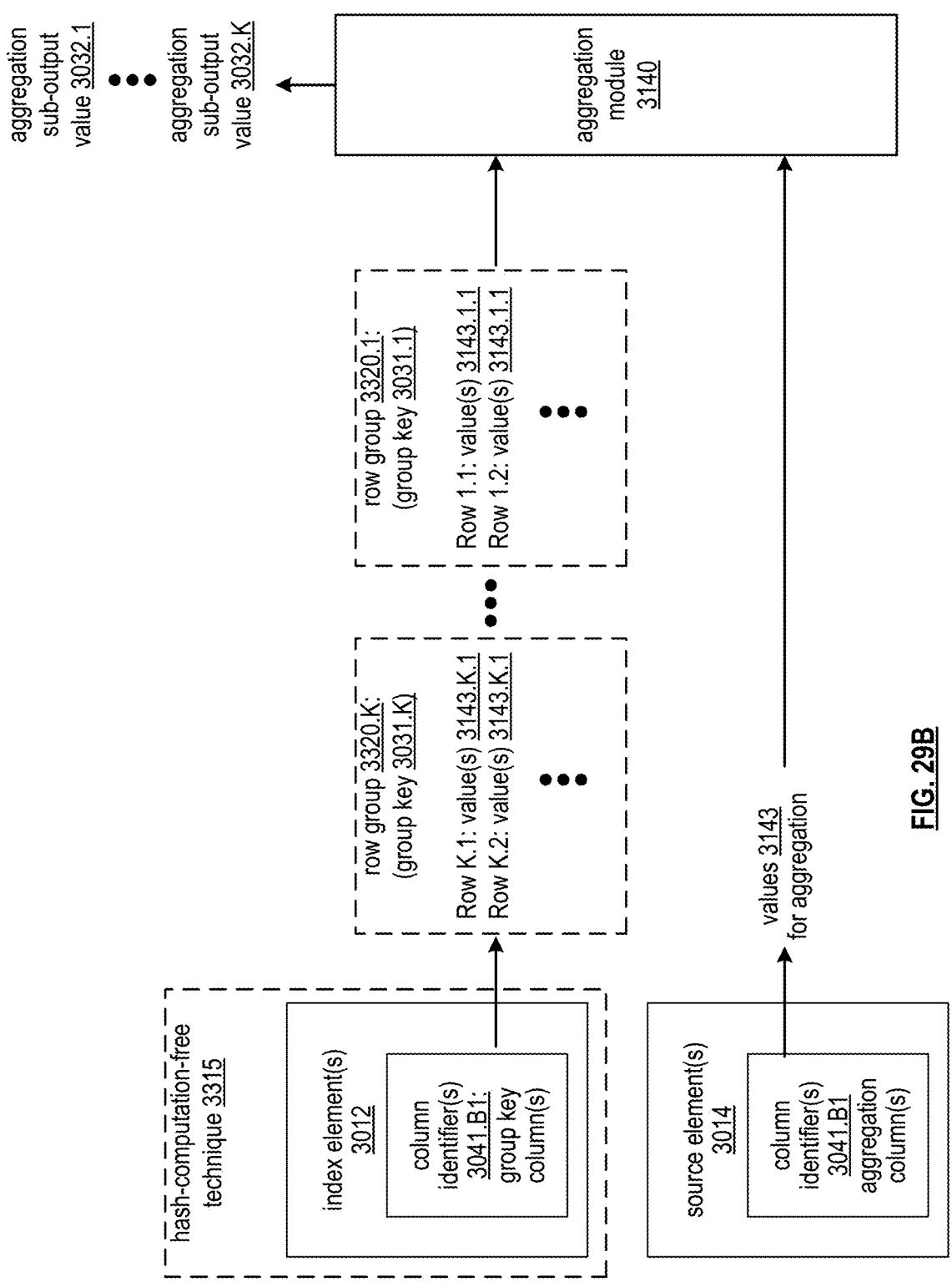
FIG. 29B is a schematic block diagram illustrating execution generation of sub-aggregation output values via an aggregation module in accordance with various embodiments.
Figure 29C:
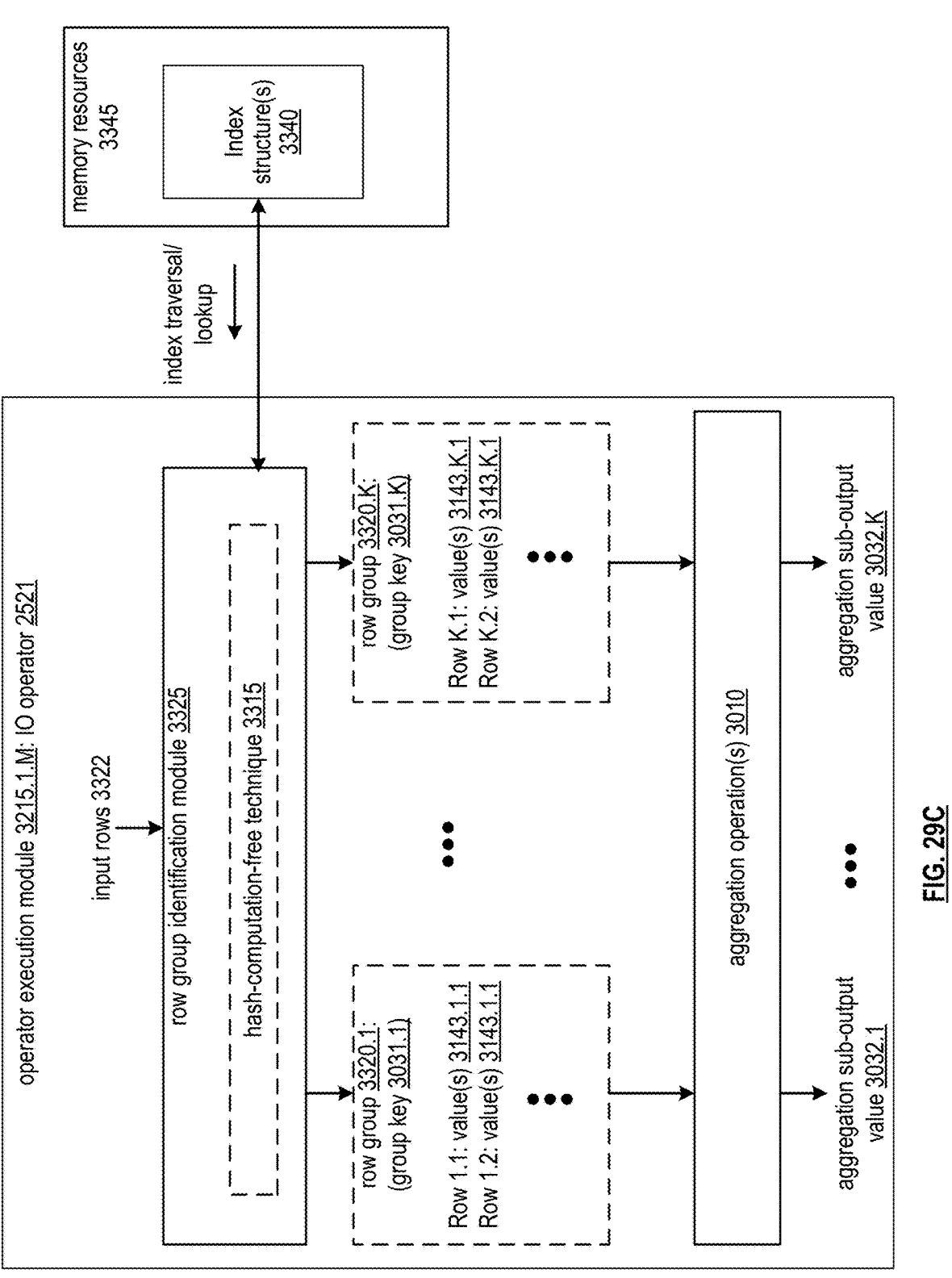
FIG. 29C is a schematic block diagram illustrating execution an IO operator via accessing at least one index structure in conjunction with applying a hash-computation free technique in accordance with various embodiments.
Figure 29D:
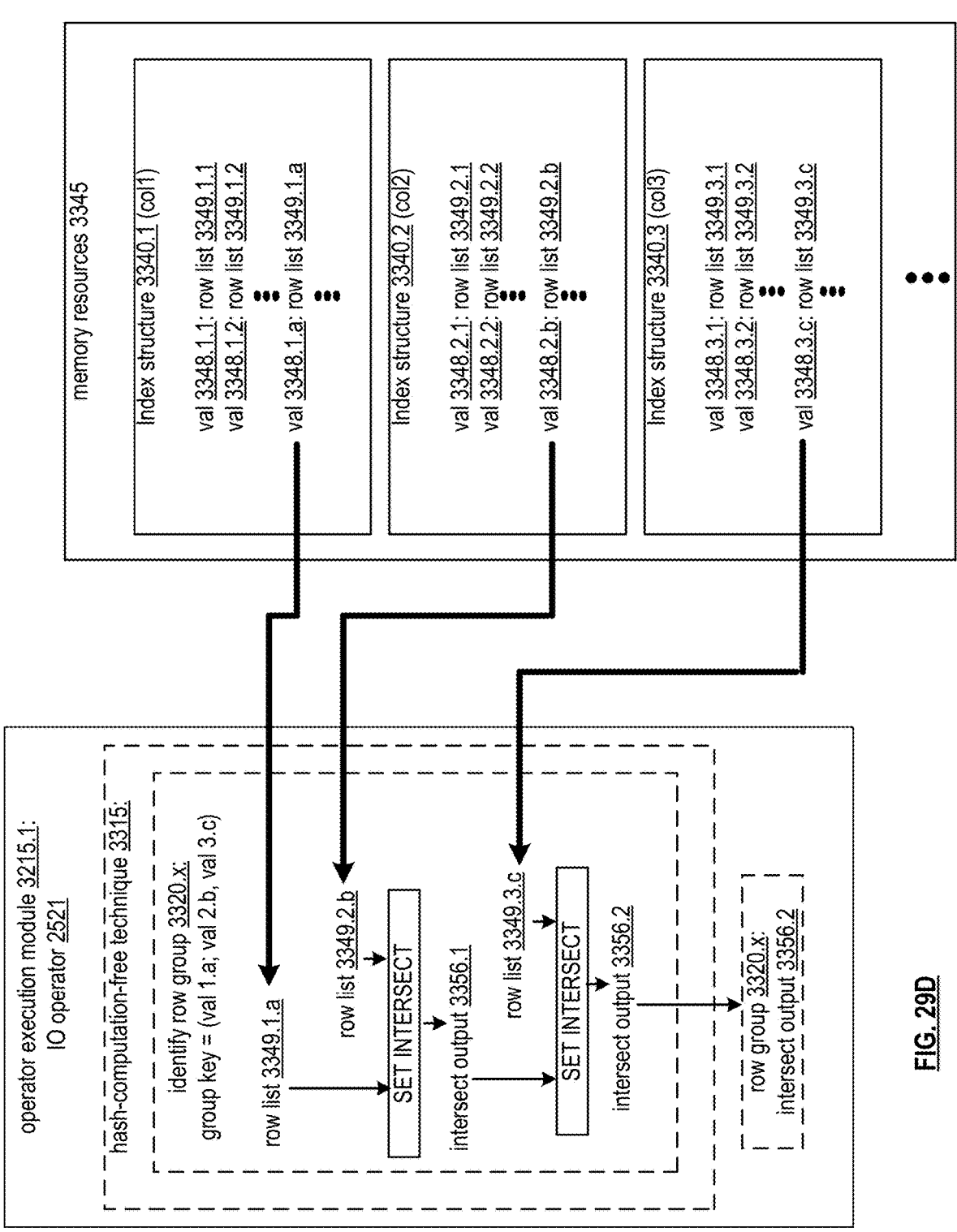
FIGS. 29D and 29E are schematic block diagrams illustrating examples of generating sub-aggregation output values via accessing multiple index structures in conjunction with applying a hash-computation free technique in accordance with various embodiments.

Some or all features and/or functionality of the example embodiments of FIGS. 29B, 29C, 29D, and/or 29E can implement some or all of this example functionality of this second technique corresponding to the non-probabilistic secondary index access technique as the hash-computation-free technique 3315.

In some embodiments, the at least one hash-computation-free technique 3315 is implemented via a combination of both the first technique corresponding to the cluster key index access technique second technique corresponding to the non-probabilistic secondary index access technique, for example, to determine groups when the keys span a CK prefix and single-column secondary indexes.

In some embodiments, the at least one hash-computation-free technique 3315 is implemented via a third technique corresponding to pre-computed hash value access technique based on pre-calculating value hashes. For example, large column values (for example large strings) can be expensive to hash, where generation of corresponding group key hash values is thus computationally expensive. When computing groups by hashing values, it can be efficient to calculate partial hashes for these large values (e.g. during segment generation when the corresponding rows are stored in segments) instead of for each query. For example, these pre-computed hashes can be stored in an associated internal column (e.g. a designated column for the corresponding rows storing these hash values generated via hashing another column). As another example, these pre-computed hashes can be added to an index for that column (e.g. when the index for this column exists/is generated). When a pre-computed hash exists for a given column, it can be combined with the group hash efficiently (e.g. other columns are hashed during IO due to not being pre-computed, where this technique is still considered a hash-computation-free technique 3315 based on the given column not having hash values computed, despite hash values being computed for other columns). In such cases, the pre-computed hash values and these other hash values computed during IO are combined/collectively processed to render the corresponding group key hash values. In some embodiments, hash values can be generated for some or all individual columns and/or hash values for group keys spanning multiple columns are pre-computed in this fashion. In some embodiments, pre-computed hash value access technique does not require any computation of hash values for any columns due to all required columns in the set of columns by which rows are grouped having been hashed individually and/or based on this set of columns by which rows are grouped having been collectively hashed as group key hash values. Some or all features and/or functionality of the example embodiments of FIGS. 29B, 29C, and/or 29F can implement some or all of this example functionality of this third technique corresponding to the to pre-computed hash value access technique as the hash-computation-free technique 3315.

In some embodiments, different IO operators 2521 (e.g. implemented via different corresponding parallelized resources 3027) can be implemented differently for a given query that included IO-pushed-aggregation via such grouping. For example, different IO pipelines are generated for use on different segments based on the differences in segments (e.g. based on some segments indexing a particular column and others not as discussed herein, where IO pipelines apply index elements to access the particular columns for such segments indexing the particular column, and where other IO pipelines instead source the particular columns for such segments not indexing the particular column). In some embodiments, the differences in applying IO operators 2521 (e.g. across different segments) can thus render differences in hash-computation-free technique 3315 by different parallelized instances of IO operator 2521 in executing a given query. For example, different types of hash-computation-free technique 3315 (e.g. the first vs. second vs. third technique described above) are employed via different IO operator instances (e.g. based on the indexing applied to corresponding segments upon which corresponding IO pipelines are executed, whether or not a given column had a hash value pre-computed in generating a corresponding segment, etc.)). As another example, some IO operator instances employ one or more hash-computation-free technique 3315, while other do not (e.g. they instead employ hash-computation-based techniques where group key hash values are computed, for example, based on sourcing the corresponding columns by which the aggregation is grouped and generating group key hash values from the column values for each row accordingly). For example, some instances IO operator instances employ one or more hash-computation-free technique 3315 while other do not based on the hash-computation-free technique 3315 being available for use by some instances and not others (e.g. based on the indexing applied to corresponding segments upon which corresponding IO pipelines are executed, whether or not a given column had a hash value pre-computed in generating a corresponding segment, etc.)

FIG. 29B illustrates an embodiment where index elements 3012 (e.g. of a corresponding IO pipeline 2835) are applied to generate the row groups 3320.1-3320.K. This implementing of index elements 3012 can be applied in conjunction with implementing a hash-computation-free technique 3315 (e.g. the example first technique, second technique, and/or third technique discussed above, or any other hash-computation-free technique 3315). For example, a single index element 3012 is implemented to access a cluster key index structure. As another example, multiple index elements 3012 are implemented to each access a corresponding secondary index structure indexing a single column. As another example, one or more index elements 3012 are implemented to access an index structure storing pre-computed hash values and/or indicating row lists mapped to pre-computed hash values.

The one or more index elements 3012 utilized to identify row groups 3320 can be applied serially prior to the one or more source elements 3014 sourcing the column values being aggregated in a corresponding IO pipeline 2835, can be applied in parallel with the one or more source elements 3014 sourcing the column values being aggregated in a corresponding IO pipeline 2835, and/or can be applied in accordance with any arrangement in IO pipeline that renders appropriate identification of groups for use by aggregation module in conjunction with the sourced values 3143 for aggregation.

The application of one or more index elements 3012 of FIG. 29B can be implemented instead of the one or more source elements 3014.1 of FIG. 28C, where instead of sourcing column values and generating group keys 3031 via these source elements 3014.1 of FIG. 28C, the index elements 3012 of FIG. 29B are employed to identify the respective groups without hashing the values. Some or all other functionality of FIG. 28C can implement the other functionality illustrated in FIG. 29B (e.g. aggregation module 3140 of FIG. 28C and/or corresponding generation of output data blocks 3025 of FIG. 28C is employed by aggregation module 3140 of FIG. 29B, for example based on the processing of row groups 3322 of FIG. 29B rendering equivalent functionality/equivalent input to aggregation module as the case where group keys 3031 were explicitly included as hashed values of FIG. 28C).

FIG. 29C illustrates an embodiment where hash-computation-free technique 3315 is employed via row group identification module 3325 being implemented to access one or more index structures 3340 stored in memory resources 3345 (e.g. indexes of corresponding segments stored in memory drives). For example, corresponding index traversal and/or lookup is performed via implementing at least one index element 3012 of an IO pipeline 2835 as discussed in conjunction with FIG. 29B, or the index is otherwise accessed. This accessing of index structures 3340 can be applied in conjunction with implementing a hash-computation-free technique 3315 (e.g. the example first technique, second technique, and/or third technique discussed above, or any other hash-computation-free technique 3315). The one or more index structures 3340 can be implemented as one or more cluster key index structures, one or more secondary index structured (E.g. applied to one or more individual columns) and/or any other type of index. The one or more index structures 3340 can be accessed based on being non-probabilistic index structures. The one or more index structures 3340 can be implemented via any type of index structure disclosed by U.S. Utility application Ser. No. 17/303,437, and/or any other type of index.

Figure 29E:
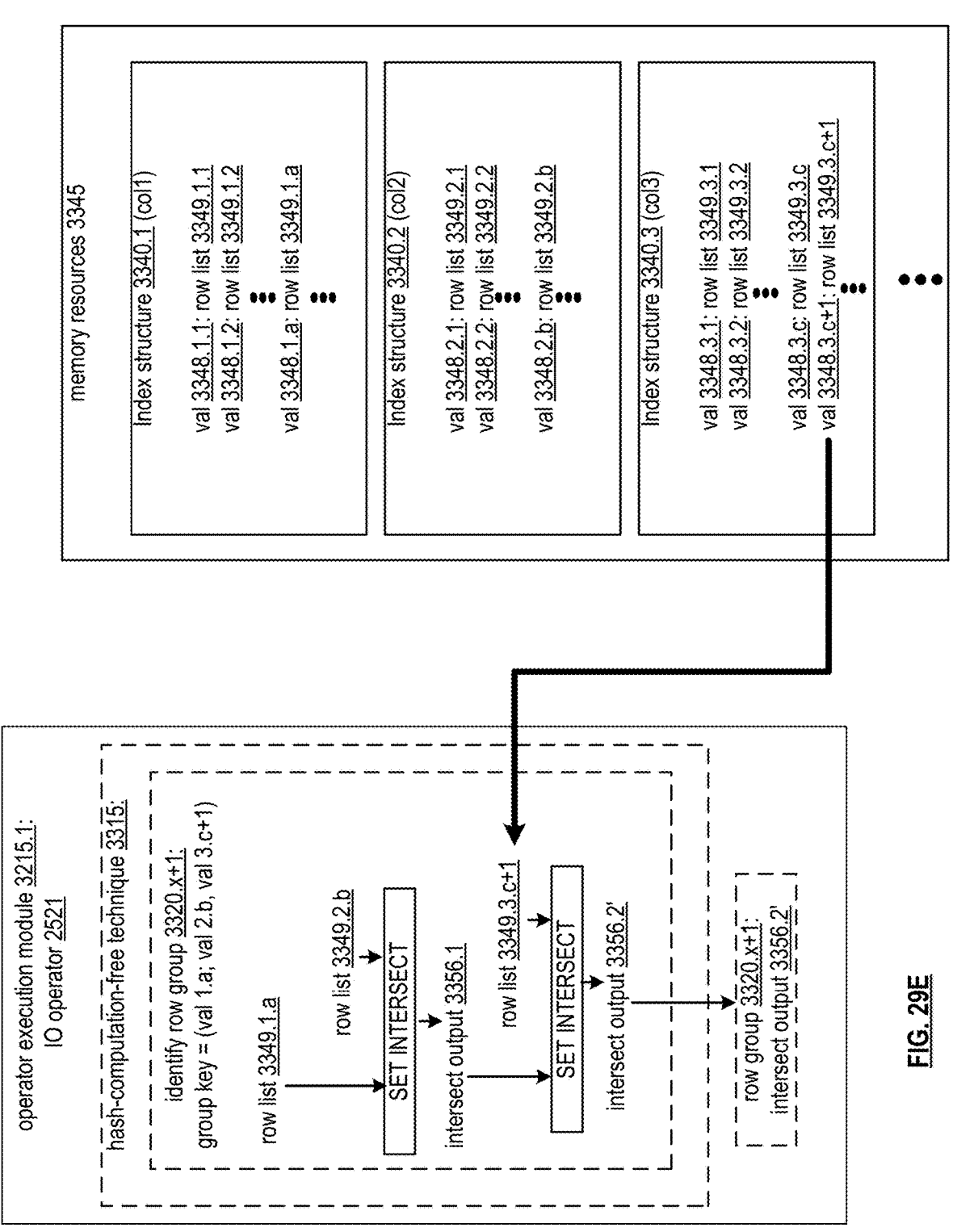

FIGS. 29D and 29E illustrates a particular embodiment of applying hash-computation-free technique 3315 to identify row groups. As illustrated in FIG. 29D, three index structures 3340.1, 3340.2, and 3340.3 are accessed based on group keys corresponding to three corresponding columns col1, col2, and col3 (e.g. as indicated in a corresponding GROUP BY clause for the corresponding aggregation).

As illustrated in FIG. 29D, consider a given row group 3320.*x* corresponding to a given group key defined via: a particular value for col1 being 3348.1.*a*; a particular value for col2 being 3348.2.*b*; and a particular value for col3 being 3348.2.*c*. The corresponding index structures for the three columns can be accessed. In particular, the row list 3349.1.*a* is accessed via the index structures 3340.1 for col1 indicating the rows having value 3348.1.*a*; the row list 3349.2.*b* is accessed via the index structures 3340.2 for col2 indicating the rows having value 3348.2.*b*; and the row list 3349.3.*c* is accessed via the index structures 3340.3 for col3 indicating the rows having value 3348.3.*b*. Intersections applied to these rows can be utilized to identify the set of rows that include all three of these values for these particular columns, thus corresponding to the rows having the corresponding group key that thus belong to the given row group 3320.*x*.

Similar accesses can be employed to render identification of all possible row groups 3320 for all possible values of col1, col2, and col3. Similar functionality can be employed for group keys for any number of columns (e.g. where the aggregation is grouped by any number of columns having such indexes as secondary indexes, and/or one or more columns being accessed via cluster key index.

This access can be performed in conjunction with applying a recursive process, for example, as discussed in conjunction with some or all functionality of applying the example second technique discussed previously. In particular, rather than re-accessing the indexes for each combination, traversal through each possible combination of column values of the set of columns can be performed via a recursive process (e.g. ordering by cardinality of the columns), where intersections are applied one at a time.

FIG. 29E illustrates an example of a next step in such a recursive process, where the process advances to accessing the next value in the col3 index; value 3348.3.*c*+1, rendering identification of the next row group for the next group key by changing only the value of col3, of the next group. For example, the col1 and col2 indexes need not be re-accessed for value 3348.1.*a* and row list 3349.2.*b*, and/or the intersection output 3356.1 of row lists 3329.1.*a* and 3329.2.*b* need not be re-computed. Once all values 3348.3 of the index structure 3340.3 are iterated through for the given values 3348.1.*a* and 3348.1.*b*, the recursion can advance based on incrementing 3348.1.*b* to 3348.1.*b*+1, and again traversing through the entirety of the values 3348.3 of the col3 index.

Figure 29F:
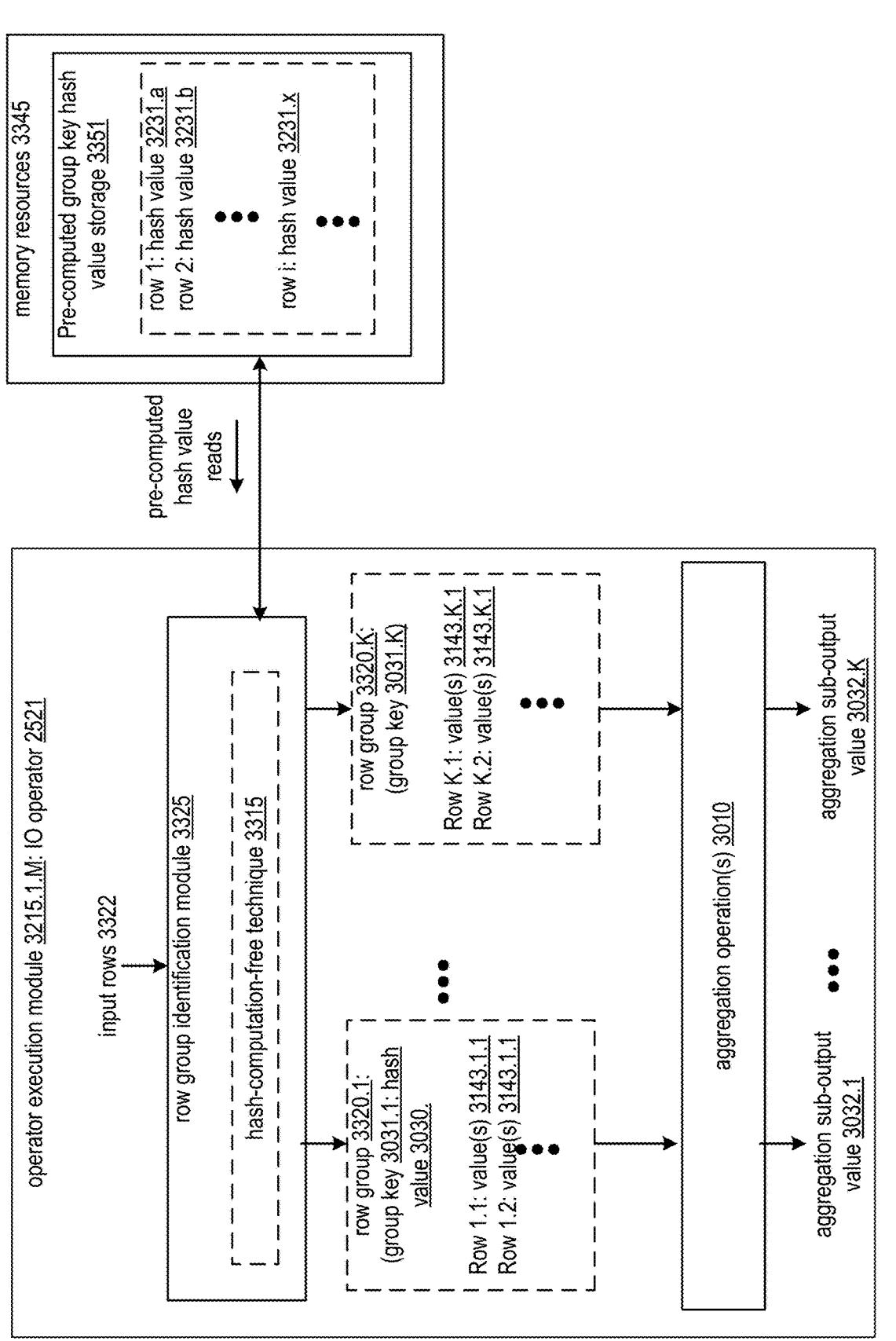
FIG. 29F is a schematic block diagram illustrating execution an IO operator via accessing pre-computed group key storage in conjunction with applying a hash-computation free technique in accordance with various embodiments.

FIG. 29F illustrates an example embodiment where hash-computation-free technique 3315 is employed via row group identification module 3325 being implemented to access one or more hash values 3231 of pre-computed group key has value storage 3351 stored in memory resources 3345. This accessing of hash values 3231 of pre-computed group key has value storage 3351 can be applied in conjunction with implementing a hash-computation-free technique 3315 (e.g. the third example technique discussed above, or any other hash-computation-free technique 3315). The hash values 3231 can be stored as column values additional columns for the set of rows, where the pre-computed group key has value storage 3351 is accessed in corresponding memory storing the rows of the dataset (e.g. segments in memory drives), and/or where the hash values 3231 are accessed via a source element implemented to source this corresponding column (e.g. rather than the column storing the raw values, such as corresponding large string values, which require reading and then hashing). The hash values 3231 can be stored in index structures 3340, where the hash values 3231 are accessed via some or all features and/or functionality of corresponding index access of FIGS. 29B and/or 29C.

The segment generator 2507 and/or 2617, and/or other processing resources of database system 10, can be implemented to generate hash values 3231 of one or more columns for storage within and/or conjunction with a corresponding segment, for example, where the generate hash values 3231 are generated in conjunction with generating the corresponding segment that stores the rows having the column values from which the hash values are generated. For example, the segment generator 2507 and/or 2617, and/or other processing resources of database system 10, can be implemented to generate a corresponding additional column of a dataset (e.g. of one or more relational database tables) to include the hash values. As another example, the segment generator 2507 and/or 2617, and/or other processing resources of database system 10, can be implemented to generate a corresponding additional index structure that includes/indicates the hash values.

Figure 29G:
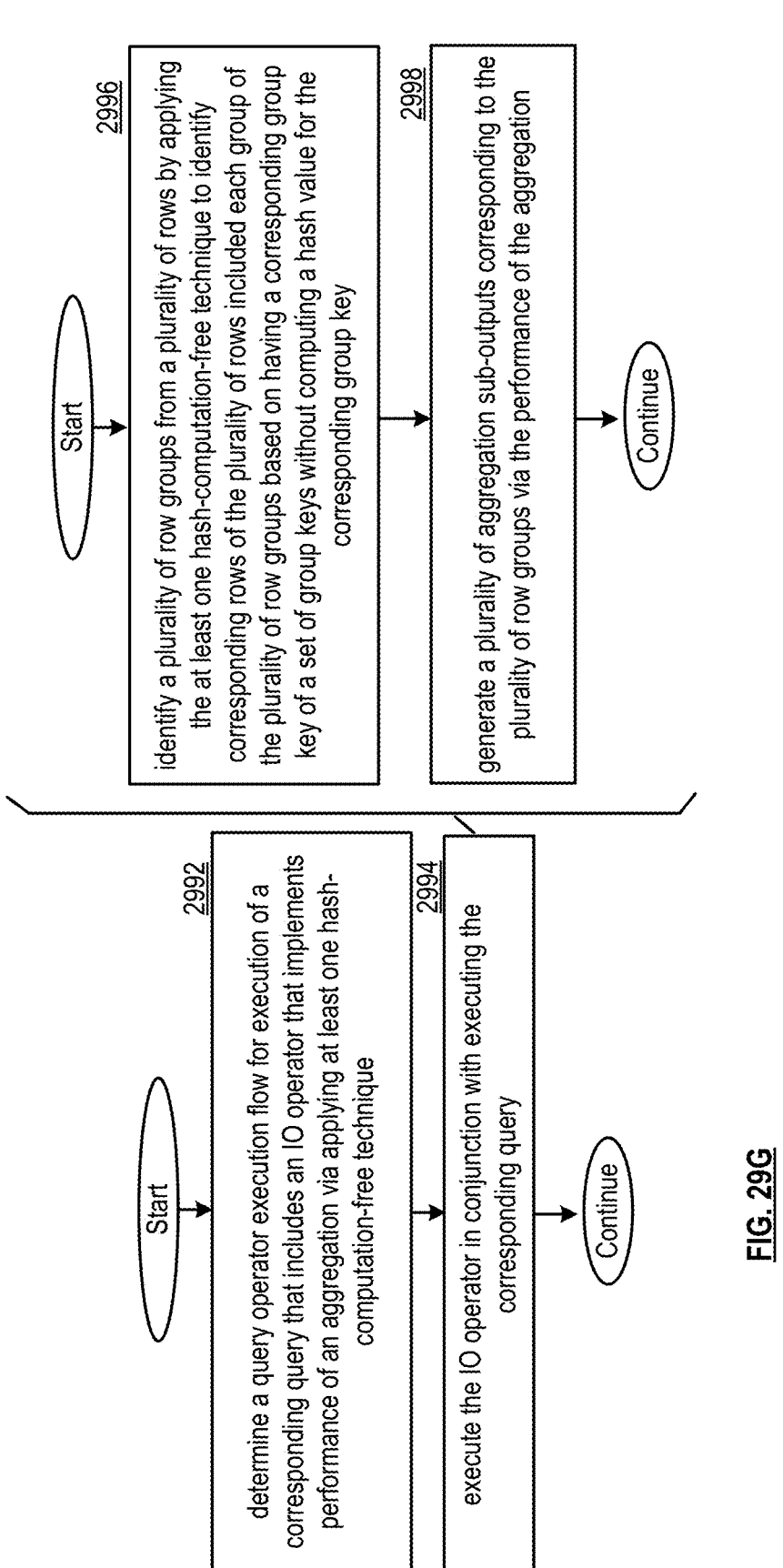
FIG. 29G is a logic diagram illustrating a method for execution in accordance with various embodiments.

FIG. 29G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29G. For example, a node 37 can participate in some or all steps of FIG. 29G based on participating in consensus protocols to mediate consensus data with other nodes 37. Some or all of the method of FIG. 29G can be performed by nodes executing a query in conjunction with a query execution, for example, via one or more nodes 37 implemented as nodes of a query execution module 2504 implementing a query execution plan 2405. Some or all of the steps of FIG. 29G can optionally be performed by any other processing module of the database system 10. Some or all of the steps of FIG. 29G can be performed to implement some or all of the functionality of the database system 10 as described in conjunction with FIGS. 29A-29F, for example, by implementing the hash-computation-free technique 3315 of via row group identification module 3325 to generate row groups 3320 for processing via aggregation module 3140, and/or executing a corresponding IO operator via operator execution module 3215. Some or all steps of FIG. 29G can be performed by database system 10 in accordance with other embodiments of the database system 10 and/or nodes 37 discussed herein.

Step 2992 includes determining a query operator execution flow for execution of a corresponding query that includes an IO operator that implements performance of an aggregation via applying at least one hash-computation-free technique. Step 2994 includes executing the IO operator in conjunction with executing the corresponding query.

Performing step 2994 can include performing step 2996 and/or step 2998. Step 2996 includes identifying a plurality of row groups from a plurality of rows by applying the at least one hash-computation-free technique to identify corresponding rows of the plurality of rows included each group of the plurality of row groups based on having a corresponding group key of a set of group keys without computing a hash value for the corresponding group key. Step 2998 includes generating a plurality of aggregation sub-outputs corresponding to the plurality of row groups via the performance of the aggregation. In various examples, a query resultant of the corresponding query is generated based on processing the plurality of aggregation sub-outputs.

In various examples, applying the at least one hash-computation-free technique is based on accessing at least one index structure indexing at least one column.

In various examples, the set of groups keys are based on different sets of column values for a corresponding set of columns by which the plurality of rows are grouped for aggregation. In various examples, applying at least one hash-computation-free technique is based on accessing the at least one index structure based on the at least one index structure indexing columns included in the corresponding set of columns.

In various examples, applying the at least one hash-computation-free technique is based on at least one of applying a cluster key index access technique to identify the plurality of row groups from the plurality of rows by accessing a cluster key index structure. In various examples, applying the at least one hash-computation-free technique is based on at least one of applying a non-probabilistic secondary index access technique to identify the plurality of row groups from the plurality of rows by accessing at least one non-probabilistic secondary index structure. In various examples, applying the at least one hash-computation-free technique is based on applying a pre-computed hash value access technique to identify the plurality of row groups from the plurality of rows by accessing a plurality of pre-computed hash values. In various examples, applying the at least one hash-computation-free technique is based on applying exactly one of the cluster key index access technique, the non-probabilistic secondary index access technique, or the pre-computed hash value access technique. In various examples, applying the at least one hash-computation-free technique is based on applying two or more of the cluster key index access technique, the non-probabilistic secondary index access technique, or the pre-computed hash value access technique (e.g. for different columns of the group key).

In various examples, the plurality of rows are included in at least one database table that includes a plurality of columns. In various examples, the corresponding query indicates that rows be grouped by a subset of columns of the plurality of columns. In various examples, the cluster key index structure is stored to index a set of possible subsets of columns of the plurality of columns of the at least one database table. In various examples, the method further includes determining to apply the cluster key index access technique based on determining the subset of columns by which the plurality of rows are grouped for aggregation is one of the possible subsets of columns of the cluster key index structure.

In various examples, applying the cluster key index access technique to identify the plurality of row groups from the plurality of rows includes performing an index traversal of the cluster key index structure to enumerate rows included in each row group of the plurality of row groups based on each path to a level of the cluster key index structure corresponding to the subset of columns indicating rows for inclusion in a corresponding one of the plurality of row groups.

In various examples, the plurality of rows are included in at least one database table that includes a plurality of columns. In various examples, the corresponding query indicates that rows be grouped by a subset of columns of the plurality of columns. In various examples, each non-probabilistic secondary index structure of a set of non-probabilistic secondary index structures is stored to index a single corresponding columns of the plurality of columns of the at least one database table. In various examples, determining to apply the non-probabilistic secondary index access technique based on determining each of the subset of columns by which the plurality of rows are grouped for aggregation is indexed via a corresponding index structure of the set of non-probabilistic secondary index structures.

In various examples, applying the non-probabilistic secondary index access technique to identify the plurality of row groups from the plurality of rows includes: accessing, in order from order of least to greatest cardinality in accordance with a recursive process, each non-probabilistic secondary index structure of a subset of non-probabilistic secondary index structures corresponding to the subset of columns; and/or computing, in accordance with the recursive process, for each distinct value of each secondary index structure of the subset of non-probabilistic secondary index structures, a corresponding intersection of sets of rows corresponding to the each distinct value with other to render identification of, for each group key of the set of group keys corresponding to a particular set of distinct values of the subset of columns, a corresponding row group generated as an intersection across sets of rows each having a corresponding distinct value of the particular set of distinct values for a corresponding one of the subset of columns.

In various examples, the plurality of rows are included in at least one database table that includes a plurality of columns, wherein the corresponding query indicates that rows be grouped by a subset of columns of the plurality of columns, further comprising: prior to execution of the corresponding query; generating the plurality of pre-computed hash values for a least one column of the plurality of columns; storing the plurality of pre-computed hash values in conjunction with storage of the plurality of rows; and/or determining to apply the pre-computed hash value access technique in executing the IO operator the corresponding query based on determining at least one of the subset of columns by which the plurality of rows are grouped for aggregation has a corresponding plurality of pre-computed hash values stored. In various examples, executing the IO operator for the corresponding query includes accessing the plurality of pre-computed hash values to identify the plurality of row groups from the plurality of rows based on determining to apply the pre-computed hash value access technique.

In various examples, the method further includes determining a second query operator execution flow for execution of a second corresponding query that includes a second IO operator that implements performance of a second aggregation via applying the pre-computed hash value access technique, and executing the second IO operator in conjunction with executing the second corresponding query based on: identifying a second plurality of row groups from the plurality of rows by applying pre-computed hash value access technique to identify corresponding rows of the plurality of rows included each group of the plurality of row groups based on re-accessing the plurality of pre-computed hash values; and/or generating a second plurality of aggregation sub-outputs corresponding to the plurality of row groups via the performance of the second aggregation. In various examples, a set of row groups in the second plurality of row groups is equivalent with, is a subset of, or is a super set of the set of row groups in the plurality of row groups. In various examples, the set of row groups in the second plurality of row groups is distinct from the set of row groups in the plurality of row groups. In various examples, a second query resultant of the second corresponding query is generated based on processing the second plurality of aggregation sub-outputs.

In various examples, the IO operator is executed via each of a plurality of parallelized resources to generate a corresponding plurality of aggregation sub-outputs for a corresponding plurality of rows. In various examples, different ones of the plurality of parallelized resources are applied to process different corresponding pluralities of rows corresponding to distinct proper subsets of a full set of rows, and wherein the query resultant of the corresponding query is generated based on processing a plurality of corresponding pluralities of aggregation sub-outputs generated across the plurality of parallelized resources.

In various examples, the query operator execution flow further includes a re-aggregation operator serially after the IO operator, further comprising executing the re-aggregation operator to processes the plurality of corresponding pluralities of aggregation sub-outputs generated across the plurality of parallelized resources in conjunction with executing the corresponding query based on generating, for each of the set of group keys, generating corresponding aggregation output based on aggregating all of a corresponding subset of aggregation sub-outputs of plurality of corresponding pluralities of aggregation sub-outputs that correspond to aggregation sub-outputs for the each of the set of group keys.

In various examples, each of the corresponding plurality of rows are identified via execution of the IO operator via the each of a plurality of parallelized resources based on accessing at least one segment of a plurality of segments storing the corresponding plurality of rows. In various examples, different ones of the plurality of parallelized resources access a corresponding subset of the plurality of segments.

In various examples, a first one of the plurality of parallelized resources executes the IO operator via applying the at least one hash-computation-free technique, and wherein a second one of the first one of the plurality of parallelized resources executes the IO operator via applying a hash-computation-based technique instead of the at least one hash-computation-free technique.

In various examples, the first one of the plurality of parallelized resources executes the IO operator via applying the at least one hash-computation-free technique based on a determination to apply the at least one hash-computation-free technique for execution of the IO operator by the first one of the plurality of parallelized resources. In various examples, the determination to apply the at least one hash-computation-free technique for execution of the IO operator by the first one of the plurality of parallelized resources is based on a first corresponding plurality of rows processed via the first one of the plurality of parallelized resources being stored in conjunction with at least one index structure indexing at least one column by which input rows are grouped for aggregation. In various examples, the first one of the plurality of parallelized resources applies the at least one hash-computation-free technique based on accessing the at least one index structure.

In various examples, the second one of the plurality of parallelized resources executes the IO operator via applying the hash-computation-based technique instead of the at least one hash-computation-free technique based on a determination to apply the hash-computation-based technique for execution of the IO operator by the second one of the plurality of parallelized resources. In various examples, the determination to apply the hash-computation-based technique for execution of the IO operator by the second one of the plurality of parallelized resources is based on a second corresponding plurality of rows processed via the second one of the plurality of parallelized resources not being stored in conjunction with any index structure indexing the at least one column by which the input rows are grouped for aggregation. In various examples, the determination to apply the hash-computation-based technique for execution of the IO operator by the second one of the plurality of parallelized resources is based on a second corresponding plurality of rows processed via the second one of the plurality of parallelized resources not being stored in conjunction with index structures indexing the at least one column by which the input rows are grouped for aggregation corresponding to types (e.g. CK indexes or non-probabilistic indexes of single column) required for using the hash-computation-free technique. In various examples, the second one of the plurality of parallelized resources applies the at least one hash-computation-based technique based on accessing the at least one index structure to identify a second corresponding plurality of row groups.

In various examples, the second one of the plurality of parallelized resources applies the hash-computation-based technique based on: reading, for each of the second corresponding plurality of rows, a set of column values for the at least one column; generating, for each of the second corresponding plurality of rows, a corresponding group key hash value based on processing the set of column values of the each of the second corresponding plurality of rows; and/or identifying a second corresponding plurality of row groups based on grouping the second corresponding plurality of rows by a corresponding plurality of group key hash values generated for the second corresponding plurality of rows.

In various examples, a first one of the plurality of parallelized resources executes the IO operator via applying a first type of hash-computation-free technique. In various examples, a second one of the first one of the plurality of parallelized resources executes the IO operator via applying a second type of hash-computation-free technique.

In various examples, the first type of hash-computation-free technique and the second type of hash-computation-free technique are different ones of a plurality of types of hash-computation-free techniques that includes: a cluster key index access technique; a non-probabilistic secondary index access technique; or a pre-computed hash value access technique.

In various examples, the corresponding query is indicated by a query expression, and wherein the set of group keys is determined based on applying a GROUP BY clause indicated by the query expression.

In various embodiments, any one of more of the various examples listed above are implemented in conjunction with performing some or all steps of FIG. 29G. In various embodiments, any set of the various examples listed above can be implemented in tandem, for example, in conjunction with performing some or all steps of FIG. 29G and/or any other method described herein.

In various embodiments, at least one memory device, memory section, and/or memory resource (e.g. a non-transitory computer readable storage medium) can store operational instructions that, when executed by one or more processing modules of one or more computing devices of a database system, cause the one or more computing devices to perform any or all of the method steps of FIG. 29G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29G, for example, in conjunction with further implementing any one or more of the various examples described above.

In various embodiments, the operational instructions, when executed by the at least one processor, cause the database system to: determine a query operator execution flow for execution of a corresponding query that includes an IO operator that implements performance of an aggregation via applying at least one hash-computation-free technique, and/or execute the IO operator in conjunction with executing the corresponding query based on: identifying a plurality of row groups from a plurality of rows by applying the at least one hash-computation-free technique to identify corresponding rows of the plurality of rows included each group of the plurality of row groups based on having a corresponding group key of a set of group keys without computing a hash value for the corresponding group key; and/or generate a plurality of aggregation sub-outputs corresponding to the plurality of row groups via the performance of the aggregation.

Figure 30A:
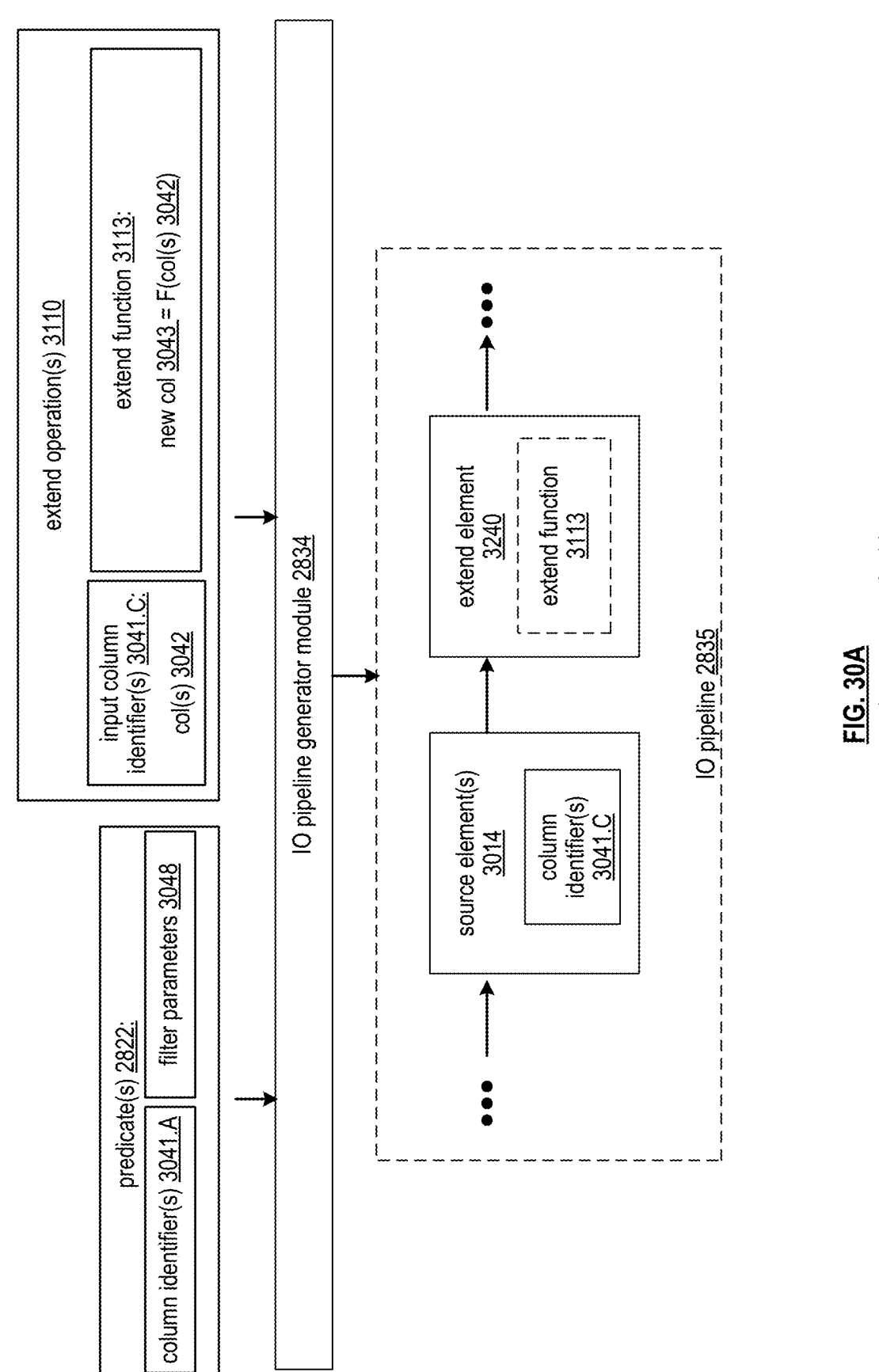
FIG. 30A is a schematic block diagram of an IO pipeline generator module that generates an IO pipeline that includes an extend element in accordance with various embodiments.
Figure 30B:
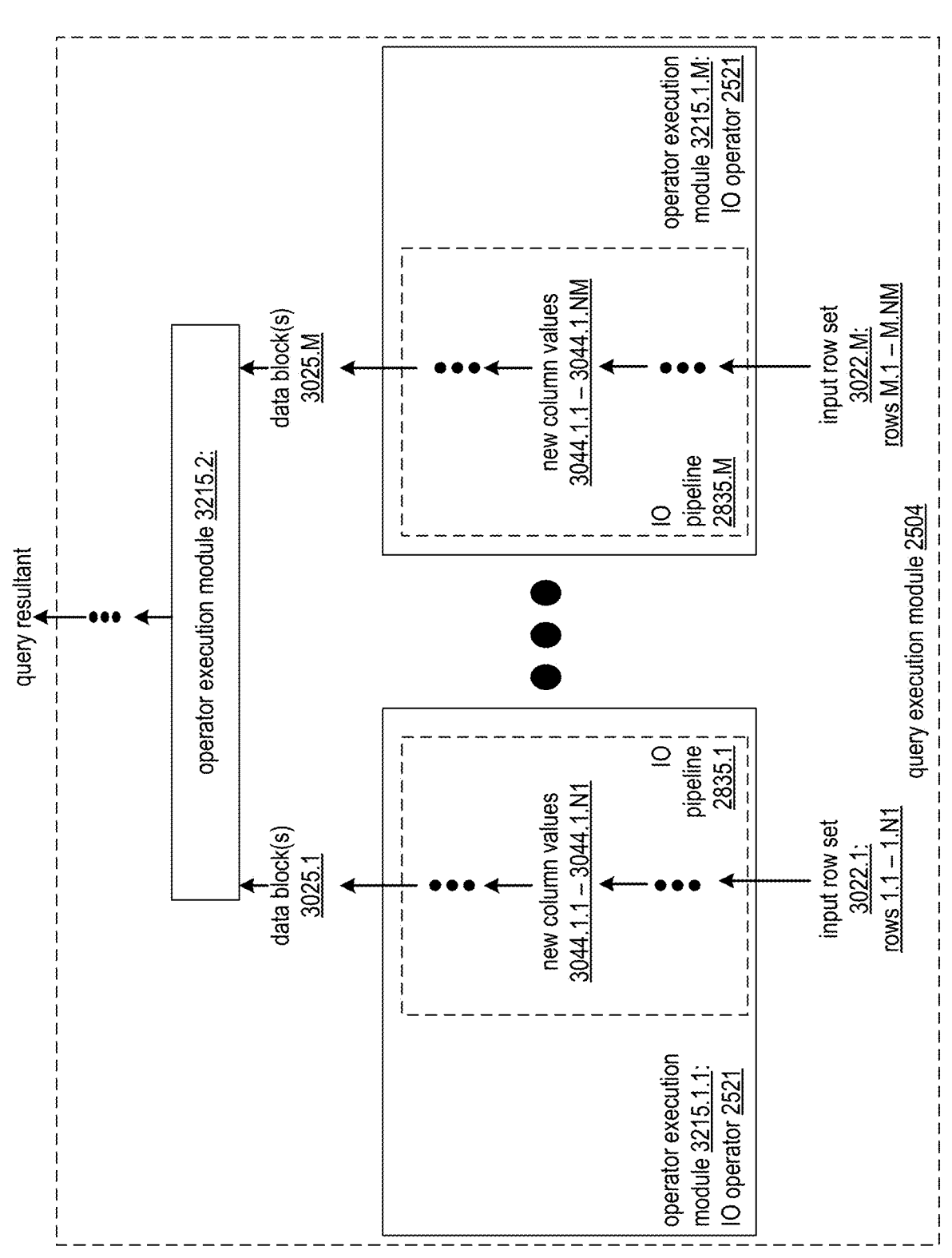
FIG. 30B is a schematic block diagram illustrating execution of an operator execution flow via generating sub-aggregation output via parallelized instances of an IO operator that each generate new column values in accordance with various embodiments.

FIGS. 30A-30B illustrate embodiments of a database system 10 that implements extend operations via IO operators. Some or all features and/or functionality of database system 10 of FIGS. 30A-30B can implement any embodiment of database system 10 described herein.

In some embodiments of implementing IO operators 2521 in performing IO via database system 10, including some or all pushed-down-to-IO aggregation implementations described in conjunction with FIGS. 27A-29G, emitting column values is supported directly from the IO pipeline, for example, either into the data blocks emitted by the IO operator or to be processed in an aggregation at IO. In some embodiments, to support query plans that extend a column before applying a filter or aggregation, extends are implemented inside the IO pipeline, allowing the result of an arbitrary transformation to be treated as a new synthesized column that can be processed and emitted by the pipeline.

This approach of implementing extend operations via IO can presents advantages that improve the technology of database systems 10, for example, based on the extend expression being evaluated on a window of rows inside the IO pipeline operator framework as described herein, for example, by allowing the internal scheduling of the IO operator to account for the computational and/or memory overhead of the extend evaluation, and/or by allows extends to be executed simultaneously with other pipeline logic on other row windows (e.g. per the IO pipeline infrastructure as described herein).

Alternatively or in addition, this approach of implementing extend operations via IO can presents advantages that improve the technology of database systems 10 based on the result of the extend being represented as a synthesized column inside the pipeline, allowing for all operations that consume column values (e.g. filtering, aggregation, and/or emitting values to output data blocks) to consume extend results as well.

Alternatively or in addition, this approach of implementing extend operations via IO can presents advantages that improve the technology of database systems 10 based on extend expressions being implemented as arbitrary functions (e.g. f(col1, col2 . . . )→result) that can be evaluated on any set of column value inputs, enabling extends to be similarly evaluated on the results of previous extends.

Alternatively or in addition, this approach of implementing extend operations via IO can presents advantages that improve the technology of database systems 10 based on IO pipeline filters being applied to the results of extends within the IO pipeline which can be beneficial based on reducing the total set of rows emitted by the pipeline output and/or can be beneficial based on reducing IO that would have been performed for other columns for the filtered-out row values.

Alternatively or in addition, this approach of implementing extend operations via IO can presents advantages that improve the technology of database systems 10 based on aggregation at IO accepting the result of extends both as grouping keys and/or as aggregated values, which can be beneficial based on allowing the pipeline to emit aggregates directly rather than having to emit raw column values for the extended columns.

In some embodiments, without an extend implementation at IO, the pipeline sends the full set of values of all input columns into any extends upstream to other non-IO operators of the query operator execution flow (e.g. sends these values upstream to a corresponding virtual machine (VM) implemented to process output of IO).

In some embodiments, a Pipelined table IO operator supporting secondary indexes implements functionality enabling extends computed after all filters, where if it is favorable to compute them earlier, for extend filters, the pipeline being implemented based on ordering order the filters efficiently, and/or based on being pre-aggregation. In some embodiments, a repeated JoinExtend io_extends is implemented via a corresponding PipelineIoOperator message. For example, such a JoinExtend object can be utilized for extend-inside-join, based on being defined via a corresponding set of configurable variables such as: a name (e.g. string name); an expression (e.g. PostfixExpression expression); a type (e.g. string type); a nullable (e.g. bool nullable); a Boolean emit value (e.g. bool emit); and/or exception column (e.g. string exceptionCol).

In some embodiments, implementing extend operations via IO is based on applying flow optimizer module 4914 to generate an updated query operator execution flow via pushing the extend operation into the IO operator 2521. In some embodiments, an extend operation is pushed into IO during corresponding optimization in response to a set of extend push-down conditions being met (e.g. all of the set of conditions must be satisfied by the extend operation and/or a corresponding initial query operator execution flow 2817.0).

In some embodiments, the set of extend push-down conditions includes: a first condition requiring that the extend operation must not reference columns from multiple tables (e.g. otherwise, its input must be multiple tables, and thus can't push into just one IO operator); a second condition requiring the extend operation is not a post-aggregation extend, for example, due to the IO aggregation being core local (e.g. implemented via a corresponding parallelized resource), which can mean that the global aggregation value for use in computations is not yet available at IO and thus the post-aggregation extend cannot yet be performed correctly; and/or a third condition requiring the extend operation references at least one column (e.g. extend operations referencing no columns need not be pushed to IO, because having such operations within IO gains little to no added efficiency based on not being a function of column values being read/filtered via IO operators).

In some embodiments, partial decomposition is enabled, where one or more of these conditions of this example set of extend push-down conditions need not be met due to the implementing of partial decomposition alleviating the corresponding issues.

FIG. 30A presents an embodiment of an IO pipeline 2835 generated via an IO pipeline generator module 2834 that includes at least one extend element 3240 serially after at least one source element. The extend element 3240 can be included based on at least one extend operation 3110 indicated via a corresponding query expression 2511 (e.g. that is determined to be pushed to IO via flow optimizer module 4914) The extend element can implement an extend function 3113 indicated by the corresponding extend operation 3110. The extend function 3113 can indicate a function for generating column values of a new column 3043 as a function of column values of one or more existing columns 3042 (e.g. currently stored columns or previously generated columns generated via other extend elements serially before this extend element that implement corresponding other extend operations).

As a particular example of the extend operation 3110, consider a timezone extend on a time column of a corresponding dataset, e.g.:
  convert_UTC_Timestamp_To_Local(column_time_in-_millis, 'US/Eastern')>=TIMESTAMP('2022-12-19 19:00: 00.000000000').

The result of this extend (or any other extend operation) can be an input into a filter or into another extend at IO. In this example, input and output of the extend can be column values (e.g. FL values) of the same type (e.g. timestamp).

As a particular example of the extend operation 3110, consider a DAY( )/MONTH( ) extend, for example, on the result of a timezone conversion such as the example timezone extend above:
  DAY(convert_UTC_Timestamp_To_Local(column-_time_in_millis, 'US/Eastern')) as Day,
  month(convert_UTC_Timestamp_To_Local(column-_time_in_millis, 'US/Eastern')) AS month The result of an extend (e.g. this example DAY( )/MONTH( ) extend) can be used as an aggregation grouping key for an aggregation at IO.

The result of an extend (e.g. this example DAY( )/MONTH( ) extend) can be values (e.g. FL values) of different types (timestamp→integer).

The one or more source elements 3014 before the extend element 3140 can be applied to source the column values needed to evaluate the corresponding extend (e.g. if the extend element indicates a new column be generated to have column values as the function col1+col2+5, col1 and col2 are first sourced to render a new column value being evaluated by the extend element 3140 for each row by evaluating this function via column values of col1 and col2 for each row). In the case where an input column to the function evaluated by the extend element 3140 is also a new column, a prior extend element can be implemented serially beforehand to output the necessary new columns as input to this subsequent extend element.

The IO pipeline can further implement other pipeline elements (e.g. index elements, filtering elements, source elements for other columns, aggregation modules for pushed-down aggregations of FIGS. 27A-29G, etc.). In particular, the IO pipeline further applies the filtering of predicates 2822 as discussed previously. Some or all pipeline elements applied to perform this filtering can appear serially before, serially after, and/or in parallel with the source elements and/or extend element 3140 necessary for generating the new column. A particular ordering can be selected from a plurality of semantically equivalent options in accordance with applying an optimization, and/or different arrangements can be applied for different segments as discussed previously. For example, filtering expected to drastically reduce the number of rows being processed is automatically selected for performance in the IO pipeline early, for example, to reduce the number of new column values required to be generated by the extend based on having filtered out rows.

In some embodiments, the extend operation 3110 can be implemented as a new extendPipelineElement_t in the IO pipeline. The extend can be thought of as a function extend (input_col_1, input_col_2 . . . )→extend_output_col. The extend pipeline element can be upstream of source elements for all input columns, which can be implemented to emit all the rows to be processed by the extend element. The extend pipeline element can returns a new column view representing the output columns (e.g. implementing some or all embodiments of column data stream 2968 and/or data values 3024 of row identifier subset 3045), for example, with a unique column name and/or column ordinal. This column view can be consumed by other pipeline elements downstream of the extend.

In some embodiments, the extend pipeline element can support (e.g. optionally only supports) extend operations that take in a single input column and/or extend operations where the input and output column of the operation are both fixed-length. For example, the local evaluation of the extend expression will happen inside a columnView::cursor_t returned by the extend pipeline element. The extend element itself and/or its column view can be stateless and/or optionally do little logic other than constructing a cursor. The computation of the extend expression on input column values can happen during materialization (e.g. via a materialize( ) call on the cursor, optionally called to emit values into an output buffer rather than when calling pull( ) on the element).

In some embodiments, the cursor will materialize input column values into a temporary buffer, evaluate the extend expression for each element in the buffer, and/or store the result in the destination buffer (e.g. passed in by the caller).

In some embodiments, if one of the extend's input columns and/or the output column have fixed-length elements of the same size, the destination buffer can be used to materialize the input values, which will then be overwritten in-place with the resulting value of the extend. This can further improve the technology of database system based on further avoiding an unnecessary buffer copy for the materialized input values.

In some embodiments, corresponding logic implemented via the extend operation 3110 (e.g. implemented via the extend cursor's logic) can be implemented via some or all of the following process:

(a) To materialize N values into destBuffer: For each input column, materialize N or fewer values into a temporary buffer. If one of the input columns has the same fixed-length size as the output column, use destBuffer as its materialization buffer.

(b) Accept the first materialized value for each column as an input into the extend expression and evaluate the resulting value.

(c) Store the resulting value in the destBuffer. If this buffer was used to materialize one of the input columns, this overwrites that materialized value.

(d) Resume from (a) with N−1, which may either reuse additional input values that have already been materialized or materialize new input values into the input buffer.

FIG. 30B illustrates an embodiment of a plurality of parallelized operator execution modules 3215.1-3215.M implemented to perform parallelized execution of IO operator 2521 (e.g. via a corresponding plurality of nodes 37, a corresponding plurality of processing core resources 48, and/or a corresponding plurality of parallelized resources 3027.1-3027.M). For example, the parallelized execution of IO operator 2521 can be performed at an IO level 2416 of a query execution plan 2405 (e.g. via corresponding IO level nodes 37).

Each parallelized instance of IO operator 2521 can be executed by implementing an extend element 3140 via a corresponding IO pipeline 2835, for example, as illustrated in FIG. 30A. IO pipelines 2835 of IO operators executed via different operator execution modules 3215 can be implemented via a same or different arrangement of corresponding elements, but can be guaranteed to produce semantically equivalent output via processing of corresponding input rows.

Each IO operator can implement a generate its own set of new column values 3044 of a new column 3043 for some or all of the rows of its input row set 3022 (e.g. optionally for only the rows that haven't been filtered out via prior pipeline elements). The new column values 3044 of a new column 3043 can be processed and/or emitted in output data blocks 3025 as a corresponding column data stream 2968, for example, implemented in accordance with some or all of the features and/or functionality of FIGS. 24L-24N. The output data blocks 3025 optionally do not include some or all of these new column values (e.g. based on some corresponding rows being filtered out after the new values are generated, for example, as a function of their respective values; based on these values being used to generate another new column that is to be emitted, where these are intermediate values that are not emitted, etc.)

An operator execution module 3215.2 executing another operator (e.g. via another node 37 at a higher level in the query execution plan 2405, such as a bottom-most inner level 2414 directly above the IO level 2416) that is a parent operator of these parallelized instances of IO operators 2521 can process the incoming data blocks 3025.1-3025.M. For example, the operator execution module 3215.M thus receives the new column for a full input row set (e.g. for only the rows not filtered out across respective IO operators) based on the new column values 3044 being emitted in data blocks 3025 by the parallelized instances of IO operator 2521 and being received by the operator execution module 3215.2. As another example, the operator execution module 3215.M receives data blocks 3025 indicating other columns of the full input row set (e.g., for only the rows not filtered out across respective IO operators) that were generated/filtered as a function of the new column values 3044 of the new column 3043, even if this new column itself is not included in these data blocks.

The operator execution module 3215.2, can execute any query operation (e.g. a JOIN, an aggregation, etc.) upon the respective rows, for example, based on processing and/or forwarding/projecting the corresponding new column 3043. A query resultant can ultimately be generated, for example, via one or more executions of subsequent queries.

Some or all features and/or functionality of implementing the plurality of parallelized operator execution modules 3215.1-3215.M for executing a query operator execution flow of FIG. 30B can implement the plurality of parallelized operator execution modules 3215.1-3215.M for executing a query operator execution flow of FIG. 27B and/or any other embodiment of query execution module 2504 described herein.

FIGS. 30C-30H illustrate example embodiments of IO pipelines 2835 that include extend operators to implement corresponding query sub-expressions 3211. For example, a given example IO pipeline 2835 of a given one of the FIGS. 30C-30H is generated by IO pipeline generator module 2834 to implement a corresponding query sub-expressions 3211 pushed to IO (e.g. corresponding filtering predicates 2822, corresponding extend operations 3110, corresponding aggregation operations 3010, etc.). Each a given example query sub-expression 3211 of a given one of the FIGS. 30C-30H can correspond to a portion of the entire query expression 2511 corresponding to logical portions extracted from query expression 2511 selected to be performed during IO (e.g. based on being pushed-down during optimization via a flow optimizer module). While the query sub-expression 3211 of FIGS. 30C-30H depict the corresponding logic in accordance with SQL syntax, the corresponding IO pipeline 2835 can implement any semantically equivalent logical expression, regardless of which query language is implemented/regardless of whether query sub-expression 3211 is expressed in accordance with a query language. Some or all features and/or functionality of IO pipelines 2835 of some or FIGS. 30C-30H can implement the IO pipeline 2835 of FIG. 30A, of FIG. 30B of FIG. 24R, of FIG. 28A, as disclosed by U.S. Utility application Ser. No. 17/303,437, and/or any other embodiment of IO pipeline discussed herein.

Some or all features and/or functionality of the extend operation 3110 and/or extend element 3140 of FIGS. 30A-30H, and/or any implementing of extends as described herein, can implement some or all features and/or functionality of one or more embodiments of expression evaluation operator 2524, and/or corresponding generation of new columns and/or optionally corresponding exception checking, as disclosed by as disclosed by: U.S. Utility application Ser. No. 17/073,567, entitled "DELAYING EXCEPTIONS IN QUERY EXECUTION", filed Oct. 19, 2020, issued as U.S. Pat. No. 11,507,578 on Nov. 22, 2022, which is hereby incorporated herein by reference in its entirety and made part of the present U.S. Utility Patent Application for all purposes.

Figure 30I:
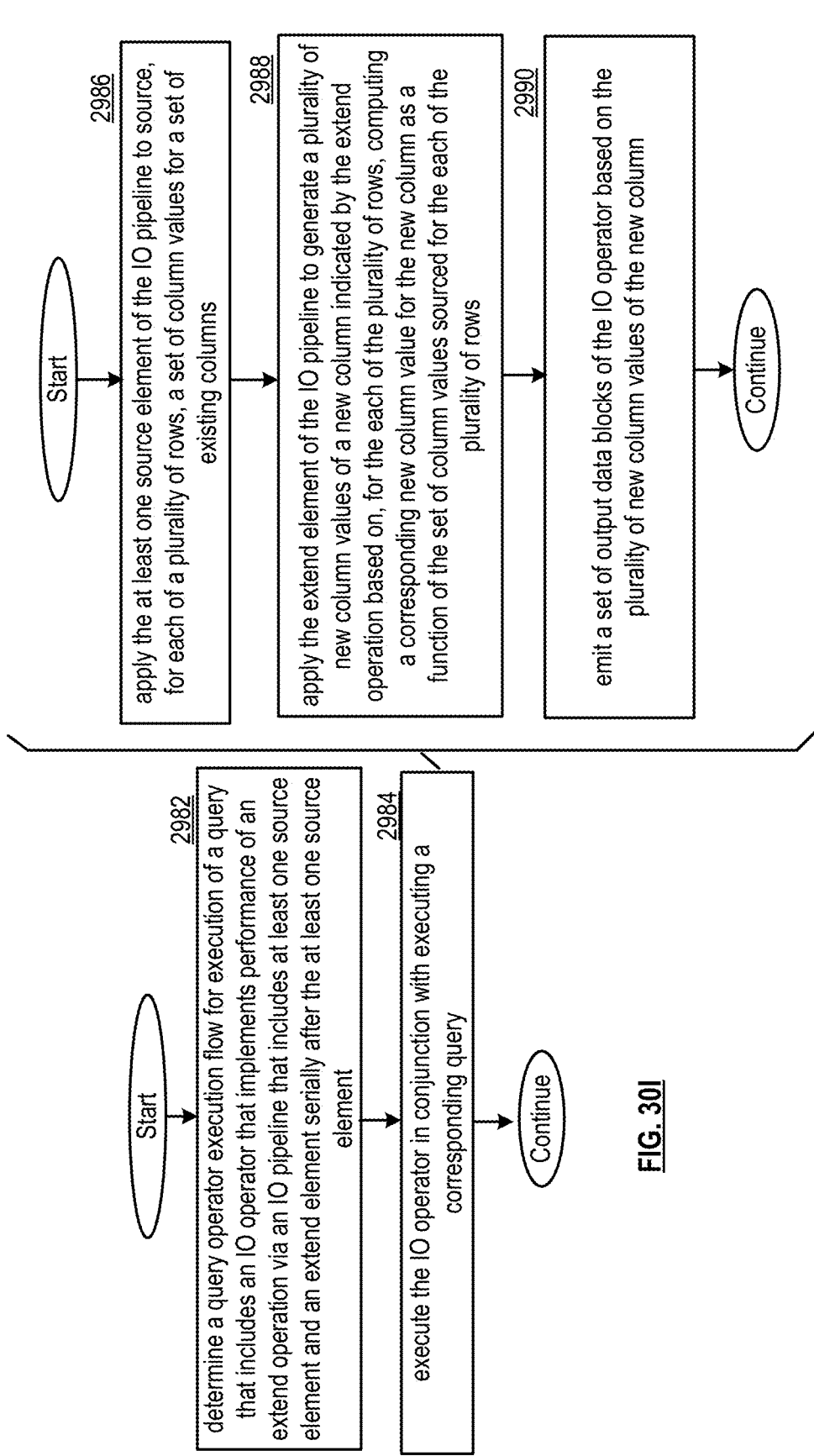
FIG. 30I is a logic diagram illustrating a method for execution in accordance with various embodiments.

FIG. 30I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30I. For example, a node 37 can participate in some or all steps of FIG. 30I based on participating in consensus protocols to mediate consensus data with other nodes 37. Some or all of the method of FIG. 30I can be performed by nodes executing a query in conjunction with a query execution, for example, via one or more nodes 37 implemented as nodes of a query execution module 2504 implementing a query execution plan 2405. Some or all of the steps of FIG. 30I can optionally be performed by any other processing module of the database system 10. Some or all of the steps of FIG. 30I can be performed to implement some or all of the functionality of the database system 10 as described in conjunction with FIGS. 30A-30H, for example, by implementing IO pipeline 2835 and/or applying a corresponding extend element 3240. Some or all steps of FIG. 30I can be performed by database system 10 in accordance with other embodiments of the database system 10 and/or nodes 37 discussed herein.

Step 2982 includes determining a query operator execution flow for execution of a query that includes an IO operator that implements performance of an extend operation via an IO pipeline that includes at least one source element and an extend element serially after the at least one source element. Step 2984 includes executing the IO operator in conjunction with executing a corresponding query.

Performing step 2984 can include performing step 2986, step 2988, and/or step 2990. Step 2986 includes applying the at least one source element of the IO pipeline to source, for each of a plurality of rows, a set of column values for a set of existing columns. Step 2988 includes applying the extend element of the IO pipeline to generate a plurality of new column values of a new column indicated by the extend operation based on, for the each of the plurality of rows, computing a corresponding new column value for the new column as a function of the set of column values sourced for the each of the plurality of rows. Step 2990 includes emitting a set of output data blocks of the IO operator based on the plurality of new column values of the new column, wherein a query resultant of the corresponding query is generated based on processing the output data blocks.

In various examples, the IO operator is executed via each of a plurality of parallelized resources to generate a corresponding plurality of new column values for a corresponding plurality of rows. In various examples, different ones of the plurality of parallelized resources are applied to process different corresponding pluralities of rows corresponding to distinct proper subsets of a full set of rows. In various examples, the query resultant of the corresponding query is generated based on processing a plurality of corresponding pluralities of new column values for the new column generated across the plurality of parallelized resources.

In various examples the query operator execution flow further includes a subsequent operator serially after the IO operator. In various examples, the method further includes executing the subsequent operator to processes the plurality of corresponding pluralities of new column values generated across the plurality of parallelized resources in conjunction with executing the corresponding query.

In various examples, the set of column values are sourced for each of the corresponding plurality of rows via execution of the IO operator via the each of a plurality of parallelized resources based on accessing column values stored in at least one segment of a plurality of segments storing column values for the set of existing columns in conjunction with a column-based format. In various examples, different ones of the plurality of parallelized resources access a corresponding subset of the plurality of segments.

In various examples, the plurality of parallelized resources are implemented via a corresponding plurality of nodes collectively storing the plurality of segments. In various examples, different ones of the plurality of parallelized resources access the corresponding subset of the plurality of segments based on a corresponding node of the corresponding plurality of nodes storing the corresponding subset of the plurality of segments.

In various examples, the IO operator further implements performance of an aggregation operation via the IO pipeline based on aggregation logic included serially after the extend operation. In various examples, the aggregation operation performs an aggregation as a function of the new column based on the aggregation logic being implemented to process the corresponding new column value computed for the each of the plurality of rows.

In various examples, the aggregation is performed as the function of the new column based on determining, for the each of the plurality of rows, a group key based on the corresponding new column value, where aggregation is grouped by group keys to render generation of a plurality of different aggregations for a corresponding plurality of group keys. In various examples, the aggregation is performed as the function of the new column based on generating a corresponding aggregation sub-output by performing the aggregation upon the plurality of new column values for the new column.

In various examples, IO operator further implements performance of filtering in accordance with a filter condition applied to the new column via the IO pipeline based on a filter element included serially after the extend operation. In various examples, the filter element emits only rows meeting the filter condition applied to the new column based on evaluating whether the corresponding new column value computed for the each of the plurality of rows meets the filter condition.

In various examples, the IO operator further implements performance of a plurality of extend operations via the IO pipeline based on at a plurality of extend elements serially after the at least one source element. In various examples, the plurality of extend operations includes the extend operation and the plurality of extend elements includes the extend element. In various examples, executing the IO operator in conjunction with executing the corresponding query is further based on: generating a set of pluralities of column values for a set of new column based on applying each extend element of the plurality of extend elements of the IO pipeline to compute a corresponding plurality of new column values of a corresponding new column of the set of existing columns indicated by a corresponding extend operation of the plurality of extend operations based on, for the each of the plurality of rows, computing a set of corresponding new column value for the set of new columns as a function of the set of column values sourced for the each of the plurality of rows. In various examples, the set of new columns includes the new column.

In various examples, a second extend element is implemented to generate a second new column of the set of existing columns independently from generation of the new column. In various examples, the second extend element is applied in parallel with the extend element in the IO pipeline, and wherein a set union element is applied serially after the extend element and the second extend element to generate a column view for the new column and the second new column.

In various examples, a second extend element is implemented to generate a second new column of the set of existing columns as a function of the new column. In various examples, the second extend element is applied serially after the extend element in the IO pipeline. In various examples the second extend element is applied to generate a second plurality of new column values of the second new column based on, for the each of the plurality of rows, computing a second new column value for the second new columns as a function of the new column value for the new column.

In various examples, generating the plurality of new column values of a new column indicated by the extend operation via applying the extend element of the IO pipeline includes materializing each set of new column values of a plurality of sets of new column values into a corresponding destination buffer based on: for each existing column of the set of existing columns, materializing a corresponding set of column values into a corresponding temporary buffer; accepting a first materialized value for the each existing column from the corresponding temporary buffer as first input to an extend expression evaluated by the extend element to generate a corresponding first new column value; storing the corresponding first new column value in the corresponding destination buffer; accepting each subsequent materialized value for the each existing column as each subsequent input to the extend expression evaluated by the extend element to generate each subsequent corresponding new column value; and/or storing each subsequent corresponding new column in the corresponding destination buffer.

In various examples, a first corresponding temporary buffer for a first existing column of the set of existing columns is implemented as the corresponding destination buffer. In various examples, each materialized value for the first existing column is accepted from the corresponding destination buffer. In various examples, storing each corresponding new column value in the corresponding destination buffer is based on overwriting the each materialized value of the first existing column in the corresponding destination buffer.

In various examples, the first corresponding temporary buffer for the first existing column is implemented as the corresponding destination buffer based on first column values of the first existing column having a first fixed-length that is equal to a second fixed-length of new column values of the new column.

In various examples, the method further includes determining whether a initial query operator execution flow meets a set of extend push-down conditions. In various examples, the initial query operator execution flow is converted into the query operator execution flow for executed in response to determining the initial query operator execution flow meets the set of extend push-down conditions.

In various examples, the set of extend push-down conditions includes at least one of: a first condition requiring that the extend operation must not reference columns from multiple tables; a second condition requiring the extend operation is not serially after the aggregation in the initial query operator execution flow; and/or a third condition requiring the extend operation references at least one existing column.

In various embodiments, any one of more of the various examples listed above are implemented in conjunction with performing some or all steps of FIG. 30I. In various embodiments, any set of the various examples listed above can be implemented in tandem, for example, in conjunction with performing some or all steps of FIG. 30I and/or any other method described herein.

In various embodiments, at least one memory device, memory section, and/or memory resource (e.g. a non-transitory computer readable storage medium) can store operational instructions that, when executed by one or more processing modules of one or more computing devices of a database system, cause the one or more computing devices to perform any or all of the method steps of FIG. 30I described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30I, for example, in conjunction with further implementing any one or more of the various examples described above.

In various embodiments, the operational instructions, when executed by the at least one processor, cause the database system to: determine a query operator execution flow for execution of a query that includes an IO operator that implements performance of an extend operation via an IO pipeline that includes at least one source element and an extend element serially after the at least one source element, and/or executing the IO operator in conjunction with executing a corresponding query based on: applying the at least one source element of the IO pipeline to source, for each of a plurality of rows, a set of column values for a set of existing columns; applying the extend element of the IO pipeline to generate a plurality of new column values of a new column indicated by the extend operation based on, for the each of the plurality of rows, computing a corresponding new column value for the new column as a function of the set of column values sourced for the each of the plurality of rows; and/or emitting a set of output data blocks of the IO operator based on the plurality of new column values of the new column, wherein a query resultant of the corresponding query is generated based on processing the output data blocks.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g. dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g. an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs). Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by at least one processor of a database system, comprising:

generating an initial query operator execution flow for a corresponding query for execution that includes an IO operator for execution serially before an aggregation operator indicating performance of an aggregation;

converting the initial query operator execution flow into an updated query operator execution flow that is semantically equivalent to, and produces the same result as, the initial query operator execution flow by:

updating the IO operator to include the performance of the aggregation; and adding a re-aggregation operator serially after the IO operator, wherein the re-aggregation operator is configured to further aggregate a plurality output data blocks generated via a plurality of parallelized executions of the IO operator via a plurality of parallelized resources; and executing the corresponding query against a plurality of rows by applying the updated query operator execution flow based on:

executing, via each of the plurality of parallelized resources, the IO operator to produce at least one data block indicating corresponding sub-aggregation output via performance of the aggregation upon a corresponding subset of the plurality of rows; and executing the re-aggregation operator upon a plurality of data blocks generated based on execution of the IO operator across the plurality of parallelized resources to generate aggregation output.

2. The method of claim 1, further comprising:

determining whether the initial query operator execution flow meets a set of aggregation push-down conditions;

wherein the initial query operator execution flow is converted into the updated query operator execution flow in response to determining the initial query operator execution flow meets the set of aggregation push-down conditions.

3. The method of claim 2, wherein the set of aggregation push-down conditions includes a condition requiring that the aggregation operator is not paired with an ORDER BY clause.

4. The method of claim 2, wherein the set of aggregation push-down conditions includes at least one of:

an input type condition requiring input to the IO operator and the aggregation operator be one of a set of data types; and an output type condition requiring output of the IO operator and the aggregation operator be one of the set of data types.

5. The method of claim 2, wherein the set of aggregation push-down conditions includes at least one of:

an aggregation type condition requiring the aggregation be one of a set of aggregation types.

6. The method of claim 5, wherein the set of aggregation types includes at least one of: a count aggregation type, a summation aggregation type, a product aggregation type, a maximum aggregation type, or a minimum aggregation type.

7. The method of claim 1, wherein converting the initial query operator execution flow into an updated query operator execution flow includes selecting a position of the re-aggregation operator in the updated query operator execution flow from a plurality of possible positions in the updated query operator execution flow serially after the IO operator, wherein the re-aggregation operator is included in the updated query operator execution flow at the selected position.

8. The method of claim 7, wherein the position of the re-aggregation operator in the updated query operator execution flow is selected to be immediately after the IO operator.

9. The method of claim 7, wherein the position of the re-aggregation operator in the updated query operator execution flow is selected based on a position of the aggregation operator in the initial query operator execution flow.

10. The method of claim 7, wherein the position of the re-aggregation operator in the updated query operator execution flow is selected based on further selecting a position of a shuffle operation in the updated query operator execution flow, wherein the re-aggregation operator is performed serially after the shuffling operator.

11. The method of claim 1, wherein converting the initial query operator execution flow into the updated query operator execution flow includes applying a plurality of updates to the initial query operator execution flow one at a time to ultimately produce the updated query operator execution flow, wherein one of the plurality of updates includes updating the IO operator to include the performance of the aggregation and including the re-aggregation operator serially after the IO operator.

12. The method of claim 11, wherein the initial query operator execution flow includes the aggregation operator serially after a join operator, wherein a prior one of the plurality of updates includes pushing the aggregation operator to a new position serially before the join operator and serially after the IO operator, and wherein the one of the plurality of updates is performed after the prior one of the plurality of updates and further includes removing the aggregation operator from the new position based on including the performance of the aggregation within the IO operator.

13. The method of claim 12, wherein the re-aggregation operator is in the new position after performing the one of the plurality of updates based on replacing the aggregation operator in the new position with the re-aggregation operator in the new position.

14. The method of claim 11, wherein the re-aggregation operator is added serially after the IO operator in an initial position based on performing the one of the plurality of updates, and wherein a subsequent one of the plurality of updates is performed after the one of the plurality of updates and includes re-positioning the re-aggregation operator to a new position different from the initial position, wherein the new position is also serially after the IO operator.

15. The method of claim 1, wherein updating the IO operator to include the performance of the aggregation is based on updating an IO pipeline implemented via the IO operator to include the performance of the aggregation, wherein executing the IO operator includes executing the IO pipeline.

16. The method of claim 1, wherein a database table that includes the plurality of rows includes a plurality of columns, and wherein the aggregation is performed to generate the corresponding sub-aggregation output corresponding to applying the aggregation to at least one column of the plurality of columns.

17. The method of claim 1, wherein the initial query operator execution flow further includes a second aggregation operator indicating performance of a second aggregation, and wherein the IO operator is serially before the second aggregation operator in the initial query operator execution flow, wherein converting the initial query operator execution flow into the updated query operator execution flow further includes:

updating the IO operator to further include the performance of the second aggregation; and adding a second re-aggregation operator serially after the IO operator;

wherein executing the corresponding query against the plurality of rows further includes executing the second re-aggregation operator to further generate second aggregation output.

18. The method of claim 17, the aggregation corresponds to a first type of aggregation, and the second aggregation corresponds to a second type of aggregation different from the first type of aggregation.

19. A database system comprising:

at least one processor; and at least one memory storing executable instructions that, when executed by the at least one processor, cause the database system to:

generate an initial query operator execution flow for a corresponding query for execution that includes an IO operator for execution serially before an aggregation operator indicating performance of an aggregation;

convert the initial query operator execution flow into an updated query operator execution flow that is semantically equivalent to, and produces the same result as, the initial query operator execution flow by:

updating the IO operator to include the performance of the aggregation; and adding a re-aggregation operator serially after the IO operator, wherein the re-aggregation operator is configured to further aggregate a plurality of output data blocks generated via a plurality of parallelized executions of the IO operator via a plurality of parallelized resources; and execute the corresponding query against a plurality of
rows by applying the updated query operator execu-
tion flow based on:
  executing, via each of the plurality of parallelized
    resources, the IO operator to produce at least one
    data block indicating corresponding sub-aggrega-
    tion output via performance of the aggregation
    upon a corresponding subset of the plurality of
    rows; and
  executing the re-aggregation operator upon a plural-
    ity of data blocks generated based on execution of
    the IO operator across the plurality of parallelized
    resources to generate aggregation output.

20. A non-transitory computer readable storage medium
comprises:
  at least one memory section that stores operational
    instructions that, when executed by at least one pro-
    cessing module that includes a processor and a
    memory, causes the at least one processing module to:
  generate an initial query operator execution flow for a
    corresponding query for execution that includes an
    IO operator for execution serially before an aggre-
    gation operator indicating performance of an aggre-
    gation;
  convert the initial query operator execution flow into an
    updated query operator execution flow that is semantically equivalent to, and produces the same result as,
the initial query operator execution flow by:
  updating the IO operator to include the performance
    of the aggregation; and
  adding a re-aggregation operator serially after the IO
    operator, wherein the re-aggregation operator is
    configured to further aggregate a plurality of out-
    put data blocks generated via a plurality of paral-
    lelized executions of the IO operator via a plural-
    ity of parallelized resources; and
execute the corresponding query against a plurality of
rows by applying the updated query operator execu-
tion flow based on:
  executing, via each of the plurality of parallelized
    resources, the IO operator to produce at least one
    data block indicating corresponding sub-aggrega-
    tion output via performance of the aggregation
    upon a corresponding subset of the plurality of
    rows; and
  executing the re-aggregation operator upon a plural-
    ity of data blocks generated based on execution of
    the IO operator across the plurality of parallelized
    resources to generate aggregation output.

* * * * *